US010567733B2

(12) United States Patent
Cole et al.

(10) Patent No.: US 10,567,733 B2
(45) Date of Patent: Feb. 18, 2020

(54) METHODS AND APPARATUS FOR COMMUNICATING AND/OR USING FRAMES INCLUDING A CAPTURED IMAGE AND/OR INCLUDING ADDITIONAL IMAGE CONTENT

(71) Applicant: NextVR Inc., Newport Beach, CA (US)

(72) Inventors: David Cole, Aliso Viejo, CA (US); Alan McKay Moss, Laguna Beach, CA (US); Hector M Medina, Laguna Beach, CA (US); Ryan Michael Sheridan, Rancho Cucamonga, CA (US)

(73) Assignee: NextVR Inc., Newport Beach, CA (US)

( * ) Notice: Subject to any disclaimer, the term of this patent is extended or adjusted under 35 U.S.C. 154(b) by 0 days.

(21) Appl. No.: 15/917,569

(22) Filed: Mar. 9, 2018

(65) Prior Publication Data

US 2018/0262745 A1    Sep. 13, 2018

Related U.S. Application Data

(63) Continuation-in-part of application No. PCT/US2018/021238, filed on Mar. 6, 2018.
(Continued)

(51) Int. Cl.
*H04N 13/156* (2018.01)
*H04N 13/189* (2018.01)
(Continued)

(52) U.S. Cl.
CPC ......... *H04N 13/156* (2018.05); *H04N 13/183* (2018.05); *H04N 13/189* (2018.05);
(Continued)

(58) Field of Classification Search
None
See application file for complete search history.

(56) References Cited

U.S. PATENT DOCUMENTS 6,108,005 A * 8/2000 Starks ............... G02B 27/2207
345/419
6,304,284 B1 * 10/2001 Dunton ................ G06T 3/4038
348/36
(Continued)

OTHER PUBLICATIONS

Notification of Transmittal of the International Search Report and the Written Opinion of the International Searching Authority, or the Declaration with the International Search Report and the Written Opinion of the Searching Authority dated May 29, 2018, pp. 1-9.

*Primary Examiner* — Fernando Alcon
(74) *Attorney, Agent, or Firm* — Straub & Straub; Michael P. Straub; Stephen T. Straub

(57) ABSTRACT

Methods and apparatus for packing images into a frame and/or including additional content and/or graphics are described. A composite image is generated including at least one image in addition to another image and/or additional image content. A playback device received an encoded frame including a captured image of a portion of and environment and the additional image content. The additional image content is combined with or used to replace a portion of the image of the environment during rendering. Alpha value mask information is communicated to the playback device to provide alpha values for use in image combining. Alpha values are communicated as pixel values in the encoded frame or as additional information. One or more mesh models and/or information on how to map image content to the one or more mesh models is communicated to the playback device for use in rendering image content recovered from a frame.

20 Claims, 25 Drawing Sheets

Related U.S. Application Data

(60) Provisional application No. 62/467,813, filed on Mar. 6, 2017, provisional application No. 62/640,011, filed on Mar. 7, 2018.

(51) Int. Cl.

| | | |
|---|---|---|
| *H04N 13/246* | (2018.01) | |
| *H04N 13/344* | (2018.01) | |
| *H04N 5/232* | (2006.01) | |
| *G06T 15/04* | (2011.01) | |
| *H04N 13/293* | (2018.01) | |
| *H04N 13/25* | (2018.01) | |
| *H04N 13/239* | (2018.01) | |
| *H04N 13/183* | (2018.01) | |

(52) U.S. Cl.
CPC ......... *H04N 13/239* (2018.05); *H04N 13/246* (2018.05); *H04N 13/25* (2018.05); *H04N 13/293* (2018.05); *H04N 13/344* (2018.05); *G06T 15/04* (2013.01); *H04N 5/23238* (2013.01)

(56) References Cited

U.S. PATENT DOCUMENTS

| | | |
|---|---|---|
| 6,417,969 B1 | 7/2002 | DeLuca et al. |
| 8,451,320 B1 | 5/2013 | Cole et al. |
| 8,610,757 B2 | 12/2013 | Cole et al. |
| 9,204,127 B1 | 12/2015 | Cole et al. |
| 9,313,474 B1 | 4/2016 | Cole et al. |
| 9,407,902 B1 | 8/2016 | Cole et al. |
| 9,485,494 B1 | 11/2016 | Cole et al. |
| 9,538,160 B1 | 1/2017 | Cole |
| 9,699,437 B2 | 7/2017 | Cole et al. |
| 9,729,850 B2 | 8/2017 | Cole et al. |
| 9,821,920 B2 | 11/2017 | Cole et al. |
| 9,832,449 B2 | 11/2017 | Cole et al. |
| 9,832,450 B2 | 11/2017 | Cole et al. |
| 9,836,845 B2 | 12/2017 | Cole et al. |
| 9,865,055 B2 | 1/2018 | Cole et al. |
| 9,894,350 B2 | 2/2018 | Cole et al. |
| 9,912,965 B2 | 3/2018 | Cole et al. |
| 9,918,136 B2 | 3/2018 | Cole et al. |
| 9,930,318 B2 | 3/2018 | Cole et al. |
| 9,955,147 B2 | 4/2018 | Cole et al. |
| 2014/0184496 A1 | 7/2014 | Gribetz et al. |
| 2015/0341617 A1 | 11/2015 | Cole et al. |
| 2015/0346812 A1 | 12/2015 | Cole et al. |
| 2015/0346832 A1 | 12/2015 | Cole et al. |
| 2016/0065946 A1 | 3/2016 | Cole et al. |
| 2016/0065947 A1 | 3/2016 | Cole et al. |
| 2016/0080728 A1 | 3/2016 | Cole et al. |
| 2016/0088287 A1 | 3/2016 | Sadi et al. |
| 2016/0212403 A1 | 7/2016 | Cole et al. |
| 2016/0212409 A1 | 7/2016 | Cole et al. |
| 2016/0219262 A1 | 7/2016 | Cole et al. |
| 2016/0219305 A1 | 7/2016 | Cole et al. |
| 2016/0227190 A1 | 8/2016 | Cole et al. |
| 2016/0239978 A1 | 8/2016 | Cole et al. |
| 2016/0241836 A1 | 8/2016 | Cole et al. |
| 2016/0241837 A1 | 8/2016 | Cole et al. |
| 2016/0241838 A1 | 8/2016 | Cole et al. |
| 2016/0241892 A1 | 8/2016 | Cole et al. |
| 2016/0253795 A1* | 9/2016 | Cole ............... G06T 11/40 345/426 |
| 2016/0253809 A1 | 9/2016 | Cole et al. |
| 2016/0253810 A1 | 9/2016 | Cole et al. |
| 2016/0253839 A1 | 9/2016 | Cole et al. |
| 2016/0255326 A1 | 9/2016 | Cole et al. |
| 2016/0255327 A1 | 9/2016 | Cole et al. |
| 2016/0269716 A1 | 9/2016 | Cole et al. |
| 2016/0360104 A1* | 12/2016 | Zhang ............... H04N 13/239 |
| 2016/0360180 A1 | 12/2016 | Cole et al. |
| 2016/0366392 A1* | 12/2016 | Raghoebardajal ... H04N 19/132 |
| 2016/0373734 A1 | 12/2016 | Cole et al. |
| 2017/0050743 A1 | 2/2017 | Cole et al. |
| 2017/0061600 A1 | 3/2017 | Cole et al. |
| 2017/0061693 A1 | 3/2017 | Kohler et al. |
| 2017/0070674 A1* | 3/2017 | Thurow ............... H04N 7/181 |
| 2017/0094247 A1 | 3/2017 | Cole et al. |
| 2017/0126972 A1* | 5/2017 | Evans, V ............ G06T 3/4038 |
| 2017/0150122 A1 | 5/2017 | Cole |
| 2017/0155967 A1 | 6/2017 | Chang et al. |
| 2017/0228933 A1* | 8/2017 | Li ................... G06T 7/60 |
| 2017/0324945 A1 | 11/2017 | Cole et al. |
| 2017/0359564 A1 | 12/2017 | Cole et al. |
| 2018/0020206 A1 | 1/2018 | Sheridan |
| 2018/0024419 A1 | 1/2018 | Sheridan |
| 2018/0027152 A1 | 1/2018 | Sheridan |

\* cited by examiner

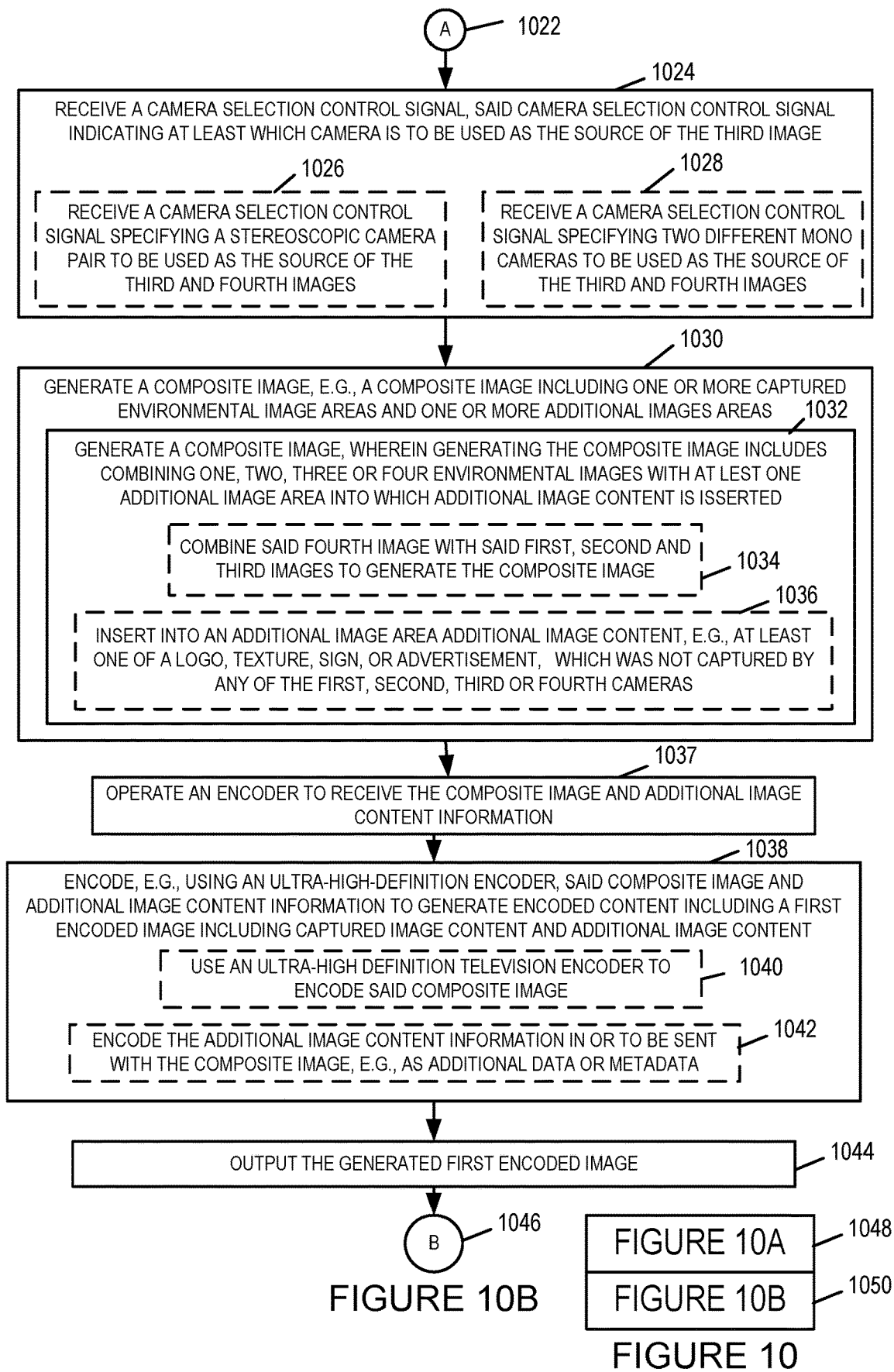

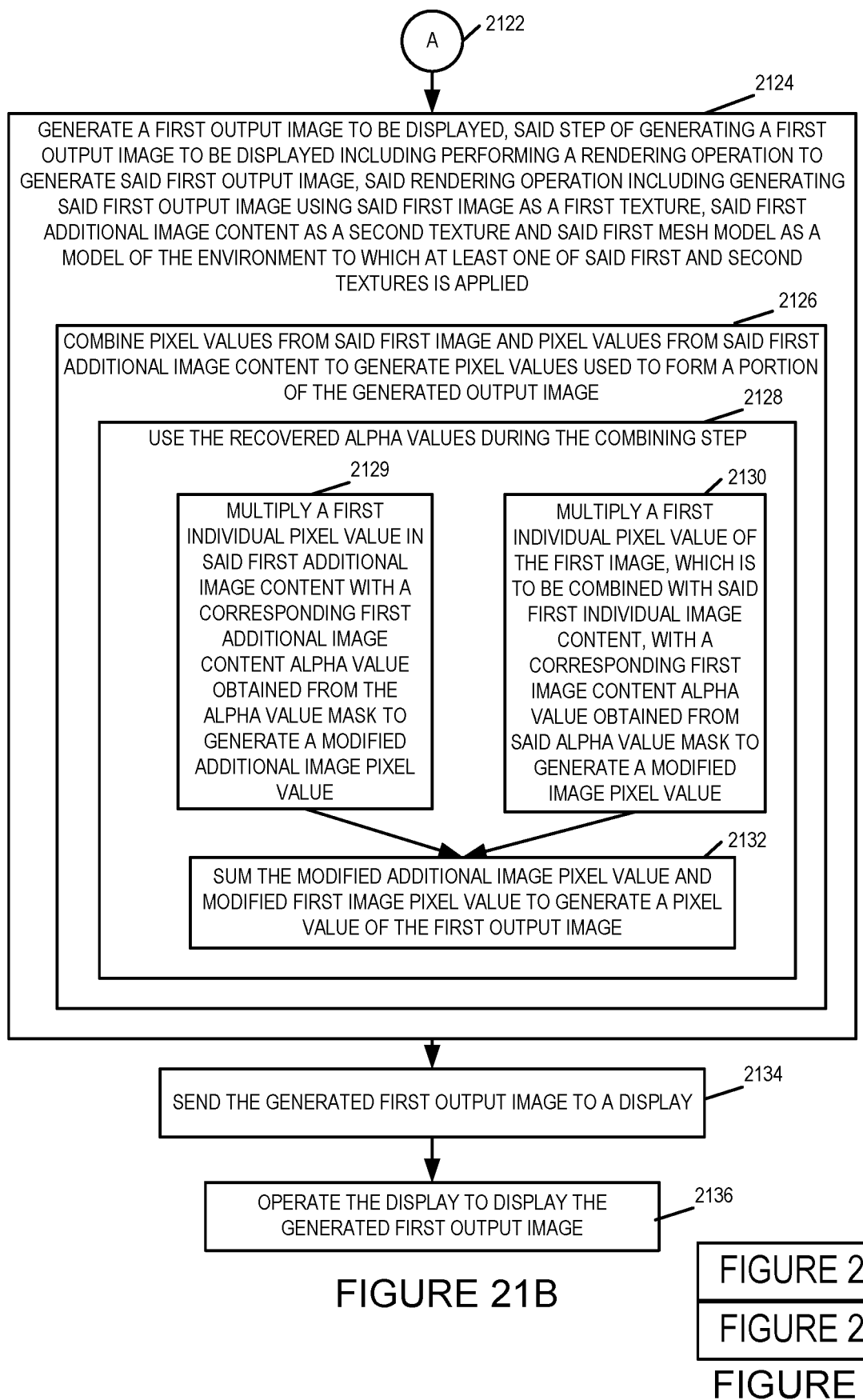

METHODS AND APPARATUS FOR COMMUNICATING AND/OR USING FRAMES INCLUDING A CAPTURED IMAGE AND/OR INCLUDING ADDITIONAL IMAGE CONTENT

RELATED APPLICATIONS

The present application claims the benefit of U.S. Provisional Patent Application Ser. No. 62/640,011, filed Mar. 7, 2018 and is a continuation in part of PCT/US18/21238 filed in the U.S. receiving office on Mar. 6, 2018, which claims benefit of U.S. Provisional patent application 62/467,813 filed Mar. 6, 2017, each of the listed application being hereby expressly incorporated by reference in their entirety.

FIELD

The present invention relates to methods and apparatus for capturing, streaming and/or playback of content, e.g., content communicated in a frame including at least one captured image.

BACKGROUND

Display devices which are intended to provide an immersive experience normally allow a user to turn his head and experience a corresponding change in the scene which is displayed. Head mounted displays sometimes support 360 degree viewing in that a user can turn around while wearing a head mounted display with the scene being displayed changing as the user's head position is changes.

In order to support 360 degrees of view, a 360 degree scene may be captured using multiple cameras, e.g., with multiple stereoscopic camera pairs or individual mono cameras, with the images being combined to generate the 360 degree scene which is to be made available for viewing.

Given transmission the constraints, e.g., network data constraints, associated with content being streamed, it may not be possible to stream the full 360 degree view in full high definition video to all customers seeking to receive and interact with the content. This is particularly the case where the content is stereoscopic content including image content intended to correspond to left and right eye views to allow for a 3D viewing effect.

In the case of stereoscopic camera rigs, wide angle lenses, e.g., fisheye camera lenses, may be used to capture a wide viewing area.

While fisheye lenses may capture a wide viewing area, the captured image may only occupy a portion of a frame due to the way a fisheye lens directs light onto a sensor. This can result in portions of a frame being encoded with no useful image content when the captured images are encoded as they are and sent to a playback device.

Efficient use of available bandwidth is a technical problem that remains to be addressed. This is particularly the case where fish eye lenses are used to capture images to be communicated. Given the limited bandwidth available for communicating content to a playback device it would be desirable if methods and/or apparatus could be developed which could efficiently communicate images and/or other content to a playback device without wasting bandwidth that might normally be used to communicate blank portions of a frame that is used to communicate an image captured using a fisheye lens.

As part of making efficient use of available bandwidth used to communicate a frame, it would be desirable if in at least some embodiments portions of a frame could be used to communicate additional image content, e.g., content captured by a different camera than the camera used to capture an image communicated in a large portion of the frame and content that is provided by another source of image content. In addition, while not necessary for all embodiments it would be desirable if at least some embodiments could be implemented using standard encoders and/or if at least some embodiments allowed for information about additional content or its use to be communicated to a playback device.

In addition to efficient use of bandwidth and/or data constraints on encoded image content existing playback systems normally simply decode and display a single image that is received in a frame. How to efficiently and/or effectively communicate image content and/or control use of a playback device which receives image content is a technical problem which needs to be addressed particularly where image content from multiple different sources is communicated in a single frame with different image content to be treated differently by a playback device. There is a need for methods and/or apparatus that allow a playback device to use different portions of a frame differently with potentially some content not being displayed at given times and/or content communicated in a frame being combined or replaced with other content communicated in the same frame during playback. To support such functionality there is a need for methods and/or apparatus which not only allow image content to be communicated by also information on how to use the content and/or other information which is important to rendering images using communicated image content.

In view of the above discussion it should be appreciated that there is a need for methods and apparatus for receiving, transmitting and/or using image content from one or more cameras along with additional content in a frame.

SUMMARY

Methods and apparatus for packing one or more images into a frame and/or including additional image content, e.g., a captured image, text, ad, and/or graphics are described. Various described methods and apparatus are well suited for use in systems including a stereoscopic camera pair and including a HD encoder or an ultra HD encoder but the methods and apparatus are not limited to such embodiments.

In various embodiments an image of a portion of an environment is included in a frame along with additional image content. The image of the environment, e.g., first image content, may have and in many cases is captured using a camera with a fish eye lens. The fish eye lens concentrates light on a sensor with the portion of the environment occupying less than a full frame, e.g., a circular center portion of a rectangular frame. Additional image content from another camera or a server is inserted into portions of the frame that is not used to communicate the captured image of the environment. In some embodiments left and right eye images captured by different cameras are packed into a single frame with additional image content to support stereoscopic viewing.

To facilitate use of the additional image content along with the image of the environment that is packed and encoded into a frame, additional content information is included with encoded content generated by an encoder. The additional content information may and sometimes does include information about when the additional image content should be used, e.g., to replace environmental image content that would otherwise be used or combined with environmental image content communicated in the same or different frame than the frame in which the additional image content is communicated.

To facilitate use of the image content provided in a frame, in addition to the image content a playback device can be and in some embodiments is supplied with a first mesh model, e.g., a mesh mode of an environment. In various embodiments during image rendering the playback device applies portions of the first image of the environment communicated in a frame, as a first texture, to corresponding portions of the mesh model of the environment.

During rendering the playback device may and also sometimes does use the additional image content, e.g., as a second texture. The additional image content communicated in a frame that also communicates an image of a portion of the environment can be applied, and sometimes is applied, as a second texture to a portion, e.g., one or more segments, of the environmental mesh model. As part of the application the additional mage content can be combined or used in place of a portion of the image of the environment, e.g., communicated in the same frame.

Rather than mapping the additional image content to the same environmental model, in some cases the additional image content is applied as a texture to an optional second model, e.g., model of a scoreboard, ball or other object in the environment which is modeled by the first mesh model. As part of additional content information the location of the second object in the environment is communicated to the playback device and the processor during rendering determine what portions of the additional object would obscure or replace one or more portions of the environment from the viewing perspective of the user for which the image is being rendered.

The environmental mesh model, optional additional mesh model, e.g., object model, maybe and sometimes are communicated to the playback device at the start of content streaming and/or at another point in time before the model or models are used. Additional content information can include information about the location where the additional object is to be positioned in the environment for a given frame, e.g., image, rendering operation. Thus the object maybe rendered at different locations in different frames even though the same object model maybe used.

In cases where a separate mesh model is not used for an object to which additional image content corresponds, the additional image content may map to the same segment of the environmental mesh model as a portion of the image communicated in the same frame.

Image mapping information, e.g., a UV map or UV maps, indicating how to map portions of a communicated frame to segments of the environmental mesh model and/or additional model of an object are communicated to the playback device in some embodiments, e.g., at the time the mesh model or models are communicated or at another time.

In various embodiments blending of portions of the image of the environment and portions of additional image content are supported. Such blending, implemented using alpha coefficients also sometimes referred to as alpha blending values, can help avoid sharp edges at the boundary where an image of an object is inserted into an image of a portion of an environment.

The alpha values can be used a pixel value multipliers with an alpha value corresponding to the additional image content multiplying a pixel value of the additional image content before the resulting value is combined, e.g., added to a modified or unmodified pixel value from the image of the environment. The environment pixel values maybe and sometimes multiplied by separate alpha values as part of the blending operation. The blending normally involve mixing of pixel values along edges of an inserted object or image with the inserted object or image pixel values completely replacing the values of the underlying environment layer towards the center of the inserted object. This near the center of the inserted object the pixel values of the inserted object are treated, in some but not necessarily all embodiments as being solid image portions while at the edge of the inserted object the object pixels maybe and times are treated as being partially translucent. In some embodiment the level of transparency increases closer to the edge of the inserted object and decreases or does not occur at the center of the inserted object.

In some embodiments alpha values when combining pixel values corresponding to a first image of an environment with additional image content are communicated in an alpha value mask. The alpha value mask is sent in some embodiments in additional content information but in other embodiments the alpha values are communicated as pixel values in a portion of the frame used to communicate the image of the environment and additional image content. The alpha value mask in some embodiments is sent in a reduced resolution format, e.g., with each alpha value being for use with multiple pixel values of the image portion to which the alpha values are to be applied. For example at a ¼ resolution one alpha value is sent for every four pixel values to which the alpha values are to be applied. In other embodiments alpha values are communicated at the same resolution as the pixel values with one alpha value communicated for each pixel value. In many cases one alpha value is communicated for a pixel with the alpha value multiplying each of the individual R, G and B pixel values communicated for the pixel as part of the compositing step.

In some embodiments the R,G and B pixel values of an image portion used to communicate an alpha value mask are each used to communicate an alpha value as opposed to a portion of an image. Thus in such embodiments the R, G, B pixel values recovered by a decoder in the playback device are interpreted as alpha values and are not used as pixel values.

In one such embodiment one color component is used to communicate background alpha values while another color component is used to communicate foreground pixel values. In such an embodiment consider for example that an R pixel value may be and sometimes is used to communicate an alpha value that will multiple the R,G and B pixel values of a background pixel value and the G pixel value corresponding to the same pixel of the alpha value mask maybe used as an alpha value to multiply the R, G and B pixel values of an additional image portion that will be combined with the pixel of the environmental image that was multiple by the alpha value communicated by the R pixel value.

While in some embodiments pixel values are used to communicate an alpha value mask in other embodiments the alpha value mask is communicated separately, e.g., as part of additional image content information that maybe communicated as metadata sent as part of encoded data generated by an encoder and recovered by the decoder of the playback device to which the encoded content is supplied.

A first exemplary method comprises: receiving a first image captured by a first camera using a first fish eye lens; and generating a composite image by combining a portion of the first image with additional image content; and operating an encoder to: i) receive the composite image and additional image content information; and ii) generate (1038) encoded content including a first encoded composite frame and said additional image content information.

An exemplary system implemented in some but not necessarily all embodiments comprises: a receiver for receiving a first image captured by a first camera using a first fish eye lens; and a compositor for generating a composite image by combining a portion of the first image with additional image content; and an encoder configured to: i) receive the composite image and additional image content information; and ii) generate encoded content including a first encoded composite frame and said additional image content information.

Another exemplary method, in accordance with some embodiments, comprises: receiving a first pair of images captured by a first stereoscopic camera pair, said first pair of images including at least a first image captured by a first camera and a second image captured by a second camera, said first camera being a left camera of said first stereoscopic camera pair, said second camera being a right camera of said first stereoscopic camera pair; receiving one or more additional images captured by one or more additional cameras; generating a composite image by combining said first and second with at least a third image to form a composite image, said third image being one of said one or more additional images; and encoding said composite image to generate a first encoded image including image content from said first, second and third images.

In some embodiments, the generated composite image is generated from four captured images corresponding to left and right cameras of two stereoscopic camera pairs and optionally includes additional image content. In some embodiments, the generated composite image is generated from four captured images corresponding to one stereoscopic camera pair and two mono cameras, and optionally includes additional image content. In various embodiments, the additional image content, e.g., a logo, texture, sign, text, an advertisement, etc., is inserted into an additional image content area, e.g., an area in which captured image content is not stored or located. In various embodiments, the cameras to be used as captured image input sources for a composite image to be generated are selected. For example, in one embodiment, a camera rig includes 3 stereoscopic camera pairs and 2 of the stereoscopic camera pairs are selected to be used as input sources for a particular composite image. In some such embodiments, at different times different cameras may be, and sometimes are, selected to be used as input sources for the composite images.

While various features have been mentioned in combination with regard to some exemplary embodiments in this summary the mention of a combination of features is not intended to indicate that such a combination of features or other features mentioned in this summary are required for, or necessary for, all embodiments.

In various embodiments, additional image content control information which controls the use of the additional image content during the rendering of an image using the image data included in the composite frame is encoded in or with the composite image, e.g., as metadata.

An exemplary playback method, in accordance with some embodiments. comprises: receiving content including a first frame, said first frame including a first image captured by a first camera and first additional image content from an additional content source, said first additional image content occupying a portion of said first frame which is smaller than the first image; receiving a first mesh model of a first portion of an environment to which said first image is to be applied as a texture; and generating a first output image to be displayed, said step of generating a first output image to be displayed including performing a rendering operation to generate said first output image, said rendering operation including generating said first output image using said first image as a first texture, said first additional image content as a second texture and said first mesh model as a model of an environment to which at least one of said first and second textures is applied.

An exemplary playback device, in accordance with some embodiments comprises: memory; and a processor configured to: receive content including a first frame, said first frame including a first image captured by a first camera and first additional image content from an additional content source, said first additional image content occupying a portion of said first frame which is smaller than the first image; receive a first mesh model of a first portion of an environment to which said first image is to be applied as a texture; and generate a first output image to be displayed, said step of generating a first output image to be displayed including performing a rendering operation to generate said first output image, said rendering operation including generating said first output image using said first image as a first texture, said first additional image content as a second texture and said first mesh model as a model of an environment to which at least one of said first and second textures is applied. In some embodiments, the exemplary playback device further includes a display configured to display the first output image.

While various embodiments have been discussed in the summary above, it should be appreciated that not necessarily all embodiments include the same features and some of the features described above are not necessary for all embodiments. Numerous additional features, embodiments and benefits of various embodiments are discussed in the detailed description which follows.

BRIEF DESCRIPTION OF THE FIGURES

FIG. 10B is a second part of flowchart of an exemplary method of receiving and processing captured images in accordance with an exemplary embodiment.

FIG. 10 comprises the combination of FIG. 10A and FIG. 10B.

FIG. 21B is a second part of a flowchart of an exemplary method of operating a playback device in accordance with an exemplary embodiment.

FIG. 21 comprises the combination of FIG. 21A and FIG. 21B.

DETAILED DESCRIPTION

Figure 1:
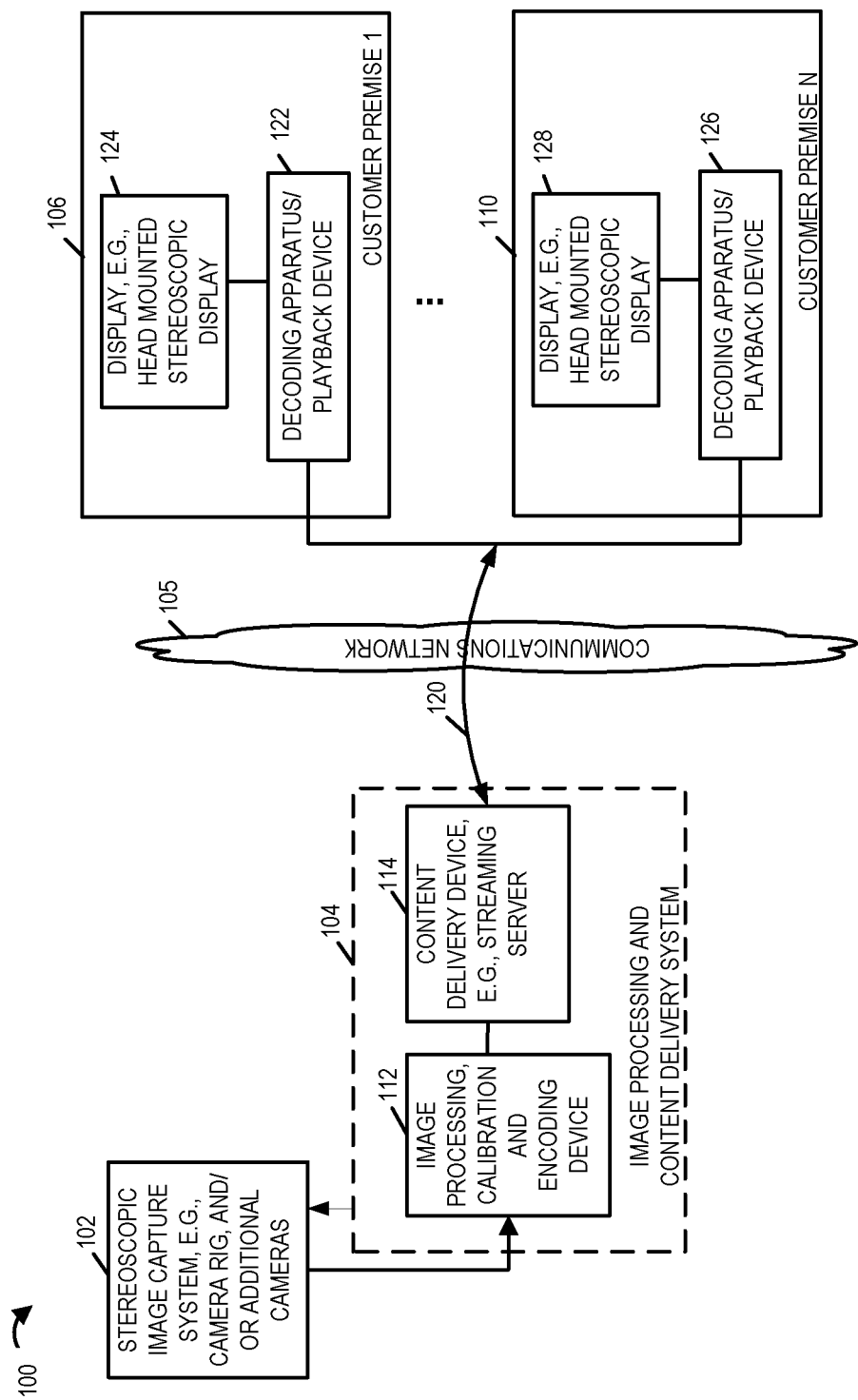
FIG. 1 illustrates an exemplary system implemented in accordance with some embodiments of the invention which can be used to capture, stream content, and output content to one or more users along in a synthesized environment.

FIG. 1 illustrates an exemplary system 100 implemented in accordance with some embodiments of the invention. The system 100 supports content delivery, e.g., imaging content delivery, to one or more customer devices, e.g., playback devices/content players, located at customer premises. The system 100 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of the invention. The communications network 105 may be, e.g., a hybrid fiber-coaxial (HFC) network, satellite network, and/or internet.

The content delivery system 104 includes an image processing, calibration and encoding apparatus 112 and a content delivery device, e.g. a streaming server 114. The image processing, calibration and encoding apparatus 112 is responsible for performing a variety of functions including camera calibration based on one or more target images and/or grid patterns captured during a camera calibration process, generation of a distortion correction or compensation mesh which can be used by a playback device to compensate for distortions introduced by a calibrated camera, processing, e.g., cropping and encoding of captured images, and supplying calibration and/r environmental information to the content delivery device 114 which can be supplied to a playback device and used in the rendering/image playback process. Content delivery device 114 may be implemented as a server with, as will be discussed below, the delivery device responding to requests for content with image calibration information, optional environment information, and one or more images captured by the camera rig 102 which can be used in simulating a 3D environment. Streaming of images and/or content maybe and sometimes is a function of feedback information such as viewer head position and/or user selection of a position at the event corresponding to a camera right 102 which is to be the source of the images. For example, a user may select or switch between images from a camera rig positioned at center line to a camera rig positioned at the field goal with the simulated 3D environment and streamed images being changed to those corresponding to the user selected camera rig. Thus it should be appreciated that a single camera rig 102 is shown in FIG. 1 multiple camera rigs may be present in the system and located at different physical locations at a sporting or other event with the user being able to switch between the different positions and with the user selections being communicated from the playback device 122 to the content server 114. While separate devices 112, 114 are shown in the image processing and content delivery system 104, it should be appreciated that the system may be implemented as a single device including separate hardware for performing the various functions or with different functions being controlled by different software or hardware modules but being implemented in or on a single processor.

The encoding apparatus 112 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content for delivering the encoded image content to one or more customer devices, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server are shown as separate physical devices in the FIG. 1 example, in some embodiments they are implemented as a single device which encodes and streams content. The encoding process may be a 3d, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include a plurality of devices/players, e.g., decoding apparatus to decode and playback/display the imaging content streamed by the content streaming device 114. Customer premise 1 106 includes a decoding apparatus/playback device 122 coupled to a display device 124 while customer premise N 110 includes a decoding apparatus/playback device 126 coupled to a display device 128. In some embodiments the display devices 124, 128 are head mounted stereoscopic display devices.

In various embodiments decoding apparatus 122, 126 present the imaging content on the corresponding display devices 124, 128. The decoding apparatus/players 122, 126 may be devices which are capable of decoding the imaging content received from the content delivery system 104, generate imaging content using the decoded content and rendering the imaging content, e.g., 3D image content, on the display devices 124, 128. Any of the decoding apparatus/playback devices 122, 126 may be used as the decoding apparatus/playback device 800 shown in FIG. 4. A system/playback device such as the one illustrated in FIG. 4 can be used as any of the decoding apparatus/playback devices 122, 126.

Figure 2:
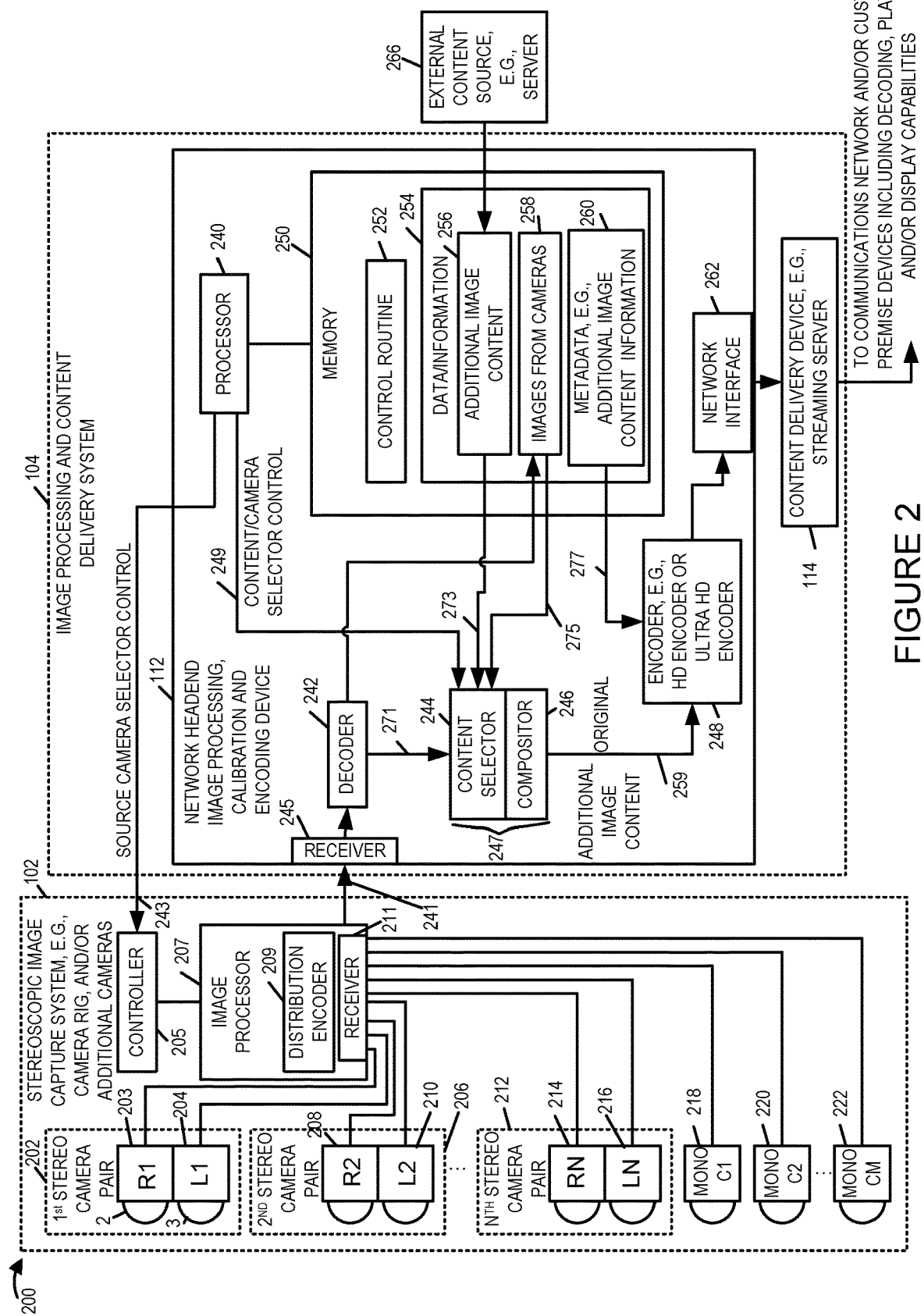
FIG. 2 illustrates the exemplary image capture system and the exemplary image processing and content delivery system of FIG. 1 in more detail in accordance with an exemplary embodiment.

FIG. 2 is a drawing 200 the illustrates the exemplary image capture system 102 and the exemplary image processing and content delivery system 104 of FIG. 1 in more detail in accordance with an exemplary embodiment. Drawing 200 of FIG. 2 further illustrates an external content source, e.g., a server 266, which can and sometimes is incorporated into a frame that includes a captured image of a portion of an environment as will be discussed further below with regard to FIG. 8 for example. The server 266 may be and sometimes is, the source of additional image content to be included in a composite image. The additional image content may be a wide variety of different types of content such as billboard score information, advertisements or content by a different camera than that of a main image included in a frame. The stereoscopic image capture system 102 of the system 200 can and often does include a plurality of stereoscopic camera pairs, e.g., first stereo camera pair 202, second stereo camera pair 206, Nth stereo camera pair 212. Each of the stereo camera pairs 202, 208, 212 includes a pair of left and right cameras (204, 203), (210, 208) and (216, 214). The left and right cameras capture left and right eye images of a portion of an environment at which the cameras of an individual camera pair are directed. By orienting different camera pairs in different directions a 360 degree image capture around the camera system is achieved in some embodiments. In addition to the stereo camera pairs (202, 206, 212) the image capture system 102 includes a plurality of mono cameras C1 218, C2 220, to camera CM 222. The mono cameras may be used in place of or in addition to the stereo camera pairs. For example mono image capture may be used for the ground and/or sky which may be of lower priority in some embodiments than in others. The left and right cameras of the stereo camera pairs 202, 206, 212 and the mono cameras 218, 220, 222 may and in at least some embodiments do use fish eye lenses which can capture a wide field of view. While fisheye lenses capture a wide field of view the capture image of the environment often only occupies a central portion of an image sensor, e.g., a circular center portion. Consider for example the captured image portion by a camera may only occupy the area 504 with the additional image area 502 available in a frame going to waste since light from the fisheye lens, used in some embodiments, is directed to the center portion of the sensor and not the edge portions.

Images captured by the cameras of the image capture system 102 are supplied to an image processor 207 which includes a receiver 211 and a distribution encoder 209. The receiver 211 receives captured images from the various cameras being used in the set of cameras (203, 204, 208, 210, 214, 216, 218, 220, . . . 222). The distribution encoder 209 encodes the captured images from the various cameras being used and then transmits them to the image processing and content delivery system 104 as represented by the arrow 241. While the image processing system 207 may encode and communicate the content from all cameras to the image processing and content delivery system 104 on an ongoing basis, due to bandwidth constraints it may be desirable to communicate a limited number of camera feeds at a given time. Controller 205 is coupled via line 243 to a processor 240 of the image processing system 104 and is connected to the image processor 207. The controller 205 can and sometimes does receive a source camera selector control signal via line 243 which it then responds to by controlling the image processor 207 to encode and send selected camera feeds, e.g., captured images from one or more stereo camera pairs and/or mono cameras to the image processing system 104 in encoded format.

The image processing and content delivery system 104 includes, in addition to processor 240, a receiver 245, a decoder 242, content selector and compositor device 247, an encoder 248 memory 250 and network interface 262. The processor 240 controls operation of the image processing and content delivery system and also sends source camera selector control signals to the image capture system 102, via line 243, to control which camera feeds are provided to the image processing sand content delivery system for processing at a given time. The processor 240 is coupled to the memory 250 and also to the content selector 244 of the content selector and compositor device 247. Processor 240, sends content selector control signal 249 to content selector 244, content selector 244 receives the content selector control signal 249. In this way the processor 240 can and does control the supply of image content from memory 250 to the content selector 244 which supplies the content to the compositor portion 246 of the content selector and compositor device 247. The compositor 246 will combine images from one or more cameras and/or additional image content to generate a frame which is then encoded along with corresponding metadata by encoder 248. A single captured image frame may be combined with additional image content, e.g., with the additional image content being placed in a location of a frame which does not include the captured portion of the environment captured using a fish eye lens. The additional content may be a portion of an image captured by another one of the cameras 218, 220, 222 or a camera of a camera pair, content such as a score to be displayed on a billboard and/or an advertisement for example. While individual frames may be encoded separately, in some embodiments multiple frames, including a captured image of the environment and/or additional image content, may be and sometimes are combined into a single HD or UHD frame, as will be explained further below, which is then encoded as a single frame by the encoder 248. Since the compositing is done by compositor 246 from the perspective of the encoder 248 it receives and encodes a sequence of individual frames which may or may not be composite frames. The encoder 248 can be and sometimes is an MPEG HD or Ultra HD video encoder but any of a wide variety of encoders 248 could be used.

The memory 250 which is coupled to processor 240 includes a control routine 252 which when executed by the processor 240 causes the processor 240 to control the image processing and content delivery system 104 to implement the methods of the present invention. Memory 250 stores additional image content 256 received from external content source 266 and supplies it under control of the processor 240 to content selector 244 for inclusion in one or more frames which are to be generated and output form the compositor. The memory 250 also stores images 258 from the cameras of the image capture system which are obtained from the decoder 242 which decodes the encoded images provided by the image capture system and stores them in memory 250. The content selector and compositor 247 receives additional image content and images from the cameras and generates, under direction of processor 240, composite frames there from which are then supplied by the compositor 246 to the encoder 248. Memory 250 also includes metadata 260 which is supplied to the encoder 248 for encoding and communication with encoded frames to which the metadata relates. The metadata may indicate, for example, how additional image content is to be used during rendering to generate an image to be displayed to a user and may identify one or more UV maps and/or mesh models to be used for a particular image that is generated by the encoder and/or mesh correction information to be used when rendering an output image from encoded image content. The metadata may and sometimes does indicate how captured images and/or additional image content has been packaged into an encoded frame thereby providing a playback device information on how to recover various image portions from an encoded frame so that the image content can be used as textures during image rendering. As part of the rendering processes portions of a frame are applied to a model or models as textures and the resulting image is then displayed. Additional image content communicated in a portion of a frame which might go unused since it is not used to communicate image content captured by a fish eye lens, e.g., a corner portion of a frame, maybe and sometimes is combined with image content captured by a fish eye lens and communicated in a frame. In this way what might otherwise be wasted frame portions is used in an efficient manner with additional content being communicated in the same frame including a captured image of a portion of an environment with which the additional image content is to be combined.

Encoded image frames generated by the encoder 248 which may and often will include additional image content and corresponding metadata, are output by the encoder 248 and supplied via network interface 262 to the content delivery device 114 for delivery, e.g., streaming, to one or more playback devices via a communications network.

Figure 3:
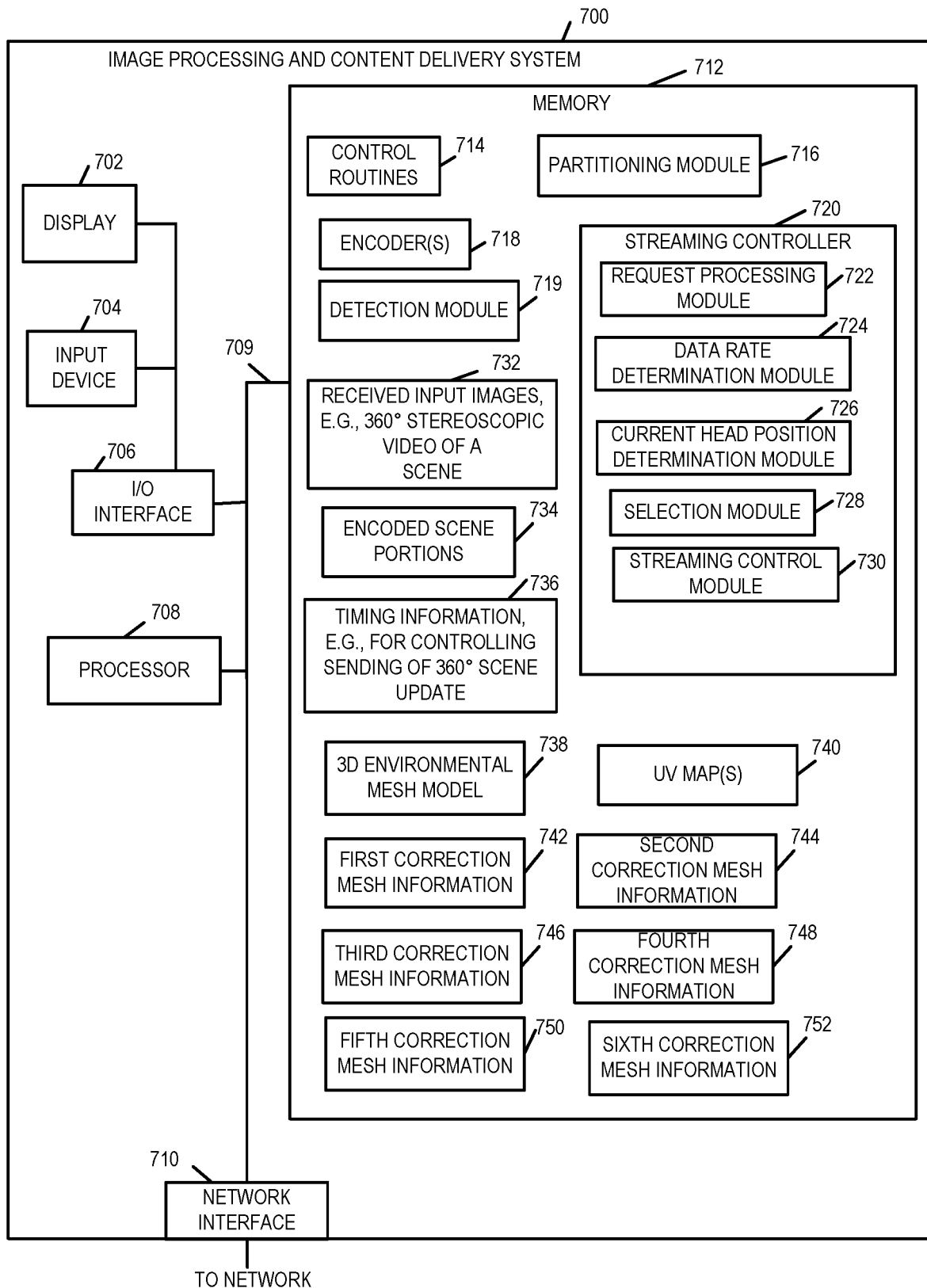
FIG. 3 illustrates an exemplary content delivery system encoding capability that can be used to encode and stream content in accordance with the features of the invention.

FIG. 3 illustrates an exemplary image processing and content delivery system 700 with encoding capability that can be used to encode and stream content in accordance with the features of the invention.

The system may be used to perform encoding, storage, and transmission and/or content output in accordance with the features of the invention. In some embodiments the system 700 or the elements therein perform the operation corresponding to the process illustrated in FIG. 6 and FIG. 23. The image processing and content delivery system 700 may be used as the system 104 of FIG. 1. While the system shown in FIG. 3 is used for encoding, processing and streaming of content, it should be appreciated that the system 700 may also include the ability to decode and display processed and/or encoded image data, e.g., to an operator.

The system 700 includes a display 702, input device 704, input/output (I/O) interface 706, a processor 708, network interface 710 and a memory 712. The various components of the system 700 are coupled together via bus 709 which allows for data to be communicated between the components of the system 700.

The memory 712 includes various modules, e.g., routines, which when executed by the processor 708 control the system 700 to implement the partitioning, encoding, storage, and streaming/transmission and/or output operations in accordance with the invention.

The memory 712 includes various modules, e.g., routines, which when executed by the processor 707 control the computer system 700 to implement the immersive stereoscopic video acquisition, encoding, storage, and transmission and/or output methods in accordance with the invention. The memory 712 includes control routines 714, a partitioning module 706, encoder(s) 718, a detection module 719, a streaming controller 720, received input images 732, e.g., 360 degree stereoscopic video of a scene, encoded scene portions 734, timing information 736, an environmental mesh model 738, UV maps(s) 740 and a plurality of correction mesh information sets including first correction mesh information 742, second correction mesh information 744, third correction mesh information 746, fourth correction mesh information 748, fifth correction mesh information 750 and sixth correction mesh information 752. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The control routines 714 include device control routines and communications routines to control the operation of the system 700. The partitioning module 716 is configured to partition a received stereoscopic 360 degree version of a scene into N scene portions in accordance with the features of the invention.

The encoder(s) 718 may, and in some embodiments do, include a plurality of encoders configured to encode received image content, e.g., 360 degree version of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 718 is the encoded scene portions 734 which are stored in the memory for streaming to customer devices, e.g., playback devices. The encoded content can be streamed to one or multiple different devices via the network interface 710.

The detection module 719 is configured to detect a network controlled switch from streaming content from a current camera pair, e.g., first stereoscopic camera pair, to another camera pair, e.g., a second or third stereoscopic camera pair. That is the detection module 719 detects if the system 700 has switched from streaming content stream generated using images captured by a given stereoscopic camera pair, e.g., a first stereoscopic camera pair, to streaming content stream generated using images captured by another camera pair. In some embodiments the detection module is further configured to detect a user controlled change from receiving a first content stream including content from the first stereoscopic camera pair to receiving a second content stream including content from the second stereoscopic camera pair, e.g., detecting a signal from user playback device indicating that the playback device is attached to a different content stream than a content to which it was attached previously. The streaming controller 720 is configured to control streaming of encoded content for delivering the encoded image content to one or more customer devices, e.g., over the communications network 105. In various embodiments various steps of the flowchart 600 and/or flowchart 2300 are implemented by the elements of the streaming controller 720.

The streaming controller 720 includes a request processing module 722, a data rate determination module 724, a current head position determination module 726, a selection module 728 and a streaming control module 730. The request processing module 722 is configured to process a received request for imaging content from a customer playback device. The request for content is received in various embodiments via a receiver in the network interface 710. In some embodiments the request for content includes information indicating the identity of requesting playback device. In some embodiments the request for content may include data rate supported by the customer playback device, a current head position of the user, e.g., position of the head mounted display. The request processing module 722 processes the received request and provides retrieved information to other elements of the streaming controller 720 to take further actions. While the request for content may include data rate information and current head position information, in various embodiments the data rate supported by the playback device can be determined from network tests and other network information exchange between the system 700 and the playback device.

The data rate determination module 724 is configured to determine the available data rates that can be used to stream imaging content to customer devices, e.g., since multiple encoded scene portions are supported the content delivery system 700 can support streaming content at multiple data rates to the customer device. The data rate determination module 724 is further configured to determine the data rate supported by a playback device requesting content from system 700. In some embodiments the data rate determination module 724 is configured to determine available data rate for delivery of image content based on network measurements.

The current head position determination module 726 is configured to determine a current viewing angle and/or a current head position of the user, e.g., position of the head mounted display, from information received from the playback device. In some embodiments the playback device periodically sends current head position information to the system 700 where the current head position determination module 726 receives ad processes the information to determine the current viewing angle and/or a current head position.

The selection module 728 is configured to determine which portions of a 360 degree scene to stream to a playback device based on the current viewing angle/head position information of the user. The selection module 728 is further configured to select the encoded versions of the determined scene portions based on available data rate to support streaming of content.

The streaming control module 730 is configured to control streaming of image content, e.g., multiple portions of a 360 degree stereoscopic scene, at various supported data rates in accordance with the features of the invention. In some embodiments the streaming control module 730 is configured to control stream N portions of a 360 degree stereoscopic scene to the playback device requesting content to initialize scene memory in the playback device. In various embodiments the streaming control module 730 is configured to send the selected encoded versions of the determined scene portions periodically, e.g., at a determined rate. In some embodiments the streaming control module 730 is further configured to send 360 degree scene update to the playback device in accordance with a time interval, e.g., once every minute. In some embodiments sending 360 degree scene update includes sending N scene portions or N-X scene portions of the full 360 degree stereoscopic scene, where N is the total number of portions into which the full 360 degree stereoscopic scene has been partitioned and X represents the selected scene portions recently sent to the playback device. In some embodiments the streaming control module 730 waits for a predetermined time after initially sending N scene portions for initialization before sending the 360 degree scene update. In some embodiments the timing information to control sending of the 360 degree scene update is included in the timing information 736. In some embodiments the streaming control module 730 is further configured identify scene portions which have not been transmitted to the playback device during a refresh interval; and transmit an updated version of the identified scene portions which were not transmitted to the playback device during the refresh interval.

In various embodiments the streaming control module 730 is configured to communicate at least a sufficient number of the N portions to the playback device on a periodic basis to allow the playback device to fully refresh a 360 degree version of said scene at least once during each refresh period.

Figure 13:
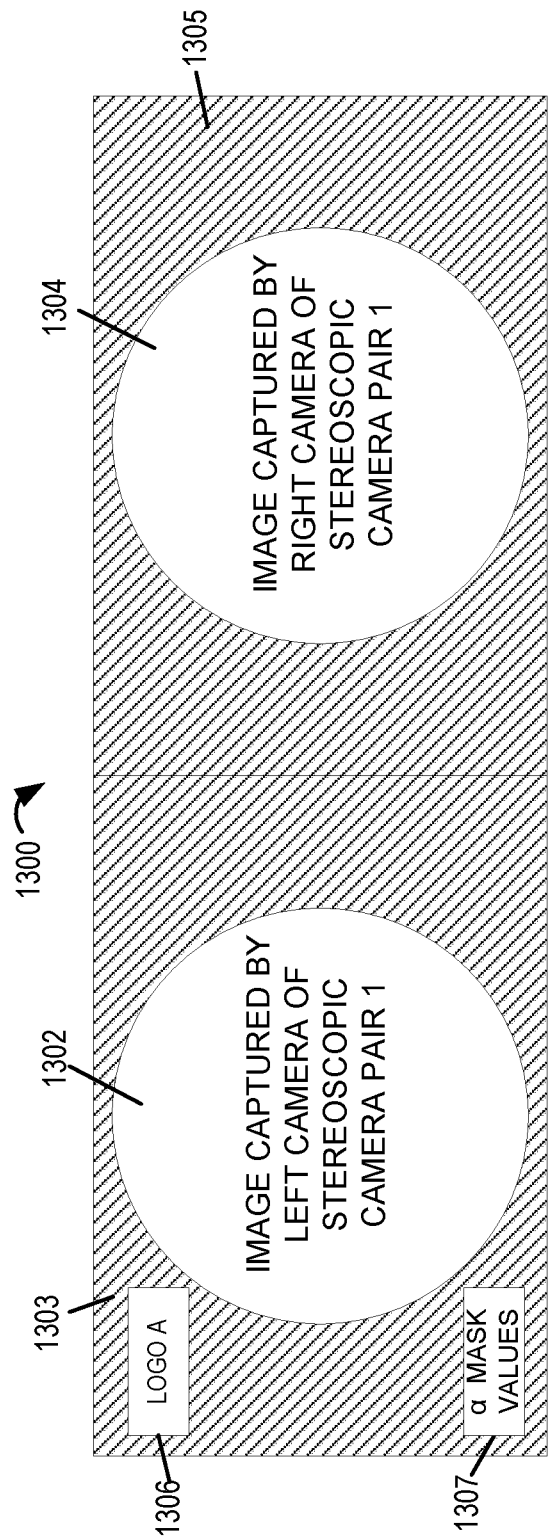
FIG. 13 illustrates an example in which the combined image to be encoded includes captured images from a pair of stereoscopic cameras, additional image content, and alpha mask values in accordance with an exemplary embodiment.

In some embodiments streaming controller 720 is configured to control the system 700 to transmit, e.g., via a transmitter in the network interface 710, a stereoscopic content stream (e.g., encoded content stream 734) including encoded images generated from image content captured by one or more cameras, e.g., cameras of stereoscopic camera pairs such as illustrated in FIG. 13. In some embodiments streaming controller 720 is configured to control the system 700 to transmit, to one or more playback devices, an environmental mesh model 738 to be used in rendering image content. In some embodiments streaming controller 720 is further configured to transmit to a playback device a first UV map to be used for mapping portions of images captured by a first stereoscopic camera pair to a portion of the environmental mesh model as part of a image rendering operation.

In various embodiments the streaming controller 720 is further configured to provide (e.g., transmit via a transmitter in the network interface 710) one or more sets of correction mesh information, e.g., first, second, third, fourth, fifth, sixth, correction mesh information to a playback device. In some embodiments the first correction mesh information is for use in rendering image content captured by a first camera of a first stereoscopic camera pair, the second correction mesh information is for use in rendering image content captured by a second camera of the first stereoscopic camera pair, the third correction mesh information is for use in rendering image content captured by a first camera of a second stereoscopic camera pair, the fourth correction mesh information is for use in rendering image content captured by a second camera of the second stereoscopic camera pair, the fifth correction mesh information is for use in rendering image content captured by a first camera of a third stereoscopic camera pair, the sixth correction mesh information is for use in rendering image content captured by a second camera of the third stereoscopic camera pair. In some embodiments the streaming controller 720 is further configured to indicate, e.g., by sending a control signal, to the playback device that the third and fourth correction mesh information should be used when content captured by the second stereoscopic camera pair is streamed to the playback device instead of content from the first stereoscopic camera pair. In some embodiments the streaming controller 720 is further configured to indicate to the playback device that the third and fourth correction mesh information should be used in response to the detection module 719 detecting i) a network controlled switch from streaming content from said first stereoscopic camera pair to said second stereoscopic pair or ii) a user controlled change from receiving a first content stream including content from said first stereoscopic camera pair to receiving a second content stream including encoded content from the second stereoscopic camera pair.

The memory 712 further includes the environmental mesh model 738, UV map(s) 740, and sets of correction mesh information including first correction mesh information 742, second correction mesh information 744, third correction mesh information 746, fourth correction mesh information 748, fifth correction mesh information 750 and sixth correction mesh information 752. The system provides the environmental mesh model 738 to one or more playback devices for use in rendering image content. The UV map(s) 740 include at least a first UV map to be used for mapping portions of images captured by the first stereoscopic camera pair to a portion of the environmental mesh model 738 as part of a image rendering operation. The first correction mesh information 742 includes information generated based on measurement of one or more optical characteristics of a first lens of said first camera of the first stereoscopic camera pair and the second correction mesh includes information generated based on measurement of one or more optical characteristic of a second lens of said second camera of the first stereoscopic camera pair. In some embodiments the first and second stereoscopic camera pairs correspond to a forward viewing direction but different locations at an area or event location where content is being captured for streaming.

In some embodiments the processor 708 is configured to perform the various functions corresponding to the steps discussed in flowcharts 600 and/or 2300. In some embodiments the processor uses routines and information stored in memory to perform various functions and control the system 700 to operate in accordance with the methods of the present invention. In one embodiments the processor 708 is configured to control the system to provide the first correction mesh information and the second correction mesh information to a playback device, the first correction mesh information being for use in rendering image content captured by the first camera, the second correction mesh information being for use in rendering image content captured by the second camera. In some embodiments the first stereoscopic camera pair corresponds to a first direction and the processor is further configured to control the system 700 to transmit a stereoscopic content stream including encoded images generated from image content captured by the first and second cameras. In some embodiments the processor 708 is further configured to transmit to the playback device an environmental mesh model to be used in rendering image content. In some embodiments the processor 708 is further configured to transmit to the playback device a first UV map to be used for mapping portions of images captured by the first stereoscopic camera pair to a portion of the environmental mesh model as part of a image rendering operation. In some embodiments the processor 708 is further configured to control the system 700 to provide third correction mesh information and fourth correction mesh information to the playback device, the third correction mesh information being for use in rendering image content captured by a first camera of a second stereoscopic camera pair, the fourth correction mesh information being for use in rendering image content captured by a second camera of the second stereoscopic camera pair. In some embodiments the processor 708 is further configured to control the system 700 to indicate (e.g., transmit via network interface 710) to the playback device that the third and fourth correction mesh information should be used when content captured by the second camera pair is streamed to the playback device instead of content from the first camera pair. In some embodiments the processor 708 is further configured to control the system 700 to indicate to the playback device that the third and fourth correction mesh information should be used in response to the system detecting: i) a network controlled switch from streaming content from the first stereoscopic camera pair to the second stereoscopic pair or ii) a user controlled change from receiving a first content stream including content from the first stereoscopic camera pair to receiving a second content stream including encoded content from the second stereoscopic camera pair. In some embodiments the processor 708 is further configured to control the system 700 to system to provide the fifth and sixth correction mesh information to the playback device, the fifth correction mesh information being for use in rendering image content captured by the first camera of the third stereoscopic camera pair, the sixth correction mesh information being for use in rendering image content captured by the second camera of the third stereoscopic camera pair.

Figure 4:
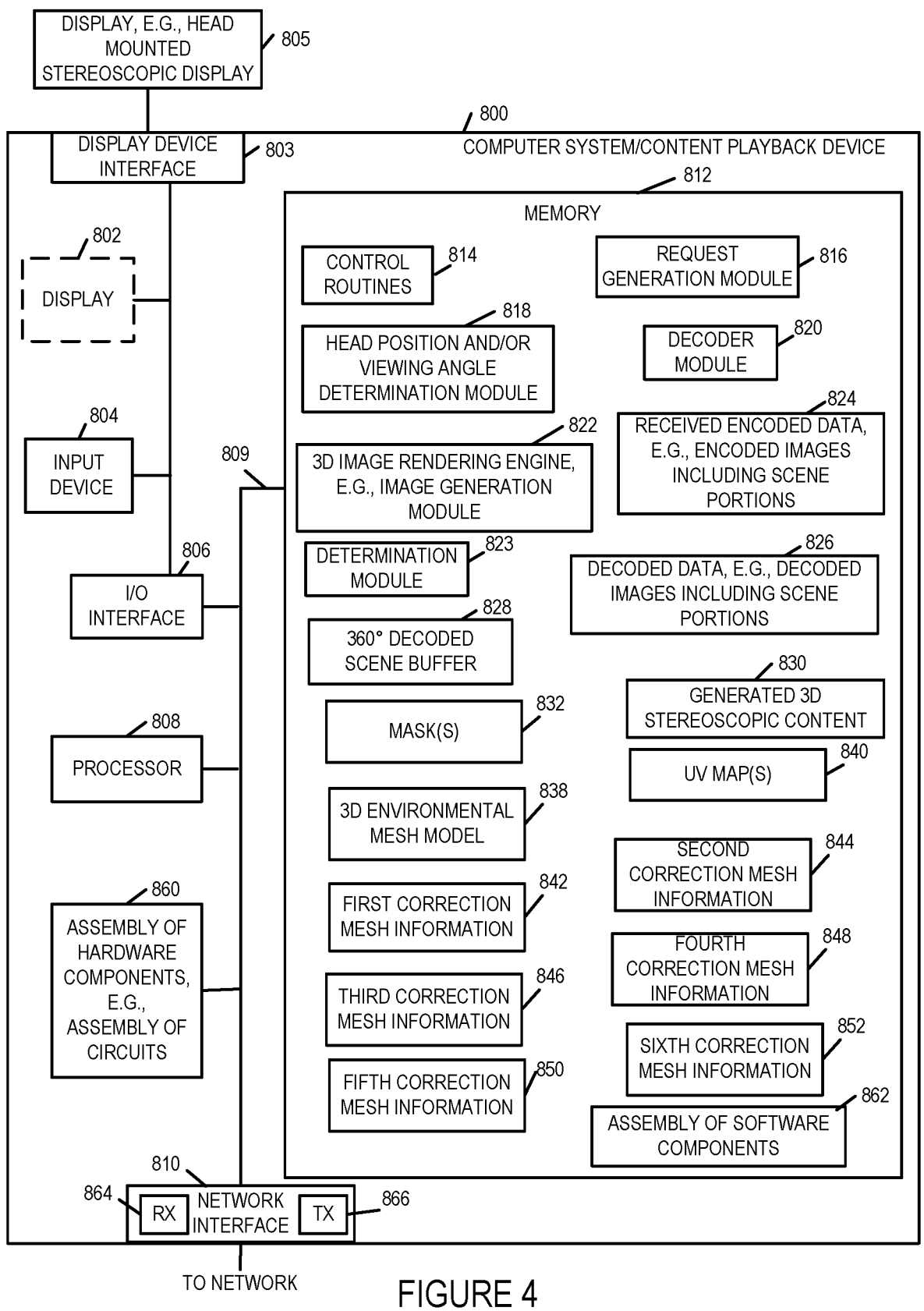
FIG. 4 illustrates an exemplary content playback device that can be used to receive, decode and display the content streamed by the system of FIG. 3.
Figure 7:
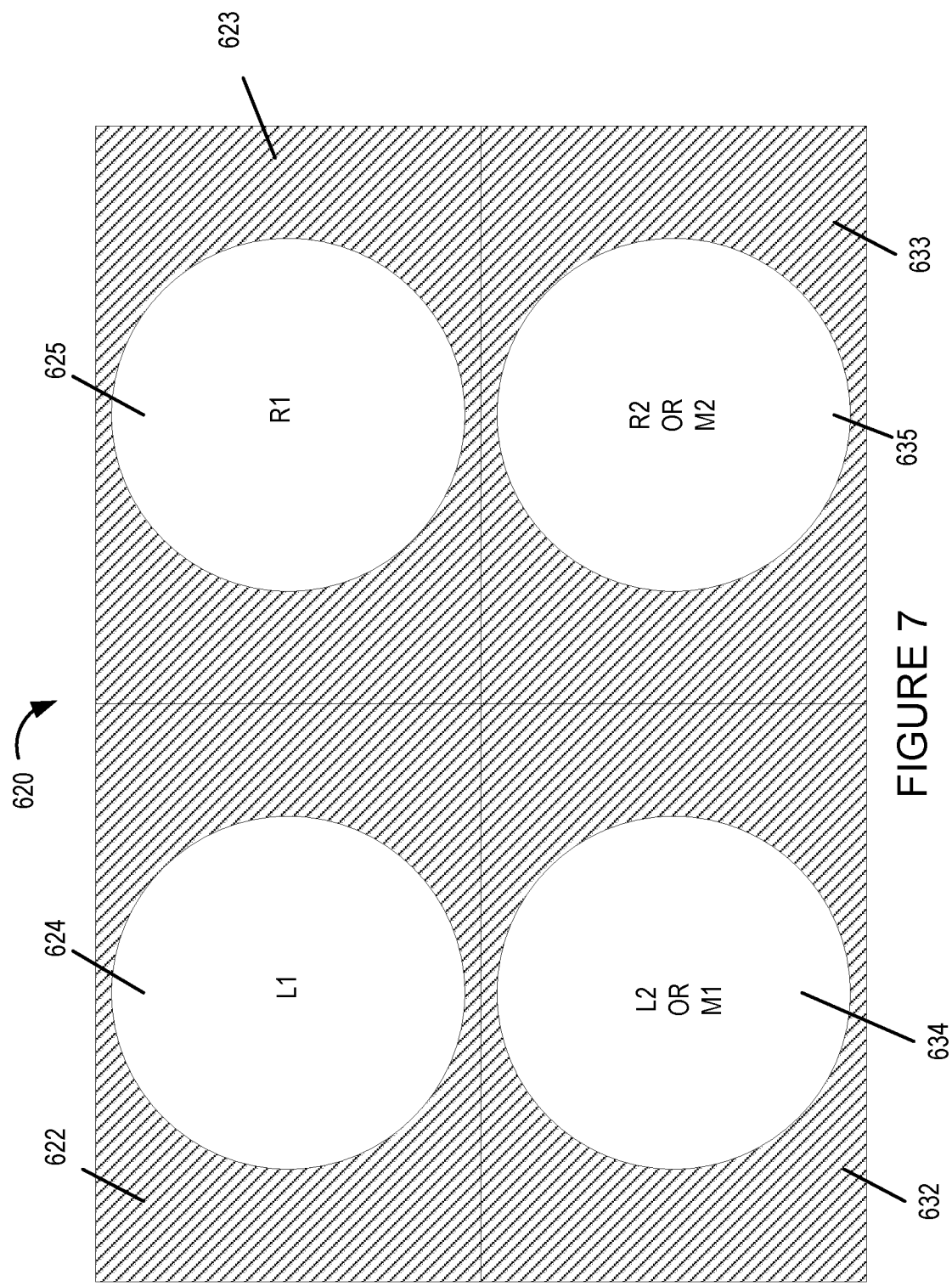
FIG. 7 illustrates four images, e.g., corresponding to images captured by 2 pairs of stereoscopic cameras or by 1 pair of stereoscopic cameras and two mono cameras, which may be combined into a single composite image and encoded using a HD encoder or ultra HD encoder, in accordance with an exemplary embodiment.

FIG. 4 illustrates a computer system/playback device 800 implemented in accordance with the present invention which can be used to receive, decode, store and display imaging content received from a content delivery system such as the one shown in FIGS. 1 and 7. The playback device may be used with a 3D head mounted display such as the OCULUS RIFT™ VR (virtual reality) headset which may be the head mounted display 805. The device 800 includes the ability to decode the received encoded image data and generate 3D image content for display to the customer. The playback device in some embodiments is located at a customer premise location such as a home or office but may be located at an image capture site as well. The device 800 can perform signal reception, decoding, display and/or other operations in accordance with the invention.

The device 800 includes a display 802, a display device interface 803, input device 804, input/output (I/O) interface 806, a processor 808, an assembly of hardware components 860, e.g., an assembly of circuits, network interface 810 and a memory 812. The various components of the playback device 800 are coupled together via bus 809 which allows for data to be communicated between the components of the system 800. While in some embodiments display 802 is included as an optional element as illustrated using the dashed box, in some embodiments an external display device 805, e.g., a head mounted stereoscopic display device, can be coupled to the playback device via the display device interface 803.

Via the I/O interface 806, the system 800 can be coupled to external devices to exchange signals and/or information with other devices. In some embodiments via the I/O interface 806 the system 800 can receive information and/or images from an external device and output information and/or images to external devices. In some embodiments via the interface 806 the system 800 can be coupled to an external controller, e.g., such as a handheld controller.

The processor 808, e.g., a CPU, executes routines 814 and modules in memory 812 and uses the stored information to control the system 800 to operate in accordance with the invention. The processor 808 is responsible for controlling the overall general operation of the system 800. In various embodiments the processor 808 is configured to perform functions that have been discussed as being performed by the playback system 800.

Via the network interface 810 the system 800 communicates and/or receives signals and/or information (e.g., including encoded images and/or video content corresponding to a scene) to/from various external devices over a communications network, e.g., such as communications network 105. Network interface 810 includes a receiver (RX) 864 and a transmitter (TX) 866. In some embodiments the system receives one or more content streams including encoded images captured by one or more different cameras via the network interface 810 from the content delivery system 700. The received content stream may be stored as received encoded data, e.g., encoded images 824. In some embodiments the interface 810 is configured to receive a first encoded image including image content captured by a first camera and a second encoded image corresponding to a second camera. The network interface 810 includes a receiver 864 and a transmitter 866 via which the receiving and transmitting operations are performed. In some embodiments the interface 810 is configured to receive correction mesh information corresponding to a plurality of different cameras including first correction mesh information 842, second correction mesh information 844, third correction mesh information 846, fourth correction mesh information 848, fifth correction mesh information 850 and sixth correction mesh information 852 which are then stored in memory 812. Furthermore in some embodiments via the interface 810 the system receives one or more mask(s) 832, an environmental mesh model 838, UV maps(s) 840 which are then stored in memory 812.

The memory 812 includes various modules, e.g., routines, which when executed by the processor 808 control the playback device 800 to decoding and output operations in accordance with the invention. The memory 812 includes assembly of software components 862, control routines 814, a request for content generation module 816, a head position and/or viewing angle determination module 818, a decoder module 820, a stereoscopic image rendering engine 822 also referred to as a 3D image generation module, a determination module, and data/information including received encoded image content 824, decoded image content 826, a 360 degree decoded scene buffer 828, generated stereoscopic content 830, mask(s) 832, an environmental mesh model 838, UV maps(s) 840 and a plurality of received correction mesh information sets including first correction mesh information 842, second correction mesh information 844, third correction mesh information 846, fourth correction mesh information 848, fifth correction mesh information 850 and sixth correction mesh information 852.

The control routines 814 include device control routines and communications routines to control the operation of the device 800. The request generation module 816 is configured to generate a request for content to send to a content delivery system for providing content. The request for content is sent in various embodiments via the network interface 810. The head position and/or viewing angle determination module 818 is configured to determine a current viewing angle and/or a current head position of the user, e.g., position of the head mounted display, and report the determined position and/or viewing angle information to the content delivery system 700. In some embodiments the playback device 800 periodically sends current head position information to the system 700.

The decoder module 820 is configured to decode encoded image content 824 received from the content delivery system 700 to produce decoded image data, e.g., decoded images 826. The decoded image data 826 may include decoded stereoscopic scene and/or decoded scene portions. In some embodiments the decoder 820 is configured to decode the first encoded image to generate a first decoded image and decode the second received encoded image to generate a second decoded image. The decoded first and second images are included in the stored decoded image images 826.

The 3D image rendering engine 822 performs the rendering operations (e.g., using content and information received and/or stored in memory 812 such as decoded images 826, environmental mesh model 838, UV map(s) 840, masks 832 and mesh correction information) and generates 3D image in accordance with the features of the invention for display to the user on the display 802 and/or the display device 805. The generated stereoscopic image content 830 is the output of the 3D image generation engine 822. In various embodiments the rendering engine 822 is configured to perform a first rendering operation using the first correction information 842, the first decoded image and the environmental mesh model 838 to generate a first image for display. In various embodiments the rendering engine 822 is further configured to perform a second rendering operation using the second correction information 844, the second decoded image and the environmental mesh model 838 to generate a second image for display. In some such embodiments the rendering engine 822 is further configured to use a first UV map (included in received UV map(s) 840) to perform the first and second rendering operations. The first correction information provides information on corrections to be made to node positions in the first UV map when the first rendering operation is performed to compensate for distortions introduced into the first image by a lens of the first camera and the second correction information provides information on corrections to be made to node positions in the first UV map when the second rendering operation is performed to compensate for distortions introduced into the second image by a lens of the second camera. In some embodiments the rendering engine 822 is further configured to use a first mask (included in mask(s) 832) to determine how portions of the first image are combined with portions of a first image corresponding to a different field of view as part of the first rendering operation when applying portions of the first image to a surface of the environmental mesh model as part of the first rendering operation. In some embodiments the rendering engine 822 is further configured to use the first mask to determine how portions of the second image are combined with a portions of a second image corresponding to the different field of view as part of the second rendering operation when applying portions of the second image to the surface of the environmental mesh model as part of the second rendering operation. The generated stereoscopic image content 830 includes the first and second images (e.g., corresponding to left and right eye views) generated as a result of the first and second rendering operation. In some embodiments the portions of a first image corresponding to a different field of view correspond to a sky or ground field of view. In some embodiments the first image is a left eye image corresponding to a forward field of view and the first image corresponding to a different field of view is a left eye image captured by a third camera corresponding to a side field of view adjacent the forward field of view. In some embodiments the second image is a right eye image corresponding to a forward field of view and wherein the second image corresponding to a different field of view is a right eye image captured by a fourth camera corresponding to a side field of view adjacent the forward field of view. Thus the rendering engine 822 renders the 3D image content 830 to the display. In some embodiments the. The operator of the playback device 800 may control one or more parameters via input device 804 and/or select operations to be performed, e.g., select to display 3D scene.

The network interface 810 allows the playback device to receive content from the streaming device 114 and/or communicate information such as view head position and/or position (camera rig) selection indicating selection of particular viewing position at an event. In some embodiments the decoder 820 is implemented as a module. In such embodiments when executed the decoder module 820 causes received images to be decoded while 3D image rendering engine 822 causes further processing of the images in accordance with the present invention and optionally stitching of images together as part of the presentation process.

In some embodiments the interface 810 is further configured to receive additional mesh correction information corresponding to a plurality of different cameras, e.g., third, fourth, fifth and sixth mesh correction information. In some embodiments the rendering engine 822 is further configured to use mesh correction information corresponding to a fourth camera (e.g., fourth mesh correction information 848) when rendering an image corresponding to a fourth camera, the fourth camera being one of the plurality of different cameras. The determination module 823 is configured to determine which mesh correction information is to be used by the rendering engine 822 when performing a rendering operation based on which camera captured image content is being used in the rendering operation or based an indication from a server indicating which mesh correction information should be used when rendering images corresponding to a received content stream. The determination module 823 may be implemented as part of the rendering engine 822 in some embodiments.

In some embodiments the modules and/or elements shown in the memory 712 of FIG. 3 and memory 812 of FIG. 4 are implemented as software modules. In other embodiments the modules and/or elements, while shown to be included in the memory, are implemented in hardware, e.g., as individual circuits with each element being implemented as a circuit for performing the function corresponding to the element. In still other embodiments the modules and/or elements are implemented using a combination of software and hardware.

Figure 8:
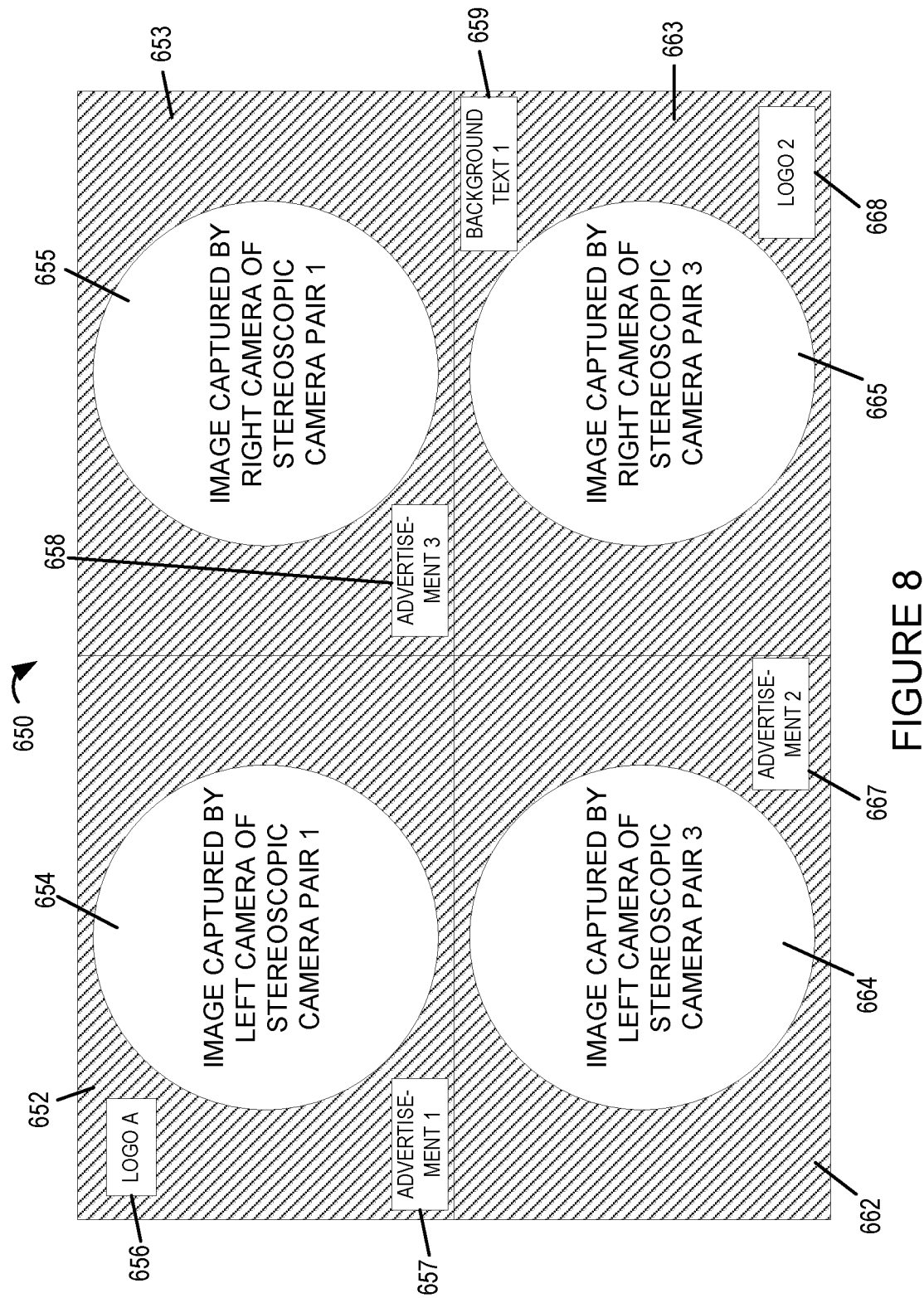
FIG. 8 illustrates an example in which the combined image to be encoded, e.g., by an HD encoder or an ultra HD encoder, includes captured images from two pairs of stereoscopic cameras and additional image content, in accordance with an exemplary embodiment.

While shown in FIGS. 7 and 8 to be included in the memory, the elements shown included in the system 700 and 800 can, and in some embodiments are, implemented fully in hardware within the processor, e.g., as individual circuits, of the corresponding device, e.g., within the processor 708 in case of the content delivery system and within the processor 808 in the case of playback system 800. In other embodiments some of the elements are implemented, e.g., as circuits, within the corresponding processors 708 and 808 with other elements being implemented, e.g., as circuits, external to and coupled to the processors. As should be appreciated the level of integration of modules on the processor and/or with some modules being external to the processor may be one of design choice. Alternatively, rather than being implemented as circuits, all or some of the elements may be implemented in software and stored in the memory, with the software modules controlling operation of the respective systems 700 and 800 to implement the functions corresponding to the modules when the modules are executed by their respective processors, e.g., processors 708 and 808. In still other embodiments, various elements are implemented as a combination of hardware and software, e.g., with a circuit external to the processor providing input to the processor which then under software control operates to perform a portion of a module's function.

While shown in each of FIGS. 3 and 4 embodiments as a single processor, e.g., computer, it should be appreciated that each of the processors 708 and 808 may be implemented as one or more processors, e.g., computers. When one or more elements in the memory 712 and 812 are implemented as software modules, the modules include code, which when executed by the processor of the corresponding system (e.g., processor 708 and 808) configure the processor to implement the function corresponding to the module. In embodiments where the various modules shown in FIGS. 7 and 8 are stored in memory, the memory is a computer program product comprising a computer readable medium comprising code, e.g., individual code for each module, for causing at least one computer, e.g., processor, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 3 control and/or configure the system 700 or elements therein such as the processor 708, to perform the functions of corresponding steps of the methods of the present invention, e.g., such as those illustrated and/or described in the flowchart of FIG. 10. Similarly the modules illustrated in FIG. 4 control and/or configure the system 800 or elements therein such as the processor 808, to perform the functions of corresponding steps of the methods of the present invention.

Figure 5:
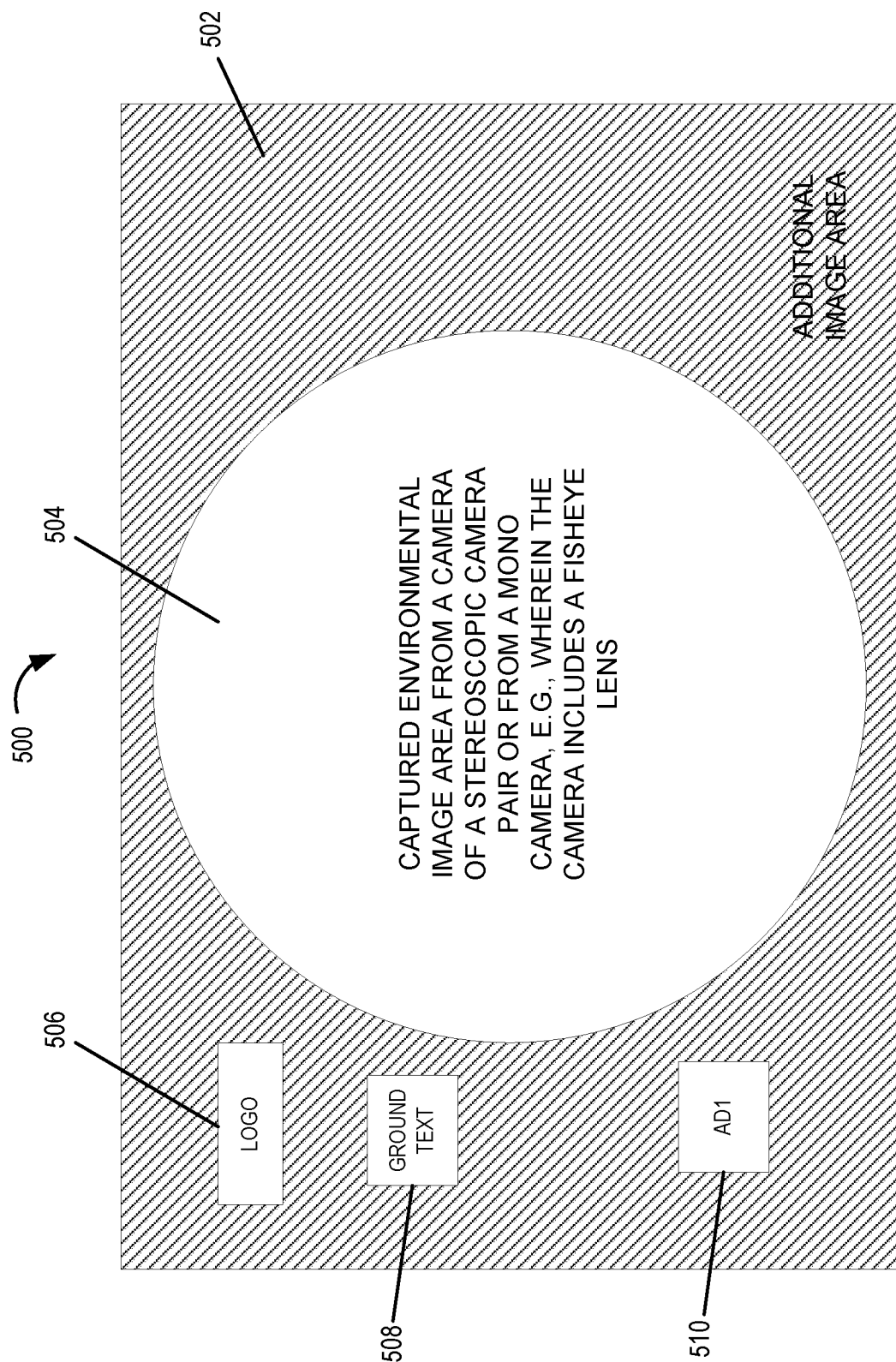
FIG. 5 illustrates an exemplary image to be encoded, the image including a captured environmental image area from a camera, e.g., a camera including a fisheye lens, of a stereoscopic image pair of cameras or a mono camera, and an additional image area, in which additional image content has been inserted in the additional image area in accordance with an exemplary embodiment.

FIG. 5 illustrates an exemplary image to be encoded, the image including a captured environmental image area from a camera, e.g., a camera including a fisheye lens, of a stereoscopic image pair of cameras or a mono camera, and an additional image area, in which additional content has been placed in the additional image area in accordance with an exemplary embodiment. The image 500 is a composite image in that it includes a logo 506, ground text 508 an Advertisement AD1 510 which were combined with a captured image 504 prior to being output by compositor 246 to the encoder 248. In FIG. 5 the area 504 corresponds to the image captured by a camera of the image capture system using a fish eye lens. In the example the captured image portion 504 of the frame with the additional image area 502 not being used to capture the environmental portion due to the way the fish eye lens directs light onto the sensor. This additional image area 502 is used in accordance with the invention to communicate additional image content. e.g., a portion of an image captured by another camera different from the one that captured the image portion shown in area 504 or additional content such as an advertisement supplied by a server. The location of the additional image content 506, 508, 510 and information on how and/or when it should be used is communicated in some embodiments as metadata included in the encoded frame conveying the image 500.

While in some embodiments the composite frame 500 is encoded as an individual frame in other embodiments it is one portion of a larger composite image. In one embodiment, the image shown in FIG. 5 represents one quarter of a combined composite image that is generated in an embodiment in which a UHD (Ultra High Definition) encoder is used to generate, e.g., encode, 4 images that were combined into a single UHD image by the compositor 246.0

Figure 6:
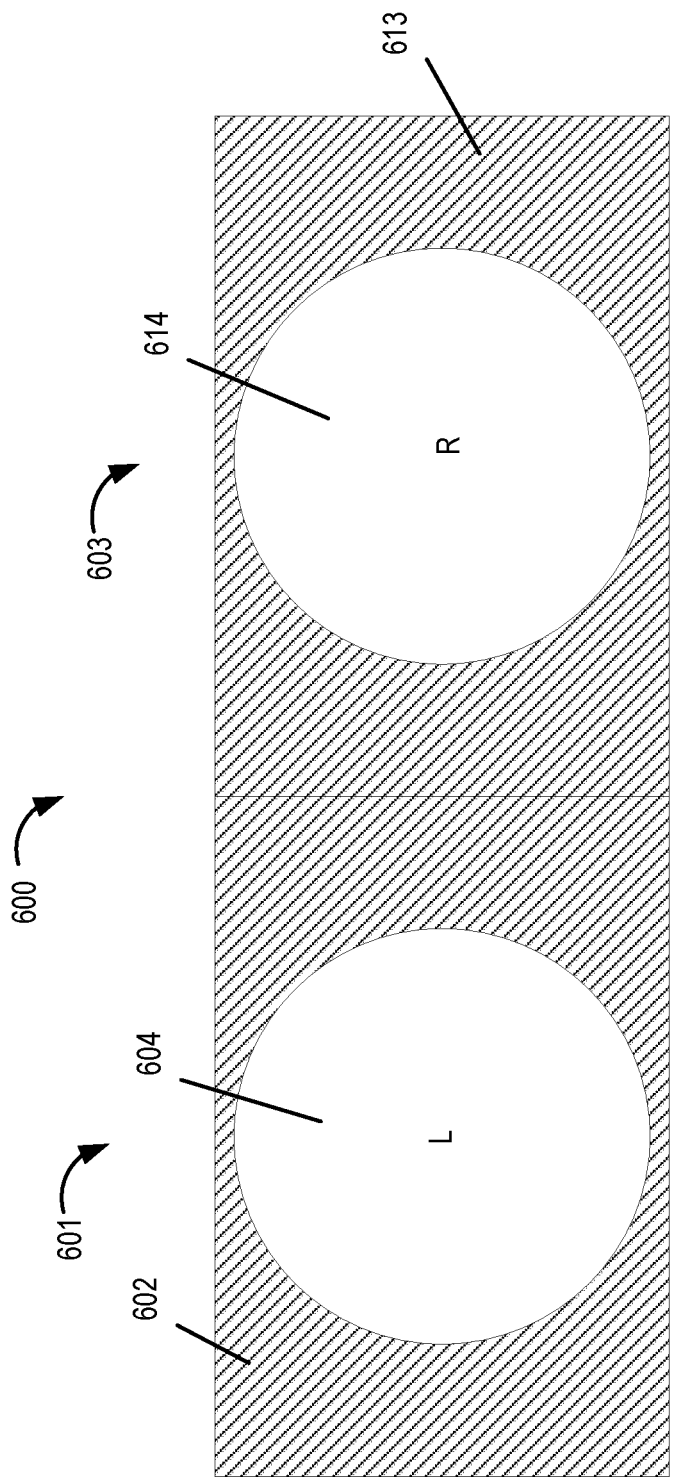
FIG. 6 illustrates a pair of exemplary images to be encoded, each image corresponding to one of the cameras of a stereoscopic image pair.

FIG. 6 illustrates a pair 600 of exemplary images to be encoded, each image corresponding to one of the cameras (203, 204) (208, 210) or (214, 216) of a stereoscopic image pair that was captured using fish eye lenses. The pair 600 includes a left eye image 601 and a right eye 603 image which are captured by different cameras of a stereo camera pair. The left eye image 601 includes a captured image area 604 and an additional unused image area 602. Similarly the right eye image 603 includes a captured right eye view portion 614 of an environment surrounded by an additional image area 613.

FIG. 7 illustrates a composite frame formed from four images 624, 625, 634, 635, e.g., corresponding to two pairs of images captured by 2 pairs of stereoscopic cameras or by 1 pair of stereoscopic cameras and two mono cameras, which are combined into a single composite image and encoded using a HD encoder or an ultra HD encoder, in accordance with an exemplary embodiment. Note that additional image data is not included in areas 622, 623, 632, 634 these image portions will be wasted since they do not include an image of an environment or additional content.

FIG. 8 illustrates an example in which the combined image 650 to be encoded, e.g., by an HD encoder or ultra HD encoder, includes captured images 654, 655, 664, 665 from two pairs of stereoscopic cameras and additional content 656, 657, 658, 667, 668, in accordance with an exemplary embodiment. Note that the additional content is included in the portions 652, 653, 662, 663 which are not used to communicate the images captured by the stereo pairs using fish eye lenses. While the additional content is communicated in a corner area or central frame portion which would otherwise go unused, it can be used in any number of displayed images, e.g., in both the left and right eye images or a single image at playback time with the metadata included in the encoded frame generated by encoding image 650 providing information on how and when the additional image content is to be used.

Figure 9:
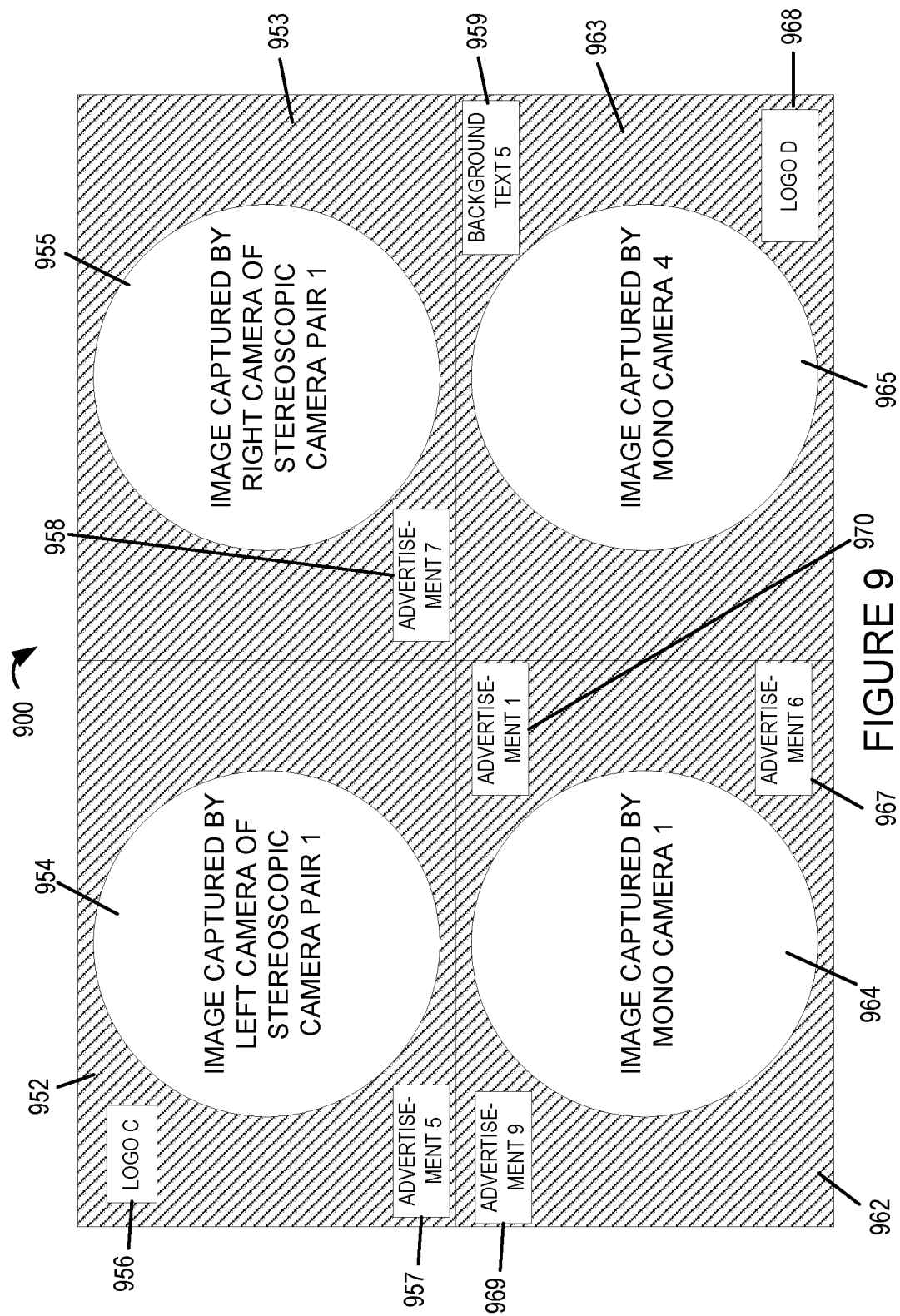
FIG. 9 illustrates an example in which the combined image to be encoded, e.g., by an HD encoder or an Ultra HD encoder, includes captured images from one pair of stereoscopic cameras, two mono cameras, and additional image content, in accordance with an exemplary embodiment.

FIG. 9 illustrates another example 900 in which the combined image to be encoded, e.g., by an HD encoder or ultra HD encoder, includes captured images and additional image content. In the FIG. 9 example a single stereo pair of images 954, 955 is communicated in the same frame as two images 964, 965 captured by different mono cameras. The composite image 900 includes additional image content 956 included in additional image area 952, advertisement 958 included in additional image area 953, advertisements 969, 970 and 967 included in additional image area 962 and text 959 along with LOGO D 968 in additional image area 963. from one pair of stereoscopic cameras, two mono cameras, and additional content, in accordance with an exemplary embodiment.

Figure 10A:
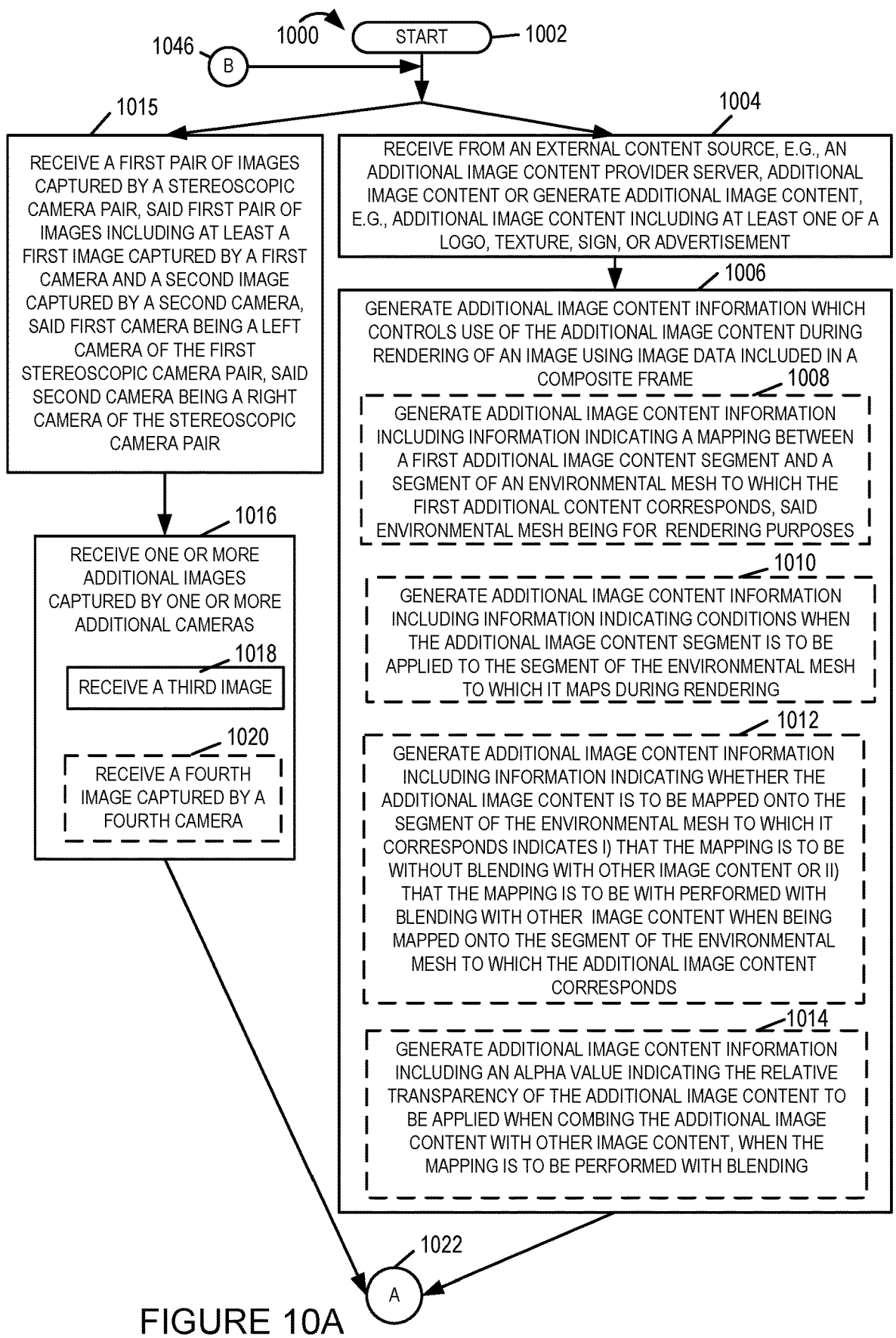
FIG. 10A is a first part of flowchart of an exemplary method of receiving and processing captured images in accordance with an exemplary embodiment.

FIG. 10, comprises the combination of FIG. 10A and FIG. 10B, and shows steps of a method of the invention which can be implemented using one or more components of a system such as the one shown in FIG. 2.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

The method 1000 beings in start step 1002 with the system shown in FIG. 2 being powered on. Operation proceeds from start step 1002 to steps 1015 and 1004 which are steps in two different processing branches which can be performed in parallel.

The first processing path begins with step 1015 and relates to receipt of images captured by one or more cameras, e.g., cameras with fish eye lenses in some embodiments. The receipt of the images in steps 1015 is from memory and may be, and sometimes is, performed by the combined content selector and compositor device 247. Prior to this step the images captured by the cameras of the image capture system 102 may be, and sometimes are, received by the receiver 245 and/or decoder 242 which receive captured images either directly or indirectly from the cameras used to capture images. The decoder 242 decodes the encoded images captured by the capture system, e.g., from image processor 207, and stored the images in memory 250 in the set of images from the cameras 258. The cameras from which the images are obtained may be, and sometimes are, cameras of a stereo camera pair 202, 206, 212 or mono cameras 218, 220, 222. The images 258 from the cameras are supplied to the content selector and compositor device 247, either directly from decoder 242 or from memory 250. Thus in step 1015 the content selector and compositor device 247 receives a first pair of images captured by a stereoscopic camera pair for processing. The first pair of images captured by a stereoscopic camera pair, received in step 1015 may be the same or similar to the images shown in FIG. 6. As part of steps 1015 at least a first image captured by a first camera and a second image captured by a second camera are received where the first and second cameras are cameras of the first stereoscopic camera pair 202.

Operation proceeds from step 1015 to step 1016 in which one or more additional images captured by one or more additional cameras, e.g., cameras of another stereo pair 206, 212 or mono cameras 218, 220, 222 are received, e.g., by the content selector and compositor device 247. Step 1016 includes receiving at least a third image in sub step 1018 and optionally includes receiving a fourth image captured by a fourth camera in sub-step 1020. Operation proceeds via connecting node 1022 to step 1024.

Processing along the second processing path which begins with step 1004 relates to receiving and/or generating additional image content which can be included in a frame to be communicated to a playback device, e.g., along with image content captured by a camera using a fish eye lens.

In step 1004 additional image content is received by the image processing and content delivery system 104 and stored in the memory 250 so that it is available for use by the content selector and compositor device 247. The additional content is received from an external content source, e.g., server 266, and includes in some embodiments at least one of a logo, texture, sign, or advertisement.

Operation proceeds from step 1004 to step 1006 in which the image processing and content delivery system 104 under control of processor 240 generates additional image content information. This information can be included with an encoded frame as metadata that is communicated with, e.g., as part of, the encoded frame. In some embodiments the generated additional image content information controls when and/or how the additional image content will be used during image rendering to generate a rendered image from a composite frame, e.g., a composite frame including a captured image captured by a camera and at least some additional image content. In some embodiments the additional image content was captured by another camera or obtained from the external content source 266.

Step 1006 includes one or more of steps 1008, 1010, 1012, and 1014 which may be, and sometimes are, performed by the processor 240 of the image processing and content delivery system 104. In step 1008 the image processing and content delivery system 104 generates, e.g., by operating the processor 240 to perform the generation step, additional image content information including information indicating a mapping between a first additional image content segment and a segment of an environmental mesh to which the first additional content corresponds. In some cases the environmental mesh is a model of a portion of an environment to which the first additional image content segment is to be applied as a texture during image rendering. In this way, the playback device can be, and sometimes is, informed by the additional image content information of how to use the additional image content, e.g., as a texture.

In step 1010 the image processing and content delivery system 104 generates, e.g., by operating the processor 240 to perform the generation step, additional image content information including information indicating conditions when the additional image content segment is to be applied to the segment of the environmental mesh to which it maps during rendering. This condition information allows use of the additional image content to be dependent on one or more conditions, e.g., a portion of the captured image being rendered, a time or date upon which rendering is occurring, user information which allowed for selection of which of a plurality of additional images are to be displayed, etc. Thus date and/or other constraints can be placed on use of additional image content so that content which is time relevant or directed to a particular audience can be selectively used based on the information and known playback time or viewer information or some other condition such as the geographic location where the playback is occurring. Thus for example one advertisement (ad) may be displayed if playback occurs in one geographic location because the playback device is located in one state or city and another ad, received in a frame as additional content, may be included during rendering in the image generated by the playback device from a received encoded frame if the playback occurs at another geographic location, e.g, another state or city.

In step 1012 the image processing and content delivery system 104 generates, e.g., by operating the processor 240 to perform the generation step, additional image content information including blending information. It should be appreciated that additional image content to be communicated in a frame with captured image content corresponding to a portion of an environment may correspond to the same segment of an environmental mesh model to which image portions are applied as textures during rendering with the intention that the additional image content replace or be combined with the captured portion of the environment corresponding to the same segment of the environmental model. In some embodiments the information generated in step 1012 indicates whether the additional image content is to be mapped onto the segment of the environmental mesh to which it corresponds without blending with other image content, e.g., captured image content of a portion of an environment, or that the mapping is to be performed with blending with other image content. For example the information generated in step 1012 may indicate that the additional image content is to be blended with captured image content corresponding to a portion of an environment that was captured and included in main captured environmental image portion of a frame or if the additional image content is to be used as a texture in place of a portion of the captured environmental image portion.

In step 1014 the image processing and content delivery system 104 generates, e.g., by operating the processor 240 to perform the generation step, additional image content information including an alpha value indicating the relative transparency of the additional image content to be applied when combining the additional image content with other image content, e.g., a image of a portion of an environment, when mapping of the image portions is to be performed with blending. Thus when the additional image content maps to the same portion of a model during rendering the alpha value will control how transparent the additional image content is when applied as a texture or if the additional image content is to be applied as a solid texture fully covering other image content corresponding to the same portion of the model of the environment. It should be appreciated that in many embodiments the rendered image generated by a playback device will include the result of applying the additional image content to the corresponding portion, e.g., segment of a model of the environment with the alpha value in at least some embodiments controlling the level of transparency of the additional image portion applied as a texture.

The received images of the environment that were captured by one or more cameras are supplied to the content selector and compositor 247 as indicated by the arrows 271 (from decoder 242), 275 (from memory) as shown in FIG. 2 for use in generating a composite image to be encoded. Thus the image output by the compositor 246 will be a composite image including what may be referred to as an original captured image portion and additional image content. The original captured image portion may be, and sometimes is, an image from a selected camera feed while the additional image content may be text, ads or other content that was selected by the content selector 244 in response to or under control of the content selector control signal 249. Thus the content selector control signal 249 serves as both a source camera selector as well as an additional image content selector control that controls what content will be selected by content selector 244 for composing.

The additional information generated in step 1006 is supplied to the encoder 248 as represented by arrow 277 for inclusion in an encoded frame or as metadata corresponding to an encoded frame which also includes a composite frame supplied from the compositor 246 to the encoder 248.

Operation proceeds from step 1006 to step 1024 via connecting node A 1022. Thus by the time step 1024 is reached, the image content and delivery system 104 will have received images of an environment captured by one or more cameras, additional image content, and additional image content information will have been generated and be available for encoding.

In step 1024 the content selection and compositor device 247 receives a content selection control signal which includes a camera selection control signal which indicates where additional images should be obtained from for combining with the first and second images received from what may be considered the primary stereoscopic camera pair. Step 1024 is used in embodiments where four frames are to be combined, e.g., composited, into one UHD frame for encoding purposes. Step 1024 may be omitted when packing of four frames into a UHD frame is not being implemented and a single frame is to be encoded or a pair of first and second frames it to be composited and encoded. In the case where a single stereo pair of frames is to be encoded a single camera feed may be supplied to the image processing and content delivery system 104 with the source camera selector control signal sent to the controller 205 controlling which camera pair servers as the source of captured images. However in other embodiments the system 104 receives images captured by multiple camera pairs and the content selector control signal 249 is used to control which images are selected for composting.

In some embodiments steps 1024 includes step 1026 while in other embodiments step 1024 includes step 1028. In step 1026 the content selector and compositor device 247 receives a camera selection control signal that specifies a stereoscopic camera pair (202, 206 or 212) to be used as the source of third and fourth images. The camera selection control signal received in step 1026 may be and sometimes is part of signal 249. In step 1028 the content selector and compositor device 247 receives a camera selection control signal specifying two different mono cameras (218, 220, 222) to be used as the sources of the third and fourth images.

The content selector control signal 249 indicates in addition to one or more captured images, additional image content to be included in a composite image to be encoded, e.g., in locations not used for the main captured images. The compositor content selector and compositor 247 is responsive to the content selector control to combine one or more identified images captured by a camera or cameras with the additional image content in a way that the additional image content does not occupy the space occupied by the main captured images of the environment. FIGS. 5, 8 and 9 show various examples of composite images that may be, and sometimes are, generated by the compositor 246 and supplied to the encoder 248 via line 259 for encoding.

With the image content for compositing having been identified by the content/camera selector control signal 249, operation proceeds from step 1024 to compositing step 1030 which may be, and sometimes is, implemented by the compositor portion 246 of the content selector and compositor device 247.

In step 1030 a composite image is generated. The composite image includes one or more images of the environment, along with some additional image content. The images of the environment were captured using fish eye lenses, in some but not necessarily all embodiments. The composite image can, and sometimes does, include one, two or four images of the environment, depending on the embodiment, along with additional image content placed in the images at locations, e.g., corner and middle frame locations, where it does not interfere with the images of the environment captured using the fish eye lens or lenses.

Step 1030 in some embodiments includes step 1036. Step 1030 may also include step 1034 in some embodiments. In step 1036 the compositor inserts into the composite image, e.g., composite frame, being generated, in an additional image area, additional image content. The additional image content is image content that was not captured by the camera or cameras which supply the image or images of the environment included in the composite image. The additional image content in some embodiments includes at least one of a logo, texture, sign or advertisement. Other information maybe includes ad well such as text or other information. The sign may include text or other information such as scores, the name of a team, etc. In optional step 1034, which is used in embodiments where four frames are packed into a single frame for encoding purposes, e.g., as a UHD frame, the first, second, third and fourth images are combined to generate a composite image. Additional image content is added to the composite image in step 1036.

In step 1027 an encoder 248 receives the composite frame and additional image content information which can include control information as well as information indicating how one or more segments of additional image content included in the composite frame being encoded should be applied as textures to a corresponding segment or segments of a mesh model by a playback device during image rendering. In this way the encoder 248 receives not only the composite image but information which can be used to control use of the additional image content in the composite image, e.g., information that can be used to determine what additional image content is to be used at a given time and how such additional image content should be used during an image rendering operation used to generate an image to be displayed to a user of a playback device.

The composite image generated in step 1030 including at least one image of an environment and additional image content, is supplied to the encoder 248 and encoded in step 1038. In step 1038 the encoding produces encoded content including an embodiment image including the image content from one or more captured images and the additional image content. The encoded content also includes at least some of the additional image content information 260 which can be included in the generated encoded content, e.g., a set of encoded image and control information, as metadata or as part of the generated encoded frame.

Step 1038 includes in some embodiments includes step 1040 and/or step 1042. In step 1040 an ultra high definition television encoder is used to encode the composite image. Use of such an encoder is optional and other coders may be used in some embodiments. In step 1042 the additional image content information is encoded in or with the composite image, e.g., as data embedded in the image or as metadata communicated with the encoded pixel values representing the encoded image. Operation proceeds from step 1038 to step 1044 where the first encoded images is stored and/or output. The output of the generated encoded image is to the content delivery device 114 via network interface 262 in some embodiments. The content delivery device 114 may be a streaming server which streams the generated encoded images including or with the metadata conveying the additional image information to a playback device which can decode, recover and use both the image or images of the environment and/or additional image content in a rendering operation which generates an image to be displayed to a user of the playback device.

With an encoded frame having been output, operation proceeds from step 1044, via connecting node B 1046, back to steps 1015, 1004 where additional frames and/or additional image content are processed as part of generating another encoded frame for streaming to a playback device. The image capture and encoding may and sometimes does occur in real time allowing images to be captured and streamed with additional image content while a sporting event or other activity is still ongoing.

Figure 11:
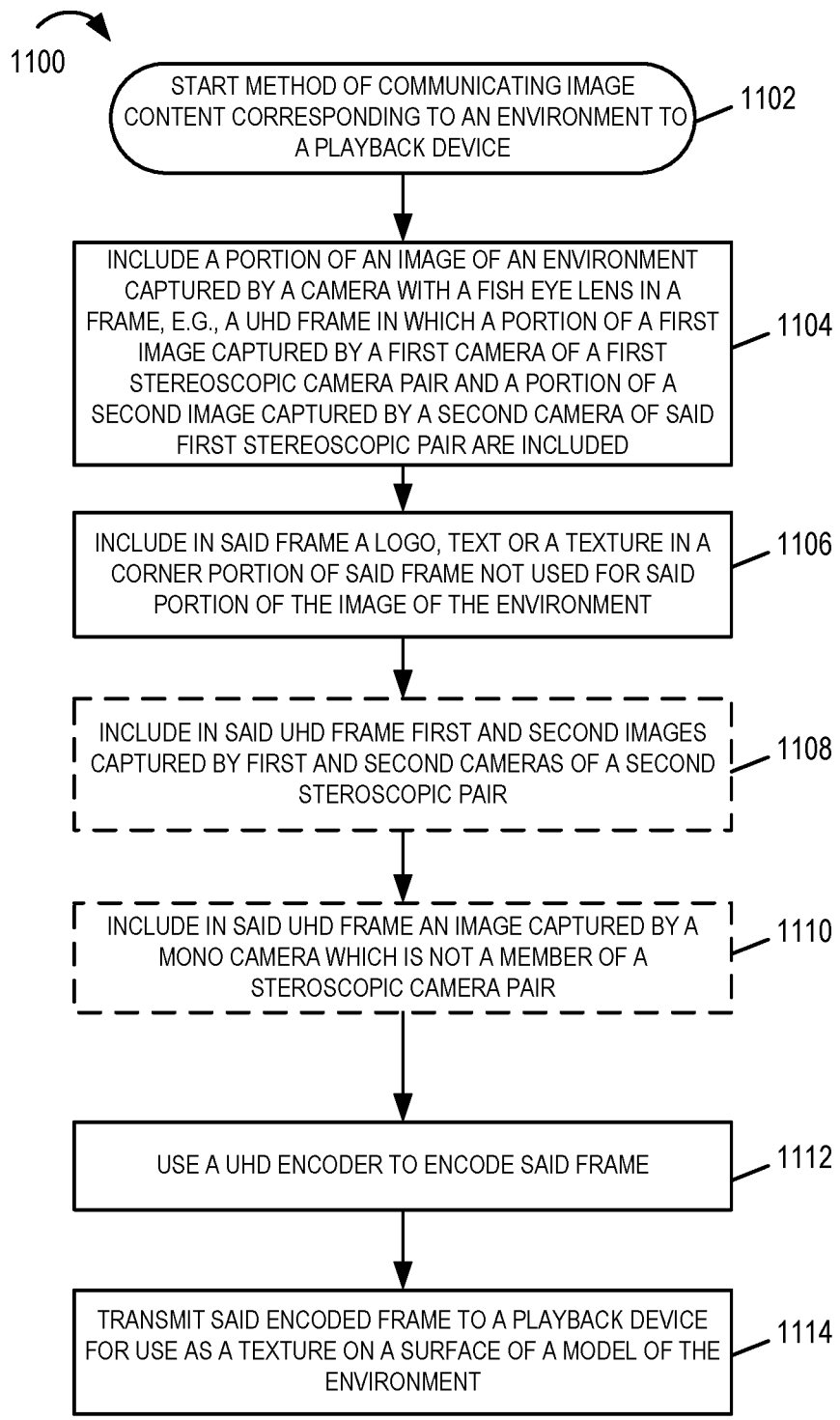
FIG. 11 is a flowchart of an exemplary method of communicating image content corresponding to an environment to a playback device, in accordance with an exemplary embodiment.

FIG. 11 is a flowchart 1100 of an exemplary method of communicating image content corresponding to an environment to a playback device, in accordance with an exemplary embodiment. Flowchart 1100 may be performed by image processing and content delivery system 104. Operation starts in step 1102 and proceeds to step 1104.

In step 1104 the content selector and compositor device 247 of the network headend image processing, calibration and encoding device 112 of the image processing content and delivery system 104 includes a portion of an image of an environment captured by a camera with a fish eye lens in a frame. The frame is, e.g., UHD frame in which a portion of a first image captured by a first camera of a first stereoscopic pair and a portion of a second image captured by a second camera of said first stereoscopic pair are included. Operation proceeds from step 1104 to step 1106.

In step 1106 the content selector and compositor device 247 includes in said frame a logo, text, or a texture in a corner portion of said frame not used for said portion of the image of the environment. In some embodiments, one or both of steps 1108 and 1110 are included.

In step 1108 content selector and compositor device 247 includes in said UHD frame first and second images captured by first and second cameras of a second stereoscopic pair. In step 1110, the content selector and compositor device includes in said UHD frame an image captured by a mono camera which is not a member of a stereoscopic camera pair.

In step 1112 the network headend image processing, calibration and decoding device 112 of image processing and content delivery system 104 uses a UHD encoder, e.g., UHD encoder 248, to encode said frame. Operation proceeds from step 1112 to step 1114.

In step 1114 the content delivery device 114, e.g., a streaming server, of the image processing and content delivery system 104 transmits said encoded frame to a playback device, e.g., playback device 122, for use as texture on a surface of a model of the environment.

Figure 12:
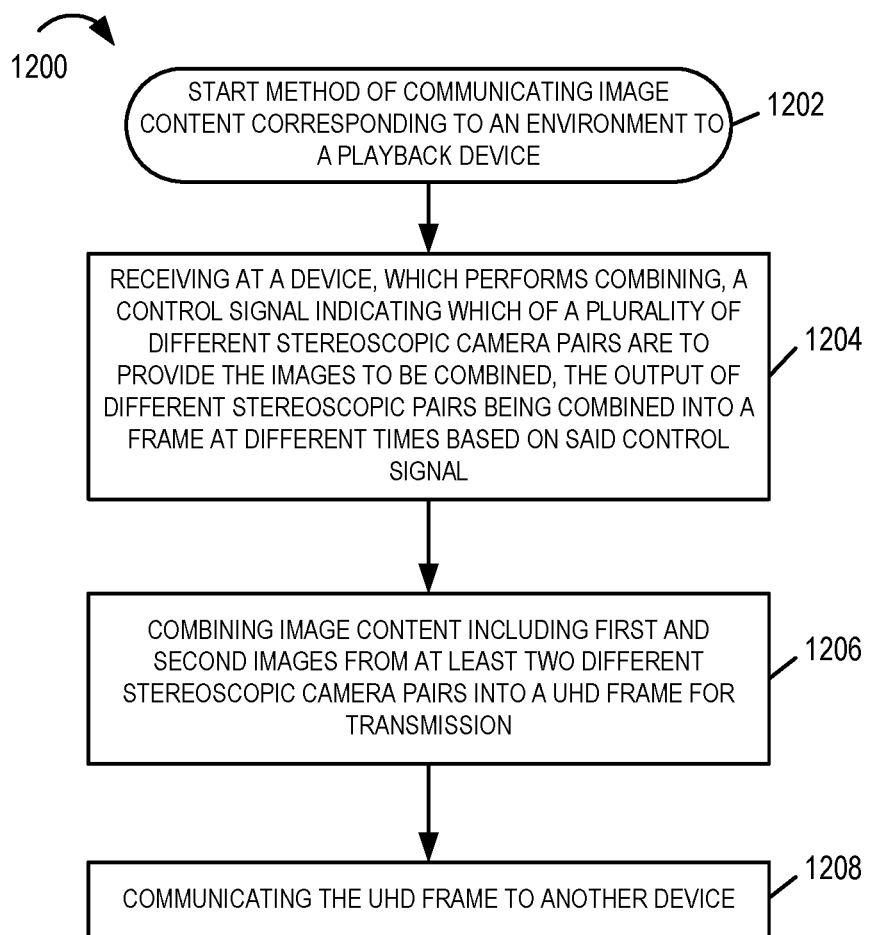
FIG. 12 is a flowchart of an exemplary method of communicating image content corresponding to an environment to a playback device, in accordance with an exemplary embodiment.

FIG. 12 is a flowchart 1200 of an exemplary method of communicating image content corresponding to an environment to a playback device, in accordance with an exemplary embodiment. Flowchart 1200 may be performed by image processing and content delivery system 104 of FIG. 2. Operation starts in step 1202 and proceeds to step 1204.

In step 1204, a device, e.g., content selector and compositor device 247, which performs combining, receives a control signal, e.g., control selector signal 249, indicating which of a plurality of different stereoscopic camera pairs (202, 206, . . . , 212) are to provide the images to be combined, the output of different stereoscopic pairs being combined into a frame at different times based on said control signal 249. In some embodiments, the content selection portion 244 of content selector and compositor device 247 performs the reception of step 1204. Operation proceeds from step 1204 to step 1206.

In step 1206 the compositor portion 246 of the content selector and compositor device 247 combines image content including first and second images from a least two different stereoscopic camera pairs, e.g., first stereoscopic camera pair 202 and second stereoscopic camera pair 206, into a UHD frame for transmission. Operation proceeds from step 1206 to step 1208.

In step 1208, the content delivery device 114, e.g., a streaming server, communicates the UHD frame to another device, e.g., playback device 122.

FIG. 13 illustrates an example in which a combined image 1300 to be encoded includes captured images 1302, 1304 from a pair of stereoscopic cameras, additional image content 1306, which is LOGO A, and alpha mask values 1307 in accordance with an exemplary embodiment. Captured image 1302 is an image captured by a left camera of stereoscopic camera pair 1, e.g., camera 204 of stereoscopic camera pair 202. Captured image 1304 is an image captured by a right camera of stereoscopic camera pair 1, e.g., camera 203 of stereoscopic camera pair 202. The alpha mask values, e.g., blending values conveying transparency information, are used when combining a portion of a captured image 1302, 1304, with the additional image content 1306, which is LOGO A, which is overlaid on a captured image, when rendering an image for display in a playback device. Additional metadata communicated with the encoded image to be displayed includes information specifying where LOGO A is to be overlaid on captured image 1302 and captured image 1304.

Note that the additional content 1306 and the alpha mask values 1307 are included in the portion 1303, which is one of the portions 1303, 1305, which is not used to communicate the images captured by the stereo camera pair using fish eye lenses. In some embodiments, there is a pair of alpha mask values corresponding to each pixel of the additional content 1306.

Figure 14:
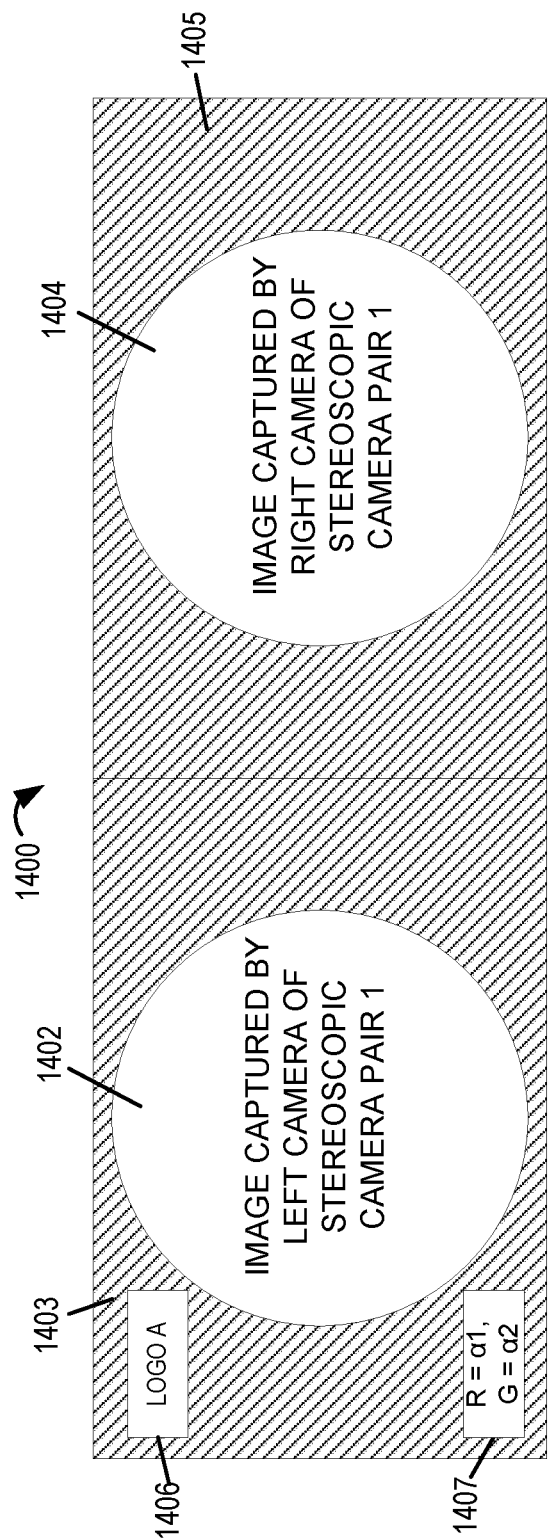
FIG. 14 illustrates an example in which the combined image to be encoded includes captured images from a pair of stereoscopic cameras, additional image content, and alpha mask values in accordance with an exemplary embodiment, said alpha mask values being communicated in red and green pixel element component values.

FIG. 14 illustrates an example in which the combined image 1400 to be encoded includes captured images 1402, 1404 from a pair of stereoscopic cameras, additional image content 1406, which is LOGO A, and alpha mask values 1407 in accordance with an exemplary embodiment, said alpha mask values 1407 being communicated in red and green pixel element component values. Captured image 1402 is an image captured by a left camera of stereoscopic camera pair 1, e.g., camera 204 of stereoscopic camera pair 202. Captured image 1404 is an image captured by a right camera of stereoscopic camera pair 1, e.g., camera 203 of stereoscopic camera pair 202. The alpha mask values 1407, e.g., blending values conveying transparency information, are used when combining a portion of a captured image 1402, 1404, with the additional image content 1406, which is LOGO A, which is overlaid on a captured image, when rendering an image for display in a playback device. Additional metadata communicated with the encoded image to be displayed includes information specifying where LOGO A is to be overlaid on captured image 1402 and captured image 1404. Note that the additional content 1406 and the alpha mask values 1407 are included in the portion 1403, which is one of the portions 1403, 1405, which is not used to communicate the images captured by the stereo camera pair using fish eye lenses. In some embodiments, there is a pair of alpha mask values corresponding to each pixel of the additional content 1406. In this example, the red (R) component of a pixel value is used to communicate an alpha1 ($\alpha$1) value, where the $\alpha$1 value corresponds to a pixel of image 1402 or 1404; and the green (G) component of a pixel value is used to communicate an alpha2 ($\alpha$2) value, where the $\alpha$2 value corresponds to a pixel of additional information 1406, e.g., LOGO A. In some embodiments, each pixel element of region 1406 has a corresponding pixel element of region 1407 conveying a pair of alpha component values, an alpha1 value and an alpha2 value.

Figure 15:
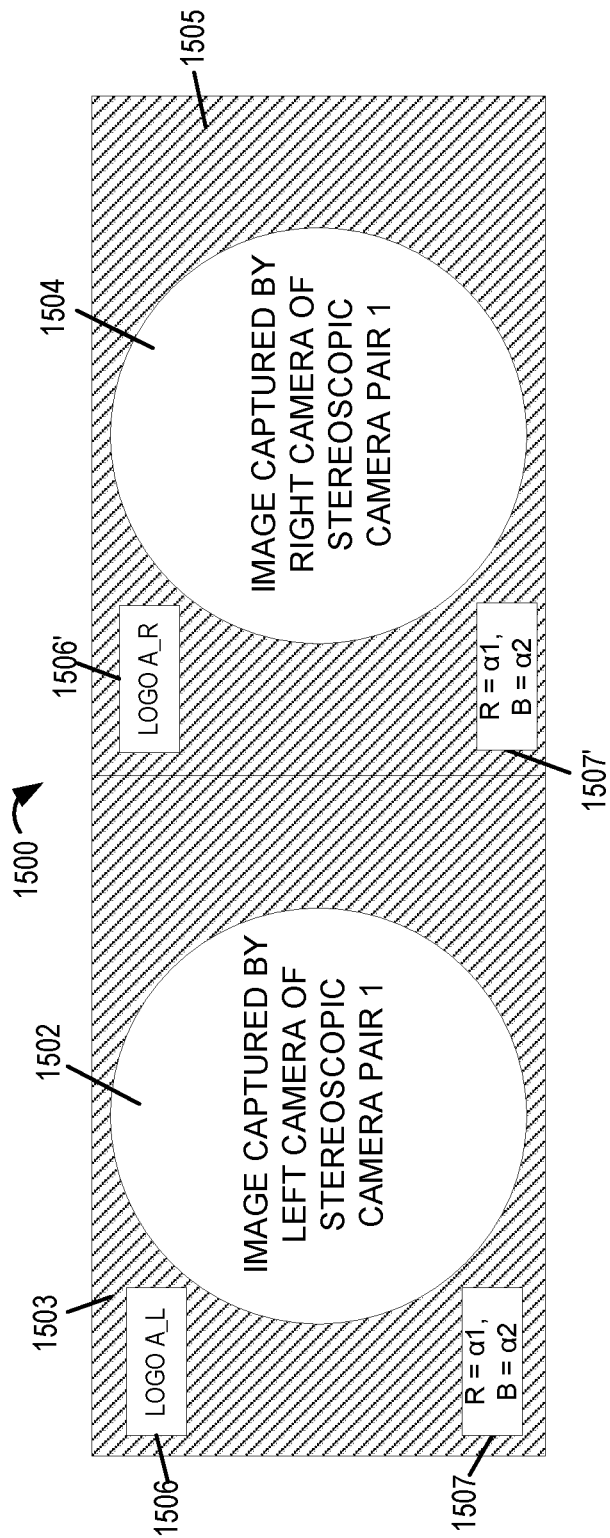
FIG. 15 illustrates an example in which the combined image to be encoded includes captured images from a pair of stereoscopic cameras, left eye additional image content, right eye additional image content, and alpha mask values in accordance with an exemplary embodiment, said alpha mask values being communicated in red and blue pixel element component values.

FIG. 15 illustrates an example in which a combined image 1500 to be encoded includes captured images 1502, 1504 from a pair of stereoscopic cameras, left eye additional image content 1506, which is LOGO A_L, right eye additional image content 1506', which is LOGO A_R, and alpha mask values 1507, 1507' in accordance with an exemplary embodiment, said alpha mask values being communicated in red and blue pixel element component values. In some embodiments, LOGO A_L and LOGO A_R are substantially the same, but are slightly different to account for the different viewing perspectives.

Captured image 1502 is an image captured by a left camera of stereoscopic camera pair 1, e.g., camera 204 of stereoscopic camera pair 202. Captured image 1504 is an image captured by a right camera of stereoscopic camera pair 1, e.g., camera 203 of stereoscopic camera pair 202.

The alpha mask values 1507, e.g., blending values conveying transparency information, are used when combining a portion of a captured image 1502 with the additional image content 1506, which is LOGO A_L, which is overlaid on a captured image, when rendering an image for display in a playback device. Additional metadata communicated with the encoded image to be display includes information specifying where LOGO A_L is to be overlaid on captured image 1502.

Note that the additional content 1506 and the alpha mask values 1507 are included in the portion 1503, which is one of the portions 1503, 1505, which is not used to communicate the images captured by the stereo camera pair using fish eye lenses. In some embodiments, there is a pair of alpha mask values corresponding to each pixel of the additional content 1506. In this example, the red (R) component of a pixel value is used to communicate an alpha1 ($\alpha$1) value, where the $\alpha$1 value corresponds to a pixel of image 1502; and the blue (B) component of a pixel value is used to communicate an alpha2 ($\alpha$2) value, where the $\alpha$2 value corresponds to a pixel of additional information 1506, e.g., LOGO A_L. In some embodiments, each pixel element of region 1506 has a corresponding pixel element of region 1507 conveying a pair of alpha component values, an alpha1 value and an alpha2 value.

The alpha mask values 1507', e.g., blending values conveying transparency information, are used when combining a portion of a captured image 1504 with the additional image content 1506', which is LOGO A_R, which is overlaid on a captured image, when rendering an image for display in a playback device. Additional metadata communicated with the encoded image to be displayed includes information specifying where LOGO A_R is to be overlaid on captured image 1504.

Note that the additional content 1506' and the alpha mask values 1507' are included in the portion 1505, which is one of the portions 1503, 1505, which is not used to communicate the images captured by the stereo camera pair using fish eye lenses. In some embodiments, there is a pair of alpha mask values corresponding to each pixel of the additional content 1506'. In this example, the red (R) component of a pixel value is used to communicate an alpha1 ($\alpha$1) value, where the $\alpha$1 value corresponds to a pixel of image 1504; and the blue (B) component of a pixel value is used to communicate an alpha2 ($\alpha$2) value, where the $\alpha$2 value corresponds to a pixel of additional information 1506', e.g., LOGO A_R. In some embodiments, each pixel element of region 1506' has a corresponding pixel element of region 1507' conveying a pair of alpha component values, an alpha1 value and an alpha2 value. In some embodiments, alpha value information 1507 and alpha value information 1507' are the same, and only one of alpha value information, e.g., information 1507 is included in image 1500, and is used when rendering both left and right eye images.

Figure 16:
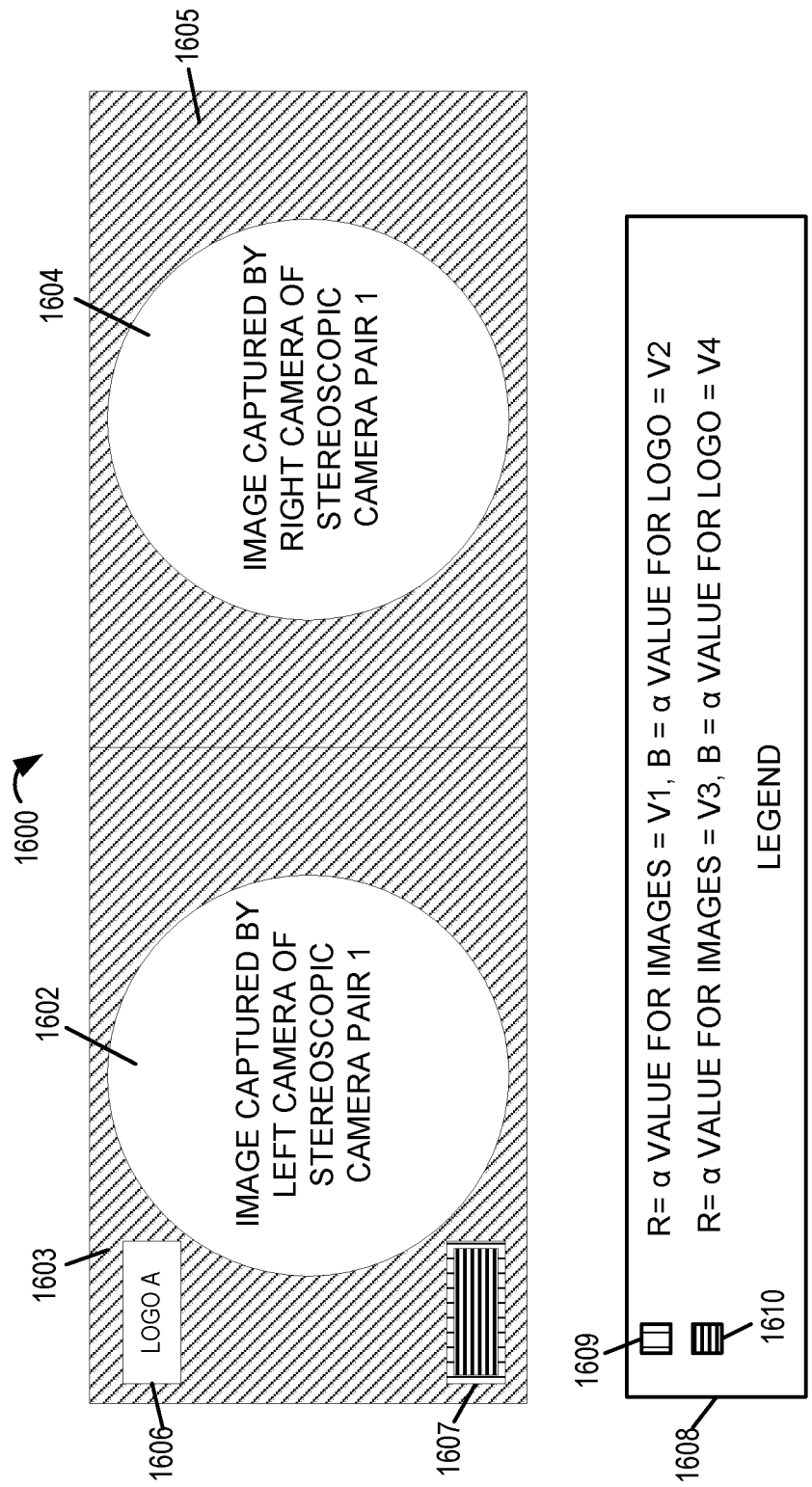
FIG. 16 illustrates an example in which the combined image to be encoded includes captured images from a pair of stereoscopic cameras, additional image content, and alpha mask values in accordance with an exemplary embodiment, said alpha mask values providing a different level of blending in a border region of the additional image content than in a center region of the additional image content.

FIG. 16 illustrates an example in which a combined image 1600 to be encoded includes captured images 1602, 1604 from a pair of stereoscopic cameras, additional image content 1606, and alpha mask values 1607 in accordance with an exemplary embodiment, said alpha mask values providing a different level of blending in a border region of the additional image content than in a center region of the additional image content. FIG. 16 also includes legend 1608, which indicates that vertical line shading 1609 indicates that the red (R) component of a pixel in the alpha mask region 1607 conveys an alpha value of V1 for an image, and the blue (B) component of a pixel in the alpha mask region 1607 conveys an alpha value of V2 for a logo. Legend 1608 further indicates that horizontal line shading 1610 indicates that the red (R) component of a pixel in the alpha mask region 1607 conveys an alpha value of V3 for an image, and the blue (B) component of a pixel in the alpha mask region 1607 conveys an alpha value of V4 for a logo.

Captured image 1602 is an image captured by a left camera of stereoscopic camera pair 1, e.g., camera 204 of stereoscopic camera pair 202. Captured image 1604 is an image captured by a right camera of stereoscopic camera pair 1, e.g., camera 203 of stereoscopic camera pair 202. The alpha mask values 1607, e.g., blending values conveying transparency information, are used when combining a portion of a captured image 1602, 1604, with the additional image content 1606, which is LOGO A, which is overlaid on a captured image, when rendering an image for display in a playback device. Additional metadata communicated with the encoded image to be displayed includes information specifying where LOGO A is to be overlaid on captured image 1602 and captured image 1604.

Note that the additional content 1606 and the alpha mask values 1607 are included in the portion 1603, which is one of the portions 1603, 1605, which is not used to communicate the images captured by the stereo camera pair using fish eye lenses. In some embodiments, there is a pair of alpha mask values corresponding to each pixel of the additional content 1606. In this example, the red (R) component of a pixel value is used to communicate an alpha1 ($\alpha$1) value, where the $\alpha$1 value corresponds to a pixel of image 1602 or 1604; and the blue (B) component of a pixel value is used to communicate an alpha2 ($\alpha$2) value, where the $\alpha$2 value corresponds to a pixel of additional information 1606, e.g., LOGO A. In some embodiments, each pixel element of region 1606 has a corresponding pixel element of region 1607 conveying a pair of alpha component values, an alpha1 value and an alpha2 value.

In FIG. 16 is may be observed that the outer area of LOGO A 1606 will be blended differently with the captured images (1602, 1604) onto which it is overlaid than the center region, e.g., to gradually blend in the additional image content, and make it easier to view. In this example, there are two distinct levels of blending shown; however, in some embodiments, there are more than 2 levels of blending, e.g., 4 or more levels, to achieve a gradual blend between captured image and additional image content.

Figure 17:
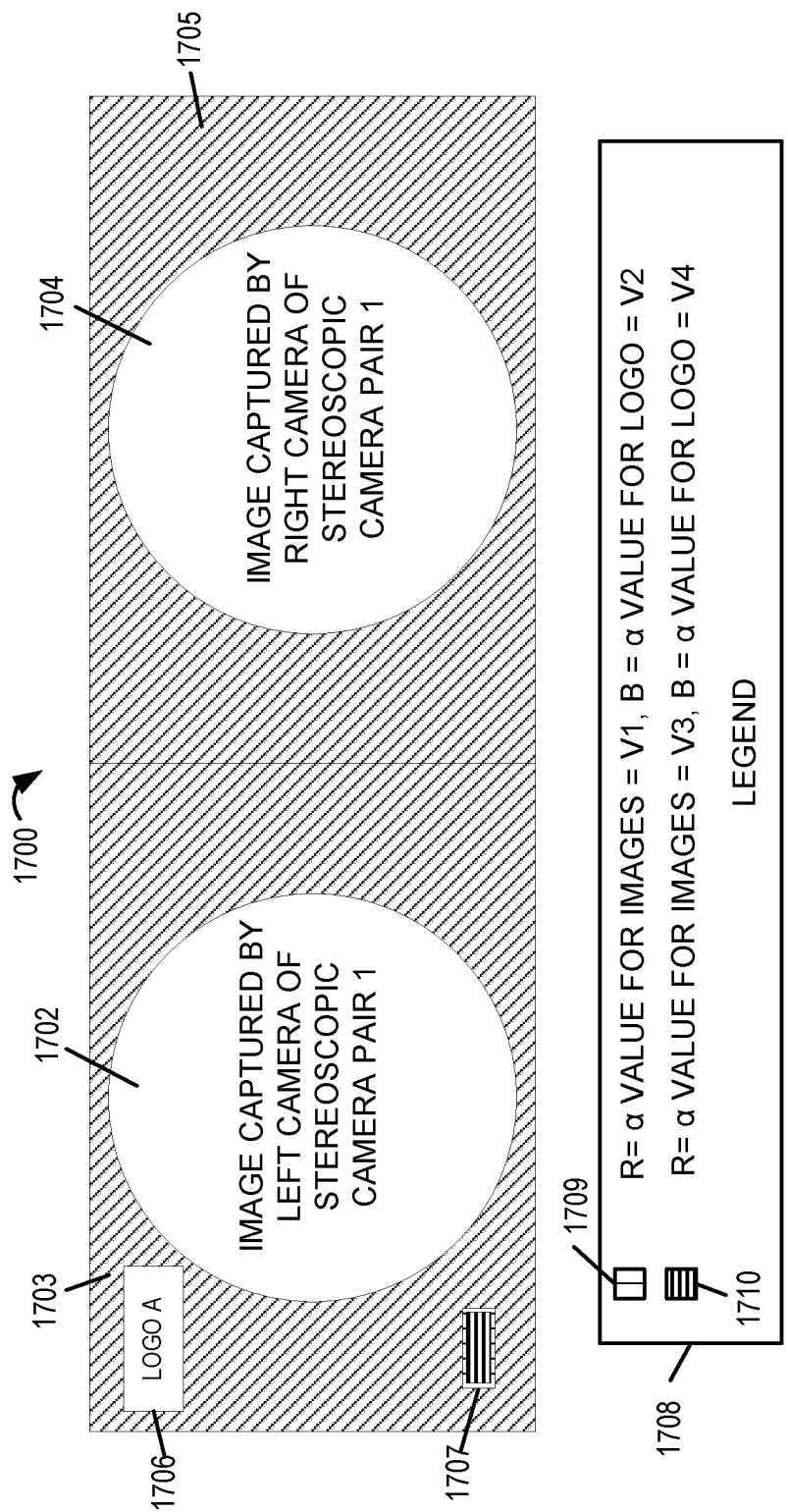
FIG. 17 illustrates an example in which the combined image to be encoded includes captured images from a pair of stereoscopic cameras, additional image content, and alpha mask values in accordance with an exemplary embodiment, said region allocated to said alpha mask values being smaller than said region allocated to corresponding additional image content.

FIG. 17 illustrates an example in which a combined image 1700 to be encoded includes captured images 1702, 1704 from a pair of stereoscopic cameras, additional image content 1706, which is LOGO A, and alpha mask values 1707 in accordance with an exemplary embodiment, said region 1707 allocated to said alpha mask values being smaller than said region 1706 allocated to corresponding additional image content. In some embodiments, the size of region 1707 is proportionally scaled down from the size of region 1706.

FIG. 17 also includes legend 1708, which indicates that vertical line shading 1709 indicates that the red (R) component of a pixel in the alpha mask region 1707 conveys an alpha value of V1 for an image, and the blue (B) component of a pixel in the alpha mask region 1707 conveys an alpha value of V2 for a logo. Legend 1708 further indicates that horizontal line shading 1710 indicates that the red (R) component of a pixel in the alpha mask region 1707 conveys an alpha value of V3 for an image, and the blue (B) component of a pixel in the alpha mask region 1707 conveys an alpha value of V4 for a logo.

Captured image 1702 is an image captured by a left camera of stereoscopic camera pair 1, e.g., camera 204 of stereoscopic camera pair 202. Captured image 1704 is an image captured by a right camera of stereoscopic camera pair 1, e.g., camera 203 of stereoscopic camera pair 202. The alpha mask values 1707, e.g., blending values conveying transparency information, are used when combining a portion of a captured image 1702, 1704, with the additional image content 1706, which is LOGO A, which is overlaid on a captured image, when rendering an image for display in a playback device. Additional metadata communicated with the encoded image to be displayed includes information specifying where LOGO A is to be overlaid on captured image 1702 and captured image 1704 and scaling information to be used to rescale alpha information 1707 to match the size of additional information 1706.

Note that the additional content 1706 and the alpha mask values 1707 are included in the portion 1703, which is one of the portions 1703, 1705, which are not used to communicate the images captured by the stereo camera pair using fish eye lenses. In some embodiments, there is a pair of alpha mask values in alpha mask values 1707 corresponding to multiple pixels of the additional content 1706. In this example, the red (R) component of a pixel value is used to communicate an alpha1 ($\alpha$1) value, where the $\alpha$1 value corresponds to multiple pixels of image 1702 and 1704; and the blue (B) component of a pixel value is used to communicate an alpha2 ($\alpha$2) value, where the $\alpha$2 value corresponds to multiple pixels of additional information 1706, e.g., LOGO A. In FIG. 17 is may be observed that the outer area of LOGO A 1706 will be blended differently with the captured images (1702, 1704) onto which it is overlaid than the center region, e.g., to gradually blend in the additional image content, and make it easier to view. In this example, there are two distinct levels of blending shown; however, in some embodiments, there are more than 2 levels of blending, e.g., 4 or more levels, to achieve a gradual blend between captured image and additional image content.

Figure 18:
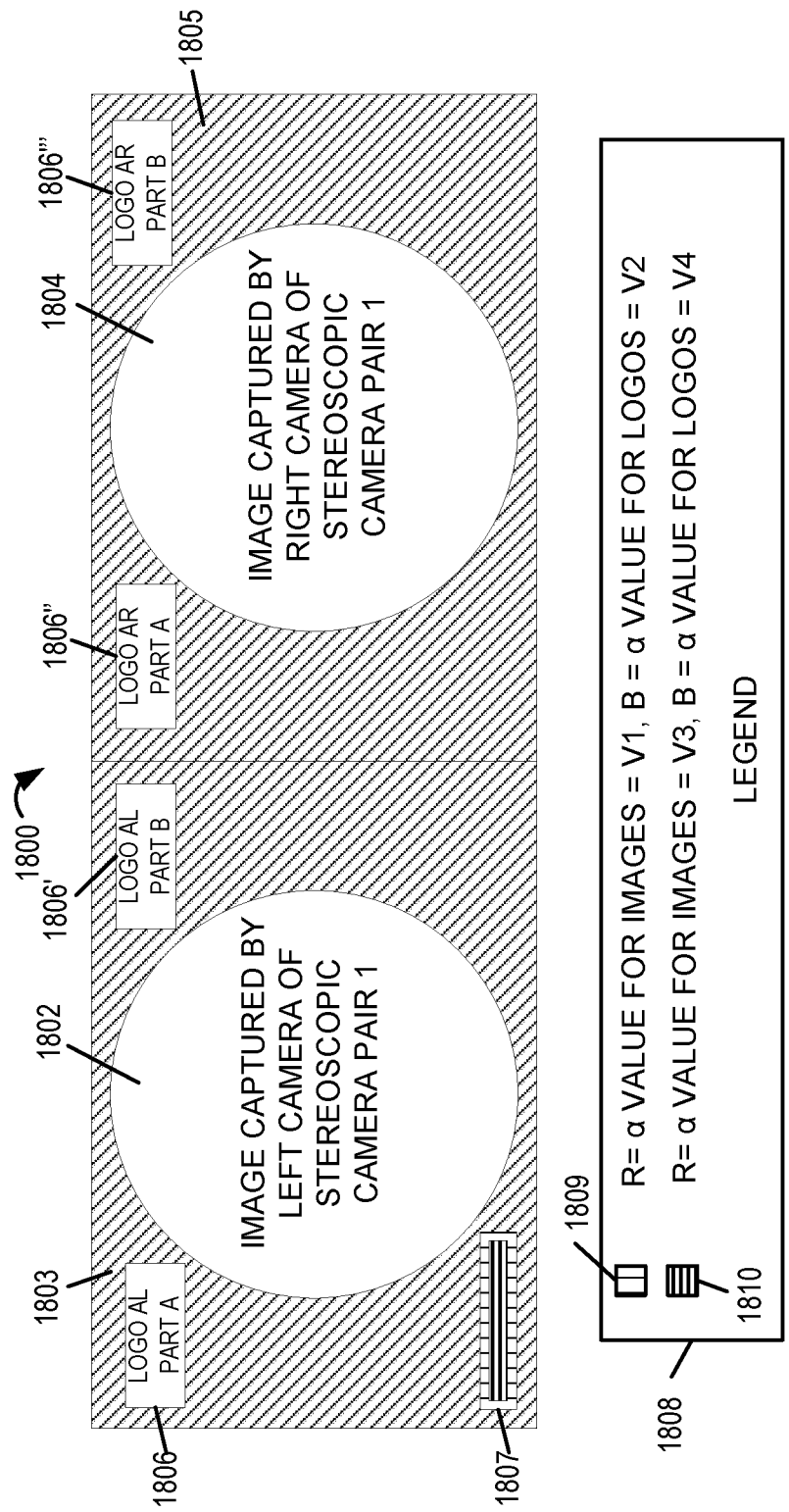
FIG. 18 illustrates an example in which the combined image to be encoded includes captured images from a pair of stereoscopic cameras, additional image content which is slightly different for left and right eyes, wherein additional image content, e.g., a logo, has been split into portions placed at non-contiguous locations within the combined image, and alpha mask values in accordance with an exemplary embodiment.

FIG. 18 illustrates an example in which the combined image 1800 to be encoded includes captured images 1802, 1804 from a pair of stereoscopic cameras, additional image content, e.g., a LOGO A, which is slightly different for left and right eyes, wherein additional image content, e.g., a logo, has been split into portions placed at non-contiguous locations within the combined image, and alpha mask values 1807 in accordance with an exemplary embodiment.

FIG. 18 also includes legend 1808, which indicates that vertical line shading 1809 indicates that the red (R) component of a pixel in the alpha mask region 1807 conveys an alpha value of V1 for an image, and the blue (B) component of a pixel in the alpha mask region 1807 conveys an alpha value of V2 for a logo. Legend 1808 further indicates that horizontal line shading 1810 indicates that the red (R) component of a pixel in the alpha mask region 1807 conveys an alpha value of V3 for an image, and the blue (B) component of a pixel in the alpha mask region 1807 conveys an alpha value of V4 for a logo.

LOGO AL which is to be combined with a portion of captured left eye image 1802, during rendering in a playback device, includes LOGO AL Part A 1806 and LOGO AL Part B 1806' which have been placed at disjoint locations within combined image 1800, e.g., to fit the entire LOGO AL into the available space. LOGO AR which is to be combined with a portion of captured right eye image 1804, during rendering in a playback device, includes LOGO AR Part A 1806" and LOGO AR Part B 1806''' which have been placed at disjoint locations within combined image 1800, e.g., to fit the entire LOGO AR into the available space.

Captured image 1802 is an image captured by a left camera of stereoscopic camera pair 1, e.g., camera 204 of stereoscopic camera pair 202. Captured image 1804 is an image captured by a right camera of stereoscopic camera pair 1, e.g., camera 203 of stereoscopic camera pair 202.

The alpha mask values 1807, e.g., blending values conveying transparency information, are used when combining a portion of a captured image 1802 with the additional image content 1806 or 1806', which is LOGO AL, which is overlaid on a captured image, when rendering an image for display in a playback device. Additional metadata communicated with the encoded image to be displayed includes information specifying where Part A and Part B of LOGO AL are to be overlaid on captured image 1802 and scaling information to be used to rescale alpha information 1807 to match the combined size of additional information 1806 and 1806', when joined together.

The alpha mask values 1807, e.g., blending values conveying transparency information, are also used when combining a portion of a captured image 1804 with the additional image content 1806" or 1806''', which is LOGO AR, which is overlaid on a captured image, when rendering an image for display in a playback device. Additional metadata communicated with the encoded image to be display includes information specifying where Part A and Part B of LOGO AR are to be overlaid on captured image 1804 and scaling information to be used to rescale alpha information 1807 to match the combined size of additional information 1806'' and 1806''', when joined together.

Note that the additional content 1806, 1806', 1806'', 1806'''' and the alpha mask values 1807 are included in the portions 1803, 1805, which are not used to communicate the images captured by the stereo camera pair using fish eye lenses.

Figure 19:
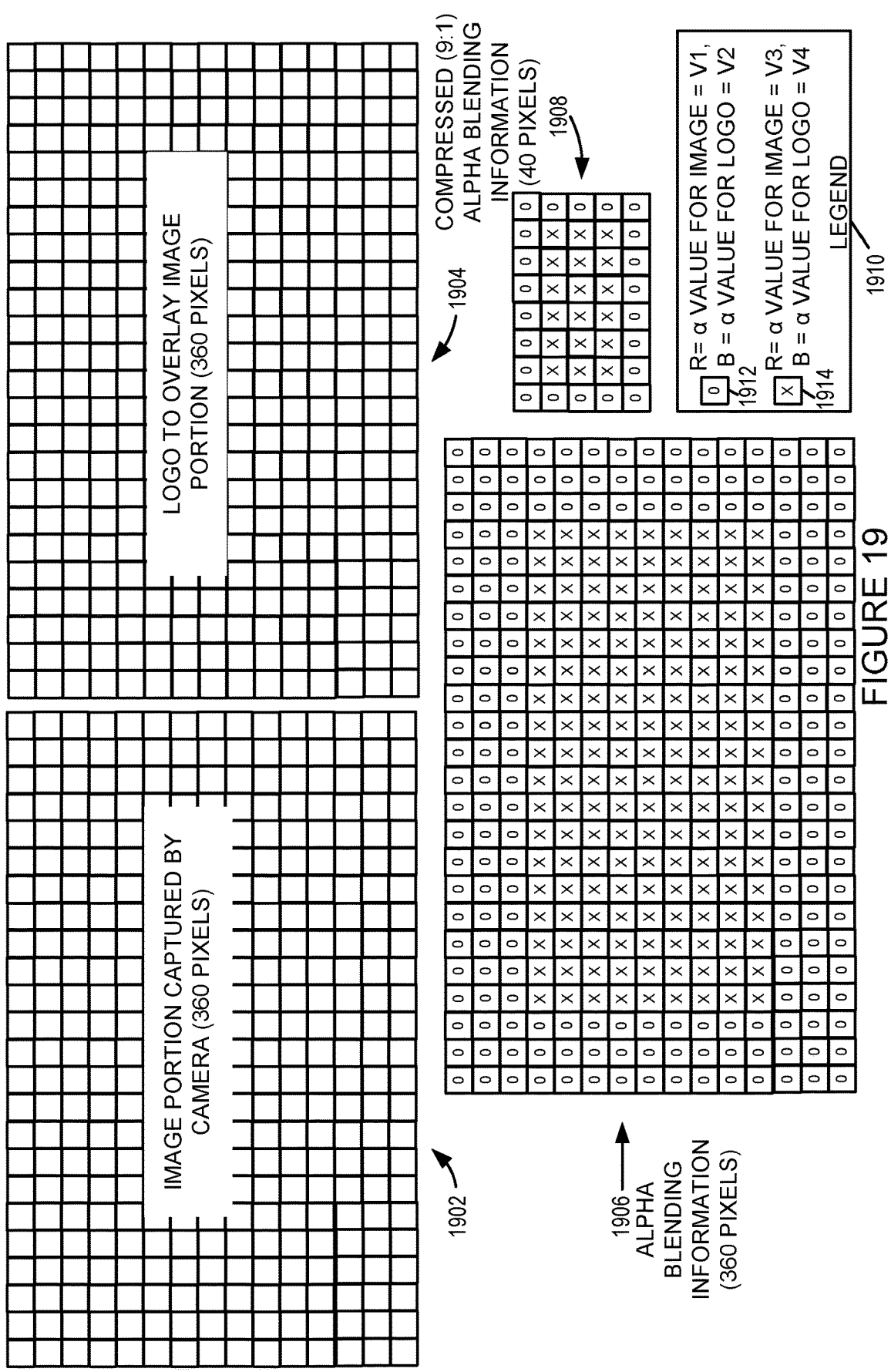
FIG. 19 illustrates an exemplary image portion captured by a camera, exemplary additional image content, e.g., a LOGO, to be overlaid on the image portion during rendering, and exemplary alpha blending information, in accordance with an exemplary embodiment.

FIG. 19 illustrates an exemplary image portion 1906 captured by a camera, exemplary additional image content 1904, e.g., a LOGO, to be overlaid on the image portion 1902 during rendering, and exemplary alpha blending information 1906, in accordance with an exemplary embodiment. Each of the image portion 1902, logo 1904 and alpha blending information 1906 includes 360 pixels. Legend 1910 identifies that a pixel in alpha blending information 1906 which has a "0" 1912 indicates the pixel conveys: i) a red (R) pixel element component value=V1, which is the alpha blending value for the corresponding pixel of image portion 1902, a blue (B) pixel element component value=V2, which is the alpha blending value for the corresponding pixel of logo 1904. Legend 1910 further identifies that a pixel in alpha blending information 1906 which has a "X" 1914 indicates the pixel conveys: i) a red (R) pixel element component value=V3, which is the alpha blending value for the corresponding pixel of image portion 1902, a blue (B) pixel element component value=V4, which is the alpha blending value for the corresponding pixel of logo 1904.

In various embodiments, the alpha blending information is compressed so that it can be communicated in less pixels. In one such embodiment, the alpha blending information is compressed so that the basic blending pattern is preserved and can be easily expanded back to the original size. Drawing 1908 represents and example in which the alpha blending information 1906 has been compressed by a factor of 9 to be conveyed in 40 pixels rather than 360 pixels. In this example, each pixel is 1908 can be replaced by 9 identical pixels to recover alpha blending information 1906.

In this example, it may be observed that the blending is different at the outside border of the LOGO than in the center portion, e.g. to present a gradual change from the captured image to the LOGO.

Figure 20:
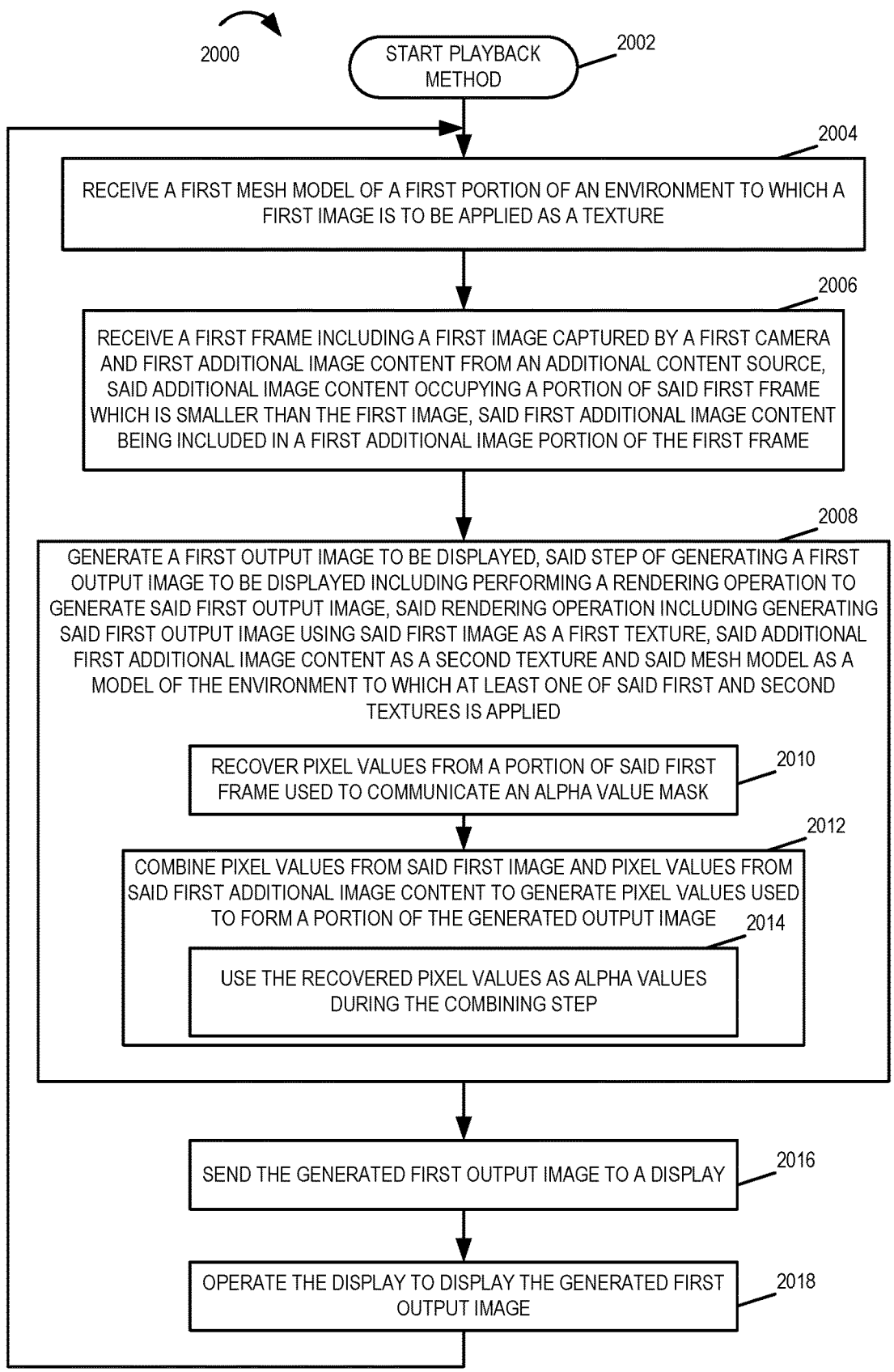
FIG. 20 is a flowchart of an exemplary method of operating a playback device in accordance with an exemplary embodiment.

FIG. 20 is a flowchart 2000 of an exemplary method of operating a playback device, e.g., playback device 122 of FIG. 1 or playback device 800 of FIG. 4 in accordance with an exemplary embodiment. Operation starts in step 2002 in which the playback device is powered on and initialized. Operation proceeds from start step 2002 to step 2004.

In step 2004 the playback device receives a first mesh model of a first portion of an environment to which a first image is to be applied as a texture. Operation proceeds from step 2004 to step 2006.

In step 2006 the playback device receives a first frame including a first image captured by a first camera and first additional image content from an additional content source, said additional image content occupying a portion of said first frame which is smaller than the first image, said first additional image content being including in a first additional image portion of the first frame. In some embodiments, said first image is an image captured by a first camera with a fisheye lens, said first image occupying a non-rectangular portion of the first frame. Operation proceeds from step 2006 to step 2008.

In step 2008 the display device generates a first output image to be displayed, said step of generating a first output image to be displayed including performing a rendering operation to generate said first output image, said rendering operation including generating said first output image using said first image as a first texture, said additional first additional image content as a second texture and said mesh model as a model of the environment to which at least one of said first and second textures are applied. Step 2008 includes step 2010 and step 2012.

In step 2010 the display device recovers pixel values from a portion of said first frame used to communicate an alpha value mask. In some embodiments, pixel values communicating alpha mask values include color pixel values and/or luminance pixel values. In some embodiments, the recovered pixel values communicating the alpha value mask are RGB pixel values. In some embodiments, the recovered pixel values communicating the alpha value mask are one of: YIQ, YUV, YDbDr, YPbPr, YCbCr, ICtCp, or xvYCC pixel values. Operation proceeds from step 2010 to step 2012. In step 2012 the display device combines pixel values form said first image and pixel values from said first additional image content to generate pixel values used to form a portion of the generated output image. Step 2012 includes step 2014 in which the display device uses the recovered pixel values as alpha values during the combining step, Operation proceeds from step 2008 to step 2016.

In step 2016 the display device sends the generated first output image to a display. The display may be included in the display device or may be coupled to the display device. Operation proceeds from step 2016 to step 2018.

In step 2018 the display is operated to display the generated first output image. Operation proceeds from step 2018 to step 2004.

Figure 21A:
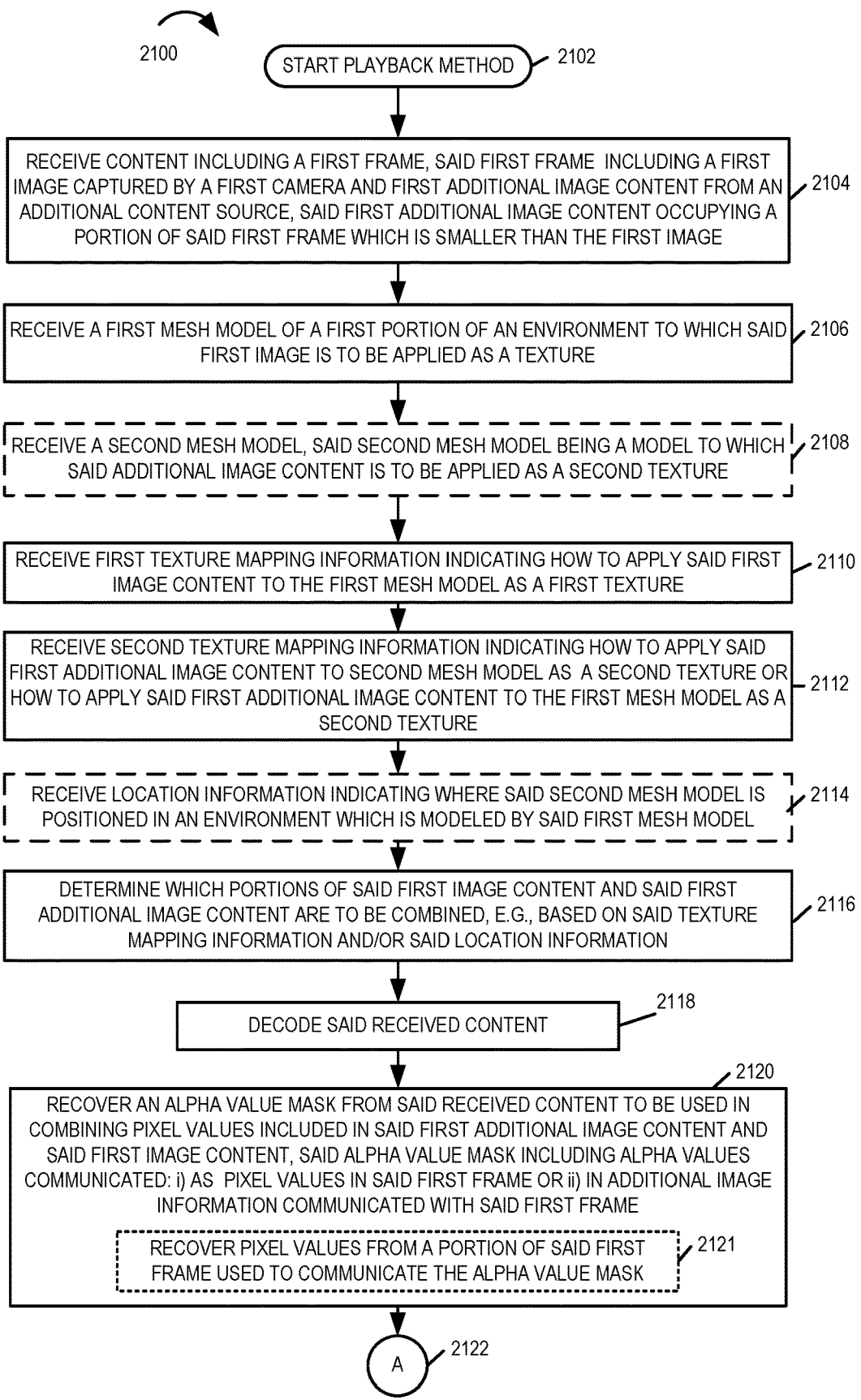
FIG. 21A is a first part of a flowchart of an exemplary method of operating a playback device in accordance with an exemplary embodiment.

FIG. 21, comprising the combination of FIG. 21A and FIG. 21B, is a flowchart 2100 of an exemplary method of operating a playback device, e.g., playback device 122 of FIG. 1 or playback device 800 of FIG. 4, in accordance with an exemplary embodiment. Operation starts in step 2102 in which the playback device is powered on and initialized. Operation proceeds from start step 2102 to step 2104.

In step 2104 the playback device receives content including a first frame, said first frame including a first image captured by a first camera and first additional image content from an additional content source, said first additional image content occupying a portion of said first frame which is smaller than said first image. The first image includes first image content. In some embodiments, the first additional image content is included in a first additional image portion of the first frame. In some embodiment, the first image is an image captured by a first camera with a fisheye lens, and said first image occupies a non-rectangular portion of the first frame. In some such embodiments, the first additional image content is positioned in and edge corner of said first frame which is outside the portion of the first frame occupied by the first image captured by the first camera. Operation proceeds from step 2104 to step 2106.

In step 2106 the playback device receives a first mesh mode of a first portion of an environment to which said first image is to be applied as a texture. Operation proceeds from step 2106 to step 2108 or step 2110.

In some embodiments, step 2108 is performed. In step 2108 the playback device receives a second mesh mode, said second mesh model being a model to which said additional image content is to be applied as second texture. Operation proceeds from step 2108 to step 2110.

In step 2110 the playback device receives first texture mapping information indicating how to apply said first image content to the first mesh model as a first texture. Operation proceeds from step 2110 to step 2112.

In step 2112 the playback device receives second texture mapping information indicating how to apply said additional image content to said second mesh model as a second texture or how to apply said first additional image content to the first mesh model as a second texture. Operation proceeds from step 2112 to step 2114 or step 2116.

In some embodiments, step 2114 is performed. In step 2114 the playback device receives location information indicating where said second mesh model is positioned in an environment which is modeled by said first mesh model. Operation proceeds from step 2114 to step 2116.

In step 2116 the playback device determines which portions of said first image content and said first additional image content are to be combined, e.g., based on the said texture mapping information and/or said location information. Operation proceeds from step 2116 to step 2118.

In step 2118 the playback device decodes the received content. Operation proceeds from step 2118 to step 2120.

In step 2120 the playback device recovers an alpha mask from said received image content, said alpha mask to be used in combining pixel values included in said first additional image content with said first image content, said alpha value mask including alpha values communicated: i) as pixel values in said first frame or ii) in additional image information communicated with said first frame, e.g., communicated in metadata with said first frame. In some embodiments, step 2120 includes step 2121 in which the playback device recovers pixel values from a portion of the first frame used to communicate the alpha value mask. In some embodiments, pixel values communicating alpha mask values include color pixel values and/or luminance pixel values. In some embodiments, the recovered pixel values communicating the alpha value mask are RGB pixel values. In some embodiments, the recovered pixel values communicating the alpha value mask are one of: YIQ, YUV, YDbDr, YPbPr, YCbCr, ICtCp, or xvYCC pixel values. Operation proceeds from step 2120, via connecting node A 2122, to step 2124.

In step 2124 the playback device generates a first output image to be displayed, said step of generating a first output image to be displayed including performing a rendering operation to generate said first output image, said rendering operation including generating said first output image using said first image as a first texture, said first additional image content as a second texture and said first mesh model as model of the environment to which at least one of said first and second textures are applied. Step 2124 includes step 2126, in which the playback device combines pixel values from said first image and said first additional image content to generate pixel values used to form a portion of the generated output image.

Step 2126 includes step 2128, in which the playback devices uses the recovers alpha values during the combining step. Step 2128 includes steps 2129, 2130 and 2132. In step 2129 the playback device multiplies a first individual pixel value in said first addition image content with a corresponding first additional image content alpha value obtained from the alpha value mask to generate a modified additional image pixel value. In step 2130 the playback device multiples a first individual pixel value of the first image, which is to be combined with said first individual image content, with a corresponding first image content alpha value obtained from said alpha value mask to generate a modified image pixel value. Operation proceeds from step 2130 to step 2132. In step 2132 the playback device sums the modified additional image pixel value and the modified first image pixel value to generate a pixel value of the first output image.

In some embodiments, the first additional image content alpha value and said first image content alpha value are communicated in said first frame as different pixel values. In some embodiments, said alpha value mask corresponds to a second additional image portion of the first frame which is equal to or smaller than a first additional image portion of the first frame used to communicate said first additional image content; and the first additional image content alpha values are communicated in said first frame as pixel values of a first type and said first image content alpha values are communicated as pixel values of a second type, at least one of said first and second types of pixel values being first color pixel values, with the other one of said first and second types of pixel values being pixel values of a second color or luminance pixel values, said second color being different from said first color.

In some embodiments, said alpha value mask includes alpha values which produce a greater level of transparency of said additional image content near outer edges of said first additional image content than at the center of said first additional image content in the generated image.

In some embodiments, said alpha value mask causes gradual blending of the first additional image content and said first image content with pixels in the output image at edges of said first additional image content being a visible combination of pixel values of said first image content and said first additional image content and with images corresponding to the center of said first additional image content in the output image showing only pixels of the first additional image content.

Operation proceeds from step 2124 to step 2134 in which the playback device sends the generated first output image to a display. The display may be included in the display device or may be coupled to the display device. Operation proceeds from step 2134 to step 2136 in which the display is operated to display the generated first output image.

Figure 22A:
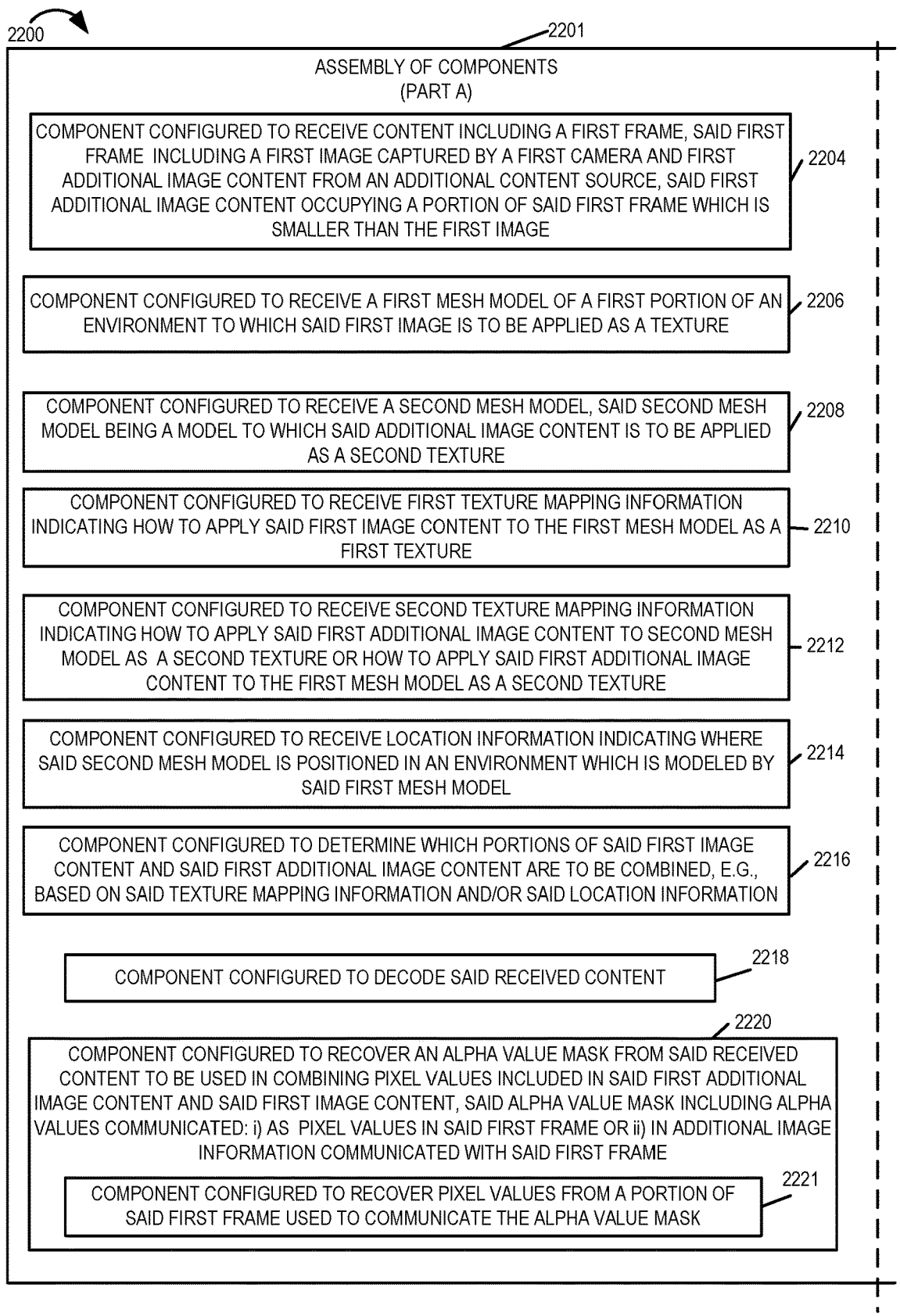
FIG. 22A is a drawing of a first part of an exemplary assembly of components which may be included in an exemplary playback device in accordance with an exemplary embodiment.
Figures 22, 22B:
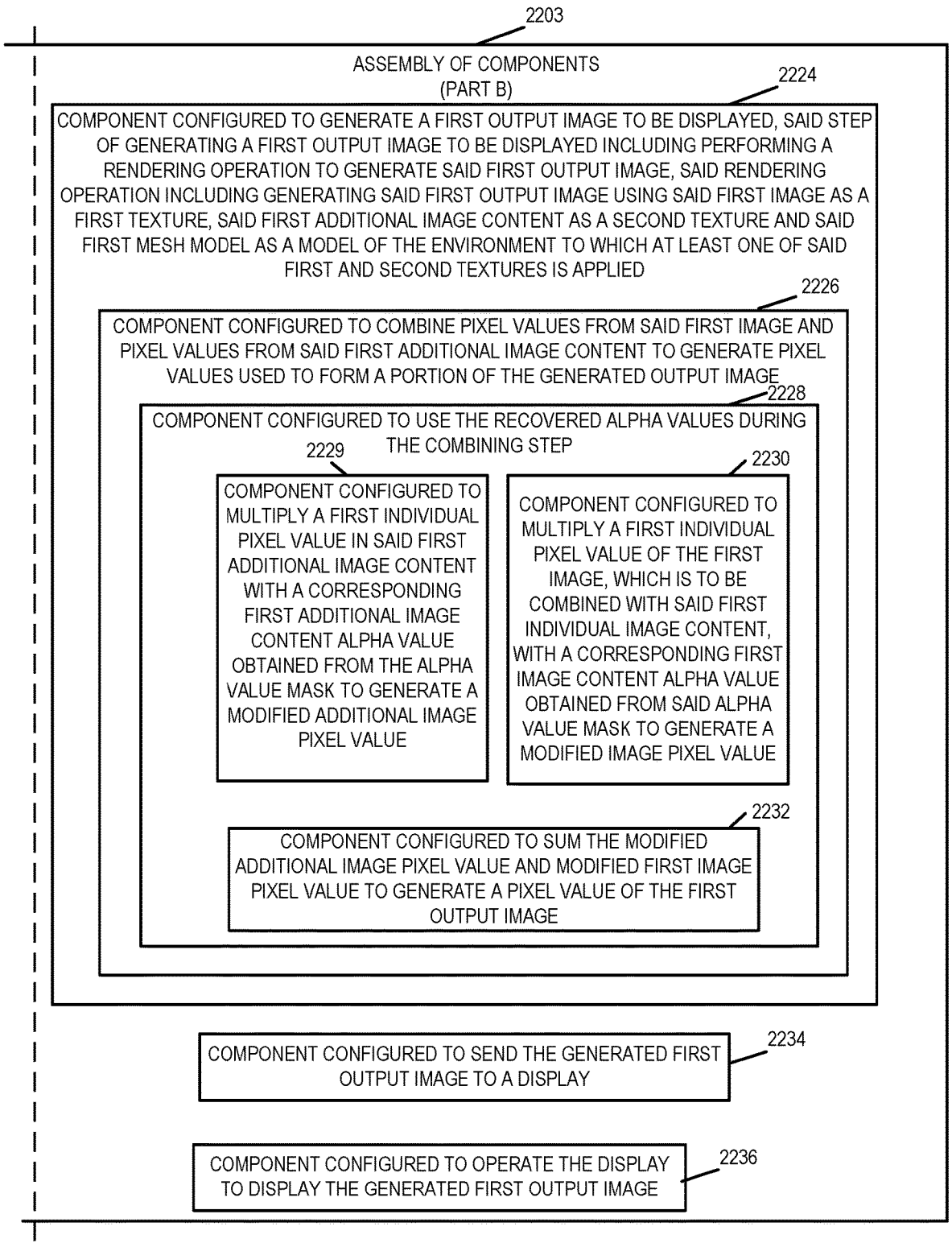
FIG. 22B is a drawing of a second part of an exemplary assembly of components which may be included in an exemplary playback device in accordance with an exemplary embodiment.
FIG. 22 comprises the combination of FIG. 22A and FIG. 22B.

FIG. 22, comprising the combination of FIG. 22A and FIG. 22B, is an assembly of components 2200, comprising the combination of Part A 2201 and Part B 2203, in accordance with an exemplary embodiment. Assembly of components 2200 may be included in a playback device, e.g., playback device 122 of FIG. 1 or playback device 800 of FIG. 4, in accordance with an exemplary embodiment.

The components in the assembly of components 2200 can, and in some embodiments are, implemented fully in hardware within the processor 808, e.g., as individual circuits. The components in the assembly of components 2200 can, and in some embodiments are, implemented fully in hardware within the assembly of hardware components 860, e.g., as individual circuits corresponding to the different components. In other embodiments some of the components are implemented, e.g., as circuits, within the processor 808 with other components being implemented, e.g., as circuits within assembly of components 860, external to and coupled to the processor 808. As should be appreciated the level of integration of components in the processor and/or with some components being external to the processor may be one of design choice.

Alternatively, rather than being implemented as circuits, all or some of the components may be implemented in software and stored in the memory 812 of the playback device 800, with the components controlling operation of display device 800 to implement the functions corresponding to the components when the components are executed by a processor, e.g., processor 808. In some such embodiments, the assembly of components 2200 is included in the memory 812 as assembly of components 862. In still other embodiments, various components in assembly of components 2200 are implemented as a combination of hardware and software, e.g., with another circuit external to the processor providing input to the processor 808 which then under software control operates to perform a portion of a component's function. While shown in the FIG. 4 embodiment as a single processor 808, e.g., computer, in playback device 800 it should be appreciated that the processor 808 may be implemented as one or more processors, e.g., computers.

When implemented in software the components include code, which when executed by the processor 808, configure the processor 808 to implement the function corresponding to the component. In embodiments where the assembly of components 2200 is stored in the memory 812, the memory 812 is a computer program product comprising a computer readable medium comprising code, e.g., individual code for each component, for causing at least one computer, e.g., processor 808, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 22 control and/or configure the display device 800 or elements therein such as the processor 808, to perform the functions of corresponding steps illustrated in the method of the flowchart of FIG. 21, and/or described with respect to any of the Figures. Thus the assembly of components 2200 includes various components that perform functions of corresponding steps of one or more of FIG. 21.

Some embodiments are directed a non-transitory computer readable medium embodying a set of software instructions, e.g., computer executable instructions, for controlling a computer or other device to operate a playback device, e.g., a head mounted VR device.

Assembly of components 2200 includes a component 2204 configured to receive content including a first frame, said first frame including a first image captured by a first camera and first additional image content from an additional content source, said first additional image content occupying a portion of said first frame which is smaller than said first image. The first image includes first image content. In some embodiments, the first additional image content is included in a first additional image portion of the first frame. In some embodiment, the first image is an image captured by a first camera with a fisheye lens, and said first image occupies a non-rectangular portion of the first frame. In some such embodiments, the first additional image content is positioned in and edge corner of said first frame which is outside the portion of the first frame occupied by the first image captured by the first camera.

Assembly of components 2200 further includes a component 2206 configured to receive a first mesh mode of a first portion of an environment to which said first image is to be applied as a texture, a component 2208 configured to receive a second mesh mode, said second mesh model being a model to which said additional image content is to be applied as second texture, a component 2210 configured to receive first texture mapping information indicating how to apply said first image content to the first mesh model as a first texture, a component 2212 configured to receive second texture mapping information indicating how to apply said additional image content to said second mesh model as a second texture or how to apply said first additional image content to the first mesh model as a second texture, a component 2214 configured to receive location information indicating where said second mesh model is positioned in an environment which is modeled by said first mesh model, and a component 2216 configured to determine which portions of said first image content and said first additional image content are to be combined, e.g., based on the said texture mapping information and/or said location information.

Assembly of components 2200 further includes a component 2218 configured to decode the received content, a component 2220 configured to recover an alpha mask from said received image content, said alpha mask to be used in combining pixel values included in said first additional image content with said first image content, said alpha value mask including alpha values communicated: i) as pixel values in said first frame or ii) in additional image information communicated with said first frame, e.g., communicated in metadata with said first frame. In some embodiments, component 2220 includes a component 2221 configured to recover pixel values from a portion of the first frame used to communicate the alpha value mask.

Assembly of components 2200 further includes a component 2224 configured to generate a first output image to be displayed, said step of generating a first output image to be displayed including performing a rendering operation to generate said first output image, said rendering operation including generating said first output image using said first image as a first texture, said first additional image content as a second texture and said first mesh model as model of the environment to which at least one of said first and second textures are applied. Component 2224 includes a component 2226 configured to combine pixel values from said first image and said first additional image content to generate pixel values used to form a portion of the generated output image.

Component 2226 includes a component 2228 configured to use the recovered alpha values during the combining step. Component 2228 includes a component 2229 configured to multiply a first individual pixel value in said first addition image content with a corresponding first additional image content alpha value obtained from the alpha value mask to generate a modified additional image pixel value, a component 2230 configured to multiply a first individual pixel value of the first image, which is to be combined with said first individual image content, with a corresponding first image content alpha value obtained from said alpha value mask to generate a modified image pixel value, and a component 2132 configured to sum the modified additional image pixel value and the modified first image pixel value to generate a pixel value of the first output image.

In some embodiments, the first additional image content alpha value and said first image content alpha value are communicated in said first frame as different pixel values. In some embodiments, said alpha value mask corresponds to a second additional image portion of the first frame which is equal to or smaller than a first additional image portion of the first frame used to communicate said first additional image content; and the first additional image content alpha values are communicated in said first frame as pixel values of a first type and said first image content alpha values are communicated as pixel values of a second type, at least one of said first and second types of pixel values being first color pixel values, with the other one of said first and second types of pixel values being pixel values of a second color or luminance pixel values, said second color being different from said first color.

In some embodiments, said alpha value mask includes alpha values which produce a greater level of transparency of said additional image content near outer edges of said first additional image content than at the center of said first additional image content in the generated image.

In some embodiments, said alpha value mask causes gradual blending of the first additional image content and said first image content with pixels in the output image at edges of said first additional image content being a visible combination of pixel values of said first image content and said first additional image content and with images corresponding to the center of said first additional image content in the output image showing only pixels of the first additional image content.

Assembly of components 2200 further includes a component 2234 configured to send the generated first output image to a display. The display may be included in the display device or may be coupled to the display device. Assembly of component s 2200 further includes a component 2236 configured to operate the display to display the generated first output image.

In various embodiments the playback device receives various information such as a mesh model of the environment, a second mesh model, e.g., a mesh model of an object such as a billboard to which additional image content maybe applied as a texture when the additional image content is used and information about where the object to which the second model corresponds is located in the environment. In this way the playback device can determine based on the location information which if any portions of image content corresponding to an environment should be replaced or combined with portions of image content corresponding to the object to which the additional image content corresponds. For example if the object is a billboard, when the billboard is to be displayed the billboard may replace a portion of the modeled environment by being overlaid on top of the image of the environment which would be visible absent the presence of the billboard.

In some embodiments the playback device is controlled by the processor in the playback device to implement the steps of the playback method. The playback device received encoded content which as discussed above includes one or more encoded frames along with additional image content in some embodiments. The playback device also receives with or separately from the encoded image content, one or more mesh models and mapping information, e.g., one or more UV maps, providing information on how to map received image content on surfaces, e.g., segments, of the mesh models during rendering. Information indicating the location of modeled objects within the modeled environment may be, and sometimes is, received so that the playback device can determine how images should be layered during rendering with layered images being combined or fully covering or replacing an underlying layer. In some embodiments alpha blending of pixel values corresponding to different overlapping layers is supported. In such a case pixel values corresponding to additional image content may replace or be combined with pixel values of the image of the environment which is received.

Alpha blending, also sometimes referred to as alpha compositing, is a process of combining an image used as a translucent foreground with a background, thereby producing a new blended image. The degree of the foregrounds translucency may range from completely transparent to completely opaque. When different color pixel values are used for each of the foreground and background red foreground pixel values will be blended with red background pixel values, green foreground pixel values will be blended with corresponding green background pixel values and so on. A single alpha value may be applied equally to the red, green and blue pixel value of a pixel. Thus while three separate pixel values may be sent for each pixel value a single alpha value is normally communicated for each pixel.

Alpha blending allows tapered blending at the edges of an inserted object to make the insertion less noticeable in the final image. At the center of an inserted object the object's pixel values may fully replace those of the environment which is obscured by the object while near the edges of the object the pixel value may be a result of combining the corresponding environment image pixel value with the corresponding or overlaid object pixel value so that both contribute to the value of the pixel in the output image which is generated and displayed to a user of the playback device.

In various embodiments an image of a portion of an environment is included in a frame along with additional image content. The image of the environment, e.g., first image content, may have and in many cases is captured using a camera with a fish eye lens. The fish eye lens concentrates light on a sensor with the portion of the environment occupying less than a full frame, e.g., a circular center portion of a rectangular frame. Additional image content from another camera or a server is inserted into portions of the frame that is not used to communicate the captured image of the environment. In some embodiments left and right eye images captured by different cameras are packed into a single frame with additional image content to support stereoscopic viewing.

To facilitate use of the additional image content along with the image of the environment that is packed and encoded into a frame, additional content information is included with encoded content generated by an encoder. The additional content information may and sometimes does include information about when the additional image content should be used, e.g., to replace environmental image content that would otherwise be used or combined with environmental image content communicated in the same or different frame than the frame in which the additional image content is communicated.

To facilitate use of the image content provided in a frame, in addition to the image content a playback device can be and in some embodiments is supplied with a first mesh model, e.g., a mesh mode of an environment. In various embodiments during image rendering the playback device applies portions of the first image of the environment communicated in a frame, as a first texture, to corresponding portions of the mesh model of the environment.

During rendering the playback device may and also sometimes does use the additional image content, e.g., as a second texture. The additional image content communicated in a frame that also communicates an image of a portion of the environment can be applied, and sometimes is applied, as a second texture to a portion, e.g., one or more segments, of the environmental mesh model. As part of the application the additional mage content can be combined or used in place of a portion of the image of the environment, e.g., communicated in the same frame.

Rather than mapping the additional image content to the same environmental model, in some cases the additional image content is applied as a texture to an optional second model, e.g., model of a scoreboard, ball or other object in the environment which is modeled by the first mesh model. As part of additional content information the location of the second object in the environment is communicated to the playback device and the processor during rendering determine what portions of the additional object would obscure or replace one or more portions of the environment from the viewing perspective of the user for which the image is being rendered.

The environmental mesh model, optional additional mesh model, e.g., object model, maybe and sometimes are communicated to the playback device at the start of content streaming and/or at another point in time before the model or models are used. Additional content information can include information about the location where the additional object is to be positioned in the environment for a given frame, e.g., image, rendering operation. Thus the object maybe rendered at different locations in different frames even though the same object model maybe used.

In cases where a separate mesh model is not used for an object to which additional image content corresponds, the additional image content may map to the same segment of the environmental mesh model as a portion of the image communicated in the same frame.

Image mapping information, e.g., a UV map or UV maps, indicating how to map portions of a communicated frame to segments of the environmental mesh model and/or additional model of an object are communicated to the playback device in some embodiments, e.g., at the time the mesh model or models are communicated or at another time.

In various embodiments blending of portions of the image of the environment and portions of additional image content are supported. Such blending, implemented using alpha coefficients also sometimes referred to as alpha blending values, can help avoid sharp edges at the boundary where an image of an object is inserted into an image of a portion of an environment.

The alpha values can be used a pixel value multipliers with an alpha value corresponding to the additional image content multiplying a pixel value of the additional image content before the resulting value is combined, e.g., added to a modified or unmodified pixel value from the image of the environment. The environment pixel values maybe and sometimes multiplied by separate alpha values as part of the blending operation. The blending normally involve mixing of pixel values along edges of an inserted object or image with the inserted object or image pixel values completely replacing the values of the underlying environment layer towards the center of the inserted object. This near the center of the inserted object the pixel values of the inserted object are treated, in some but not necessarily all embodiments as being solid image portions while at the edge of the inserted object the object pixels maybe and times are treated as being partially translucent. In some embodiment the level of transparency increases closer to the edge of the inserted object and decreases or does not occur at the center of the inserted object.

In some embodiments alpha values when combining pixel values corresponding to a first image of an environment with additional image content are communicated in an alpha value mask. The alpha value mask is sent in some embodiments in additional content information but in other embodiments the alpha values are communicated as pixel values in a portion of the frame used to communicate the image of the environment and additional image content. The alpha value mask in some embodiments is sent in a reduced resolution format, e.g., with each alpha value being for use with multiple pixel values of the image portion to which the alpha values are to be applied. For example at a 1/4 resolution one alpha value is sent for every four pixel values to which the alpha values are to be applied. In other embodiments alpha values are communicated at the same resolution as the pixel values with one alpha value communicated for each pixel value. In many cases one alpha value is communicated for a pixel with the alpha value multiplying each of the individual R, G and B pixel values communicated for the pixel as part of the compositing step.

In some embodiments the R,G and B pixel values of an image portion used to communicate an alpha value mask are each used to communicate an alpha value as opposed to a portion of an image. Thus in such embodiments the R, G, B pixel values recovered by a decoder in the playback device are interpreted as alpha values and are not used as pixel values.

In one such embodiment one color component is used to communicate background alpha values while another color component is used to communicate foreground pixel values. In such an embodiment consider for example that an R pixel value may be and sometimes is used to communicate an alpha value that will multiple the R,G and B pixel values of a background pixel value and the G pixel value corresponding to the same pixel of the alpha value mask maybe used as an alpha value to multiply the R, G and B pixel values of an additional image portion that will be combined with the pixel of the environmental image that was multiple by the alpha value communicated by the R pixel value.

While in some embodiments pixel values are used to communicate an alpha value mask in other embodiments the alpha value mask is communicated separately, e.g., as part of additional image content information that maybe communicated as metadata sent as part of encoded data generated by an encoder and recovered by the decoder of the playback device to which the encoded content is supplied.

List of Numbered Exemplary Playback Embodiments

Exemplary playback embodiment 1. A playback method, the method comprising: receiving content including a first frame, said first frame including a first image captured by a first camera and first additional image content from an additional content source, said additional image content occupying a portion of said first frame which is smaller than the first image; receiving a first mesh model of a first portion of an environment to which said first image is to be applied as a texture; and generating a first output image to be displayed, said step of generating a first output image to be displayed including performing a rendering operation to generate said first output image, said rendering operation including generating said first output image using said first image as a first texture, said first additional image content as a second texture and said first mesh model as a model of an environment to which at least one of said first and second textures is applied.

Exemplary playback embodiment 1A. The method of claim 1, wherein said first additional image content is included in a first additional image portion of said first frame.

Exemplary playback embodiment 2. The playback method of claim 1, wherein said first image is an image captured by a first camera with a fisheye lens, said first image occupying a non-rectangular portion of the first frame; and wherein said first additional image content is positioned in an edge corner of said first frame which is outside the portion of the first frame occupied by said first image captured by the first camera.

Exemplary playback embodiment 3. The playback method of claim 2, wherein generating a first output image to be displayed includes: combining pixel values from said first image and pixel values from said first additional image content to generate pixel values of a portion of the generated output image.

Exemplary playback embodiment 4. The method of claim 3, further comprising: recovering an alpha value mask from said received content to be used in combining pixel values included in said additional image content and said first image content, said alpha value mask including alpha values communicated as i) pixel values in said first frame or ii) in additional image information communicated with said first frame.

Exemplary playback embodiment 5. The method of claim 4, wherein said received content is encoded content, the method further comprising decoding said received content.

Exemplary playback embodiment 6. The method of claim 4, wherein recovering the alpha value mask includes recovering pixel values from a portion of said first frame used to communicate the alpha value mask.

Exemplary playback embodiment 7. The method of claim 4, further comprising: using the recovered alpha values during said combining step, using the recovered alpha values including multiplying a first individual pixel value in said first additional image content with a corresponding first additional image content alpha value obtained from said alpha value mask to generate a modified additional image pixel value.

Exemplary playback embodiment 8. The method of claim 7, further comprising: multiplying a first individual pixel value of the first image which is to be combined with said first individual image content with a corresponding first image content alpha value obtained from said alpha value mask to generate a modified first image pixel value; and summing the modified additional image pixel value and modified first image pixel value to generate a pixel value of the first output image.

Exemplary playback embodiment 9. The method of claim 7, wherein said first additional image content alpha value and said first image content alpha value are communicated in said first frame as different pixel values.

Exemplary playback embodiment 10. The method of claim 9, wherein said alpha value mask corresponds to a second additional image portion of the first frame which is equal to or smaller than a first additional image portion of the first frame used to communicate said first additional image content; and wherein first additional image content alpha values are communicated in said first frame as pixel values of a first type and said first image content alpha values are communicated as pixel values of a second type, at least one of said first and second types of pixel values being first color pixel values, with the other one of said first and second types of pixel values being pixel values of a second color or luminance pixel values, said second color being different from said first color.

Exemplary playback embodiment 11. The method of claim 7, wherein said alpha value mask includes alpha values which produce a greater level of transparency of said additional image content near outer edges of said additional image content than at the center of said additional image content in the generated image.

Exemplary playback embodiment 12. The method of claim 7, wherein said mask causes gradual blending of the additional image content and said first image content with pixels in the output image at edges of said additional image content being a visible combination of pixel values of said first image content and said additional image content and with images corresponding to the center of said additional image content in the output image showing only pixels of the additional image content.

Exemplary playback embodiment 13. The method of claim 1, further comprising: receiving a second mesh model, said second mesh model being a model to which said additional image content is to be applied as a second texture.

Exemplary playback embodiment 14. The method of claim 13, further comprising: first texture mapping information indicating how to apply said first image content to the first mesh model as the first texture; and second texture mapping information indicating how to apply said first additional image content to the second mesh model as the second texture.

Exemplary playback embodiment 15. The method of claim 14, further comprising: receiving location information indicating where said second mesh model is positioned in an environment which is modeled by said first mesh model; and determining which portions of said first image portion and said second image portion are to be combined based on the received location information.

Exemplary playback embodiment 16. A playback device, the comprising: memory; and a processor configured to: receive content including a first frame, said first frame including a first image captured by a first camera and first additional image content from an additional content source, said additional image content occupying a portion of said first frame which is smaller than the first image; receive a first mesh model of a first portion of an environment to which said first image is to be applied as a texture; and generate a first output image to be displayed, said step of generating a first output image to be displayed including performing a rendering operation to generate said first output image, said rendering operation including generating said first output image using said first image as a first texture, said first additional image content as a second texture and said first mesh model as a model of an environment to which at least one of said first and second textures is applied; and a display configured to display the first output image.

Additional List of Numbered Exemplary Playback Embodiments

Method Embodiment 1 A playback method, the method comprising: receiving content including a first frame, said first frame including a first image captured by a first camera and first additional image content from an additional content source, said first additional image content occupying a portion of said first frame which is smaller than the first image; receiving a first mesh model of a first portion of an environment to which said first image is to be applied as a texture; and generating a first output image to be displayed, said step of generating a first output image to be displayed including performing a rendering operation to generate said first output image, said rendering operation including generating said first output image using said first image as a first texture, said first additional image content as a second texture and said first mesh model as a model of an environment to which at least one of said first and second textures is applied.

Method Embodiment 2 The playback method of Method Embodiment 1, wherein said first additional image content is included in a first additional image portion of said first frame.

Method Embodiment 3 The playback method of Method Embodiment 1, wherein said first image is an image captured by a first camera with a fisheye lens, said first image occupying a non-rectangular portion of the first frame; and wherein said first additional image content is positioned in an edge corner of said first frame which is outside the portion of the first frame occupied by said first image captured by the first camera.

Method Embodiment 4 The playback method of Method Embodiment 3, wherein generating a first output image to be displayed includes: combining pixel values from said first image and pixel values from said first additional image content to generate pixel values of a portion of the generated output image.

Method Embodiment 5 The playback method of Method Embodiment 4, further comprising: recovering an alpha value mask from said received content to be used in combining pixel values included in said first additional image content and said first image content, said alpha value mask including alpha values communicated: i) as pixel values in said first frame or ii) in additional image information communicated with said first frame.

Method Embodiment 6 The playback method of Method Embodiment 5, wherein said received content is encoded content, the method further comprising: decoding said received content.

Method Embodiment 7 The playback method of Method Embodiment 5, wherein recovering the alpha value mask includes recovering pixel values from a portion of said first frame used to communicate the alpha value mask.

Method Embodiment 8 The playback method of Method Embodiment 5, further comprising: using the recovered alpha values during said combining step.

Method Embodiment 9 The playback method of Method Embodiment 8, wherein using the recovered alpha values includes multiplying a first individual pixel value in said first additional image content with a corresponding first additional image content alpha value obtained from said alpha value mask to generate a modified additional image pixel value.

Method Embodiment 10 The playback method of Method Embodiment 9, wherein using the recovered values during the combining step further includes: multiplying a first individual pixel value of the first image which is to be combined with said first individual image content with a corresponding first image content alpha value obtained from said alpha value mask to generate a modified first image pixel value; and summing the modified additional image pixel value and modified first image pixel value to generate a pixel value of the first output image.

Method Embodiment 11 The playback method of Method Embodiment 9, wherein said first additional image content alpha value and said first image content alpha value are communicated in said first frame as different pixel values.

Method Embodiment 12 The playback method of Method Embodiment 11, wherein said alpha value mask corresponds to a second additional image portion of the first frame which is equal to or smaller than a first additional image portion of the first frame used to communicate said first additional image content; and wherein first additional image content alpha values are communicated in said first frame as pixel values of a first type and said first image content alpha values are communicated as pixel values of a second type, at least one of said first and second types of pixel values being first color pixel values, with the other one of said first and second types of pixel values being pixel values of a second color or luminance pixel values, said second color being different from said first color.

Method Embodiment 13 The playback method of Method Embodiment 9, wherein said alpha value mask includes alpha values which produce a greater level of transparency of said additional image content near outer edges of said first additional image content than at the center of said first additional image content in the generated image.

Method Embodiment 14 The playback method of Method Embodiment 9, wherein said mask causes gradual blending of the first additional image content and said first image content with pixels in the output image at edges of said first additional image content being a visible combination of pixel values of said first image content and said first additional image content and with images corresponding to the center of said first additional image content in the output image showing only pixels of the additional image content.

Method Embodiment 15 The playback method of Method Embodiment 1, further comprising: receiving a second mesh model, said second mesh model being a model to which said first additional image content is to be applied as a second texture.

Method Embodiment 16 The playback method of Method Embodiment 13, further comprising: receiving first texture mapping information indicating how to apply said first image content to the first mesh model as the first texture; and receiving second texture mapping information indicating how to apply said first additional image content to the second mesh model as the second texture or how to apply said first additional image content to the first mesh model as the second texture.

Method Embodiment 17 The playback method of Method Embodiment 16, further comprising: determining which portions of said first image content and said first additional image content are to be combined.

Method Embodiment 18 The playback method of Method Embodiment 16, further comprising: receiving location information indicating where said second mesh model is positioned in an environment which is modeled by said first mesh model; and determining which portions of said first image content and said first additional image content are to be combined based on the received location information.

Playback Apparatus Embodiment 1 A playback device, the playback device comprising: memory; a processor configured to: receive content including a first frame, said first frame including a first image captured by a first camera and first additional image content from an additional content source, said first additional image content occupying a portion of said first frame which is smaller than the first image; receive a first mesh model of a first portion of an environment to which said first image is to be applied as a texture; and generate a first output image to be displayed, said step of generating a first output image to be displayed including performing a rendering operation to generate said first output image, said rendering operation including generating said first output image using said first image as a first texture, said first additional image content as a second texture and said first mesh model as a model of an environment to which at least one of said first and second textures is applied; and a display configured to display the first output image.

Playback Apparatus Embodiment 2 The playback apparatus of Playback Apparatus Embodiment 1, wherein said first additional image content is included in a first additional image portion of said first frame.

Playback Apparatus Embodiment 3 The playback apparatus of Playback Apparatus Embodiment 1, wherein said first image is an image captured by a first camera with a fisheye lens, said first image occupying a non-rectangular portion of the first frame; and wherein said first additional image content is positioned in an edge corner of said first frame which is outside the portion of the first frame occupied by said first image captured by the first camera.

Playback Apparatus Embodiment 4 The playback apparatus of Playback Apparatus Embodiment 3, wherein the processor is further configured, as part of generating a first output image to be displayed, to: combine pixel values from said first image and pixel values from said first additional image content to generate pixel values of a portion of the generated output image.

Playback Apparatus Embodiment 5 The playback apparatus of Playback Apparatus Embodiment 4, wherein the processor is further configured to recover an alpha value mask from said received content to be used in combining pixel values included in said first additional image content and said first image content, said alpha value mask including alpha values communicated: i) as pixel values in said first frame or ii) in additional image information communicated with said first frame.

Playback Apparatus Embodiment 6 The playback apparatus of Playback Apparatus Embodiment 5, wherein said received content is encoded content; and wherein the processor is further configured to: decode said received content.

Playback Apparatus Embodiment 7 The playback apparatus of Playback Apparatus Embodiment 5, wherein recovering the alpha value mask includes recovering pixel values from a portion of said first frame used to communicate the alpha value mask.

Playback Apparatus Embodiment 8 The playback apparatus of Playback Apparatus Embodiment 5, wherein the processor is configured to use the recovered alpha values during said combining step.

Playback Apparatus Embodiment 9 The playback apparatus of Playback Apparatus Embodiment 8, wherein using the recovered alpha values includes multiplying a first individual pixel value in said first additional image content with a corresponding first additional image content alpha value obtained from said alpha value mask to generate a modified additional image pixel value.

Playback Apparatus Embodiment 10 The playback apparatus of Playback Apparatus Embodiment 9, wherein the processor is further configured, as part of using the recovered values during the combining step, to: multiply a first individual pixel value of the first image which is to be combined with said first individual image content with a corresponding first image content alpha value obtained from said alpha value mask to generate a modified first image pixel value; and summing the modified additional image pixel value and modified first image pixel value to generate a pixel value of the first output image.

Playback Apparatus Embodiment 11 The playback apparatus of Playback Apparatus Embodiment 9, wherein said first additional image content alpha value and said first image content alpha values are communicated in said first frame as different pixel values.

Playback Apparatus Embodiment 12 The playback apparatus of Playback Apparatus Embodiment 11, wherein said alpha value mask corresponds to a second additional image portion of the first frame which is equal to or smaller than a first additional image portion of the first frame used to communicate said first additional image content; and wherein first additional image content alpha values are communicated in said first frame as pixel values of a first type and said first image content alpha values are communicated as pixel values of a second type, at least one of said first and second types of pixel values being first color pixel values, with the other one of said first and second types of pixel values being pixel values of a second color or luminance pixel values, said second color being different from said first color.

Playback Apparatus Embodiment 13 The playback apparatus of Playback Apparatus Embodiment 9, wherein said alpha value mask includes alpha values which produce a greater level of transparency of said additional image content near outer edges of said first additional image content than at the center of said first additional image content in the generated image.

Playback Apparatus Embodiment 14 The playback apparatus of Playback Apparatus Embodiment 9, wherein said mask causes gradual blending of the first additional image content and said first image content with pixels in the output image at edges of said first additional image content being a visible combination of pixel values of said first image content and said first additional image content and with images corresponding to the center of said first additional image content in the output image showing only pixels of the additional image content.

Playback Apparatus Embodiment 15 The playback apparatus of Playback Apparatus Embodiment 1, wherein the processor is further configured to control the playback device to: receive a second mesh model, said second mesh model being a model to which said first additional image content is to be applied as a second texture.

Playback Apparatus Embodiment 16 The playback apparatus of Playback Apparatus Embodiment 13, where receiving first texture mapping information indicating how to apply said first image content to the first mesh model as the first texture; and receiving second texture mapping information indicating how to apply said first additional image content to the second mesh model as the second texture or how to apply said first additional image content to the first mesh model as the second texture.

Playback Apparatus Embodiment 17 The playback apparatus of Playback Apparatus Embodiment 16, wherein the processor is further configured to determine which portions of said first image content and said first additional image content are to be combined.

Playback Apparatus Embodiment 18 The playback apparatus of Playback Apparatus Embodiment 16, wherein the processor is further configured to control the playback device to: receive location information indicating where said second mesh model is positioned in an environment which is modeled by said first mesh model; and determining which portions of said first image content and said first additional image content are to be combined based on the received location information.

List of First Set of Numbered Exemplary Embodiments

Exemplary embodiment 1. A method comprising: receiving (1015) a first image captured by a first camera (203) using a first fish eye lens (2); and generating (1032) a composite image by combining a portion of the first image with additional image content; operating an encoder to: i) receive (1037) the composite image and additional image content information; and ii) generate (1038) encoded content including a first encoded composite frame and said additional image content information.

Exemplary embodiment 2. The method of exemplary embodiment 1, wherein said additional image content information includes control information which controls use of the additional image content by a playback device (122) during rendering of an image.

Exemplary embodiment 3. The method of exemplary embodiment 2, wherein said additional image content information is communicated as metadata.

Exemplary embodiment 4. The method of exemplary embodiment 1, wherein said first camera (203) is a first camera of a stereoscopic camera pair (202) including said first camera (203) and a second camera (204) including a second fish eye lens (3), the method further comprising: receiving (1015) a second image captured by the second camera (204) using the second fish eye lens (3); and wherein generating (1032) a composite image by combining a portion of the first image with additional image content includes combining said first and second images with said additional image content.

Exemplary embodiment 5. The method of exemplary embodiment 4, further comprising: receiving (1016) one or more additional images; and wherein generating (1032) a composite image includes combining said first and second images with a third image and said additional image content, said third image being one of said additional images.

Exemplary embodiment 6. The method of exemplary embodiment 1, wherein said additional image content includes a logo, text, or a texture; and wherein generating (1032) the composite image includes including at least some additional image content in a corner portion of said composite image not used for an image of a portion of the environment.

Exemplary embodiment 7. The method of exemplary embodiment 5, wherein said encoding (1038) includes: using (1040) an ultra-high-definition television encoder (248) to encode said composite image.

Exemplary embodiment 8. The method of exemplary embodiment 5, further comprising: receiving (1024) a camera selection control signal (249), said camera selection control signal (249) indicating at least which camera (210, 216, 218, 220, 222) is to be used as the source of the third image.

Exemplary embodiment 9. The method of exemplary embodiment 5, wherein said camera selection control signal (249) specifies: i) a stereoscopic camera pair (206 or 212) to be used as the source of said third image and a fourth image or ii) two different mono-scopic cameras (218, 220) to be used as the source of the third and fourth images.

Exemplary embodiment 10. The method of exemplary embodiment 1, wherein said composite image includes a captured environmental image area (504) and additional image area (502); and wherein generating (1032) the composite image includes inserting (1036) into the additional image area (502) additional image content (506, 508 or 510) which was not captured by said first camera.

Exemplary embodiment 11. The method of exemplary embodiment 1, further comprising: generating (1006) said additional image content information, said additional image content information including control information that controls use of the additional image content during rendering of an image using image data included in the composite frame.

Exemplary embodiment 12. The method of exemplary embodiment 11, wherein said additional image content information includes (1008) information indicating a mapping between a first additional image content segment and a segment of an environmental mesh to which the first additional image content segment corresponds, said environmental mesh being used for rendering images.

Exemplary embodiment 13. The method of exemplary embodiment 12, wherein said additional image content information (260) further includes (1010) information indicating conditions when the additional image content segment is to be applied to the segment of the environmental mesh to which it maps during rendering.

Exemplary embodiment 14. The method of exemplary embodiment 13, where said additional image content information (260) further includes (1012): information indicating whether the additional image content is to be mapped onto the segment of the environmental mesh to which it corresponds indicates i) that the mapping is to be without blending with other image content or ii) that the mapping is to be performed with blending with other image content when being mapped onto the segment of the environmental mesh to which the additional image content corresponds.

Exemplary embodiment 15. The method of exemplary embodiment 14, where information indicating whether the additional image content that the mapping is to be performed with blending with other image content when being mapped onto the segment of the environmental mesh to which the additional image content corresponds and wherein the information includes (1014) an alpha value indicating the relative transparency of the additional image content to be applied when combining with the other image content.

Exemplary embodiment 16. A system (200) comprising: a receiver (211 or 245) for receiving a first image captured by a first camera (203) using a first fish eye lens (2); and a compositor (246) for generating (1032) a composite image by combining a portion of the first image with additional image content; and an encoder (248) configured to: i) receive the composite image and additional image content information; and ii) generate encoded content including a first encoded composite frame and said additional image content information.

Exemplary embodiment 17. The system (200) of exemplary embodiment 16, wherein said additional image content information (260) includes control information which controls use of the additional image content by a playback device during rendering of an image.

Exemplary embodiment 18. The system of exemplary embodiment 17, wherein said additional image content information (260) is communicated as metadata.

Exemplary embodiment 19. The system (200) of exemplary embodiment 16, wherein said first camera is a first camera (203) of a stereoscopic camera pair (202) including said first camera (203) and a second camera (204) including a second fish eye lens (3), said receiver (211 or 245) is further configured to: receive a second image captured by the second camera (204) using the second fish eye lens (3); and wherein the compositor (246) is configured to generate (1032) a composite image by combining said first and second images with said additional image content.

Exemplary embodiment 20. The system (200) of exemplary embodiment 16, wherein said encoder (248) is an ultra-high-definition television encoder configured to encode a composite image as a single frame, said composite image including four images of portions of the environment and said additional image content.

Exemplary embodiment 21. The system (200) of exemplary embodiment 16, further comprising: a processor (240) configured to generate said additional image content information, said additional image content information including information indicating a mapping between a first additional image content segment of the composite image and a segment of an environmental mesh to which the first additional image content segment correspond, said environmental mesh being used for rendering images.

Exemplary embodiment 22. The system of exemplary embodiment 12, wherein said additional image content information (260) further includes information indicating conditions when one or more additional image content segments are to be applied to corresponding segments of an environmental mesh during image rendering by a playback device.

Exemplary embodiment 23. A non-transitory machine readable medium including processor executable instructions which when executed by a processor of an image processing and content delivery system control the image processing and content delivery system to: receive a first image captured by a first camera (203) using a first fish eye lens (2); and generate (1032) a composite image by combining a portion of the first image with additional image content; and operate an encoder (248) to: i) receive the composite image and additional image content information; and ii) generate encoded content including a first encoded composite frame and said additional image content information.

Additional Exemplary Numbered Embodiments

Additional exemplary embodiment 1. A method comprising: receiving (1015) a first pair of images captured by a first stereoscopic camera pair (202), said first pair of images including at least a first image captured by a first camera (204) and a second image captured by a second camera (203), said first camera (204) being a left camera of said first stereoscopic camera pair (202), said second camera (203) being a right camera of said first stereoscopic camera pair (202); receiving (1016) one or more additional images captured by one or more additional cameras (210, 208, 216, 214, 218, 220, 222); generating (1032) a composite image by combining said first and second with at least a third image to form a composite image, said third image being one of said one or more additional images; and encoding (1038) said composite image to generate a first encoded image including image content from said first, second and third images.

Additional exemplary embodiment 2. The method of additional exemplary embodiment 1, wherein said encoding (1038) includes: using (1040) an ultra-high-definition television encoder (248) to encode said composite image.

Additional exemplary embodiment 3. The method of additional exemplary embodiment 1, wherein receiving (1016) one or more additional images includes receiving (1020) a fourth image captured by a fourth camera (208, 214, 218, 220 or 222); and wherein generating (1032) the composite image includes further combining (1034) said fourth image with said first, second and third images to generate the composite image.

Additional exemplary embodiment 3A. The method of additional exemplary embodiment 3, further comprising: receiving (1024) a camera selection control signal, said camera selection control signal indicating at least which camera (210, 216, 218, 220, 222) is to be used as the source of the third image.

Additional exemplary embodiment 3B. The method of additional exemplary embodiment 3A, wherein said camera selection control signal specifies (1026, 1028) a stereoscopic camera pair (206 or 212) to be used as the source of said third and fourth images or two different mono-scopic cameras (218, 220) to be used as the source of the third and fourth images.

Additional exemplary embodiment 3C. The method of additional exemplary embodiment 3B, wherein said third and fourth images are (1026) from third and fourth cameras (210, 208) of a second stereoscopic pair (206).

Additional exemplary embodiment 3D. The method of additional exemplary embodiment 3, wherein said third and fourth images are (1028) from different non-stereoscopic cameras (mono cameras) (218, 220).

Additional exemplary embodiment 4. The method of additional exemplary embodiment 3, wherein said composite image includes captured environmental image areas and additional image areas; and wherein generating (1032) the composite image further includes inserting (1036) into an additional image area additional image content which was not captured by any of said first, second, third or fourth cameras.

Additional exemplary embodiment 5. The method of additional exemplary embodiment 4, wherein said additional image content includes (1004) at least one of a logo, texture, sign, or advertisement.

Additional exemplary embodiment 6. The method of additional exemplary embodiment 5, further comprising: generating (1006) additional image content information which controls use of the additional image content during rendering of an image using image data included in the composite frame.

Additional exemplary embodiment 7. The method of additional exemplary embodiment 6, wherein said additional image content information includes information indicating a mapping between a first additional image content segment and a segment of an environmental mesh to which the first additional image content segment corresponds, said environmental mesh being used for rendering images.

Additional exemplary embodiment 8. The method of additional exemplary embodiment 7, wherein said additional image content information further includes information indicating conditions when the additional image content segment is to be applied to the segment of the environmental mesh to which it maps during rendering.

Additional exemplary embodiment 9. The method of additional exemplary embodiment 8, where said additional image content information further includes: information indicating whether the additional image content is to be mapped onto the segment of the environmental mesh to which it corresponds indicates i) that the mapping is to be without blending with other image content or ii) that the mapping is to be performed with blending with other image content when being mapped onto the segment of the environmental mesh to which the additional image content corresponds.

Additional exemplary embodiment 10. The method of additional exemplary embodiment 9, where information indicating whether the additional image content that the mapping is to be performed with blending with other image content when being mapped onto the segment of the environmental mesh to which the additional image content corresponds and wherein the information includes (1014) an alpha value indicating the relative transparency of the additional image content to be applied when combining with the other image content.

Additional exemplary embodiment 11. A system (200) comprising: a receiver (211) for receiving a first pair of images captured by a first stereoscopic camera pair (202), said first pair of images including at least a first image captured by a first camera (204) and a second image captured by a second camera (203), said first camera (204) being a left camera of said first stereoscopic camera pair (202), said second camera (203) being a right camera of said first stereoscopic camera pair (202) and for receiving one or more additional images captured by one or more additional cameras (208, 209, 214, 216, 218, 220, 222); an image processing system (104) configured to generate a composite image by combining said first and second with at least a third image to form a composite image, said third image being one of said one or more additional images; and an encoder (248) configured to encode said composite image to generate a first encoded image including image content from said first, second and third images.

Additional exemplary embodiment 12. A method of communicating image content corresponding to an environment to a playback device (122), the method comprising: including (1104) a portion of an image of an environment captured by a camera (204 or 203) with a fish eye lens in a frame; including (1106) in said frame a logo, text, or a texture in a corner portion of said frame not used for said portion of the image of the environment.

Additional exemplary embodiment 13. The method of additional exemplary embodiment 12, wherein said frame is a UHD frame in which a portion of a first image captured by a first camera (204) of a first stereoscopic camera pair (202) and a portion of a second image captured by a second camera (203) of said first stereoscopic camera pair (202) is included.

Additional exemplary embodiment 14 The method of additional exemplary embodiment 13, further comprising: including (1108) in said UHD frame first and second images captured by first and second cameras ((216, 214), or (216, 214) of a second stereoscopic camera pair (206 or 212).

Additional exemplary embodiment 15. The method of additional exemplary embodiment 13, further comprising: including (1110) in said UHD frame an image captured by a mono camera (218, 220 or 222) which is not a member of a stereoscopic camera pair (202, 206, 212).

Additional exemplary embodiment 16. The method of additional exemplary embodiment 15, further comprising: using (1112) an UHD video encoder (248) to encode said frame; and transmitting (1114) said encoded frame to a playback device (122) for use as a texture on a surface of a model of said environment.

Additional exemplary embodiment 17. A method of communicating image content corresponding to an environment to a playback device (122), the method comprising: combining (1206) image content including first and second images from at least two different stereoscopic camera pairs (202, 206) into a UHD frame for transmission; and communicating (1208) the UHD frame to another device (122).

Additional exemplary embodiment 18. The method of additional exemplary embodiment 17, further comprising: receiving (1204) at a device (247) which performs said combining a control signal (249) indicating which of a plurality of different stereoscopic camera pairs (202, 206, 210) are to provide the images to be combined, the output of different stereoscopic pairs being combined into a frame at different times based on said control signal (249).

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

In stereoscopic embodiments different left and right images are received in the same or different frames and combined with additional image content. The left and right eye images are rendered separately in the manner described above with regard to a single image rendering operation but then displayed to a user at the same time with the left eye being displayed a left eye image and the right eye being displayed a right eye image. Differences between the left and right eye images provide a sense of depth to the view. A head mounted display is used in some embodiments with the display including left and right eye image display portions which can and normally are be used to display the corresponding rendered left and right eye images, respectively. Thus it should be appreciated that the methods and apparatus of the present invention are well suited for non-stereoscopic as well as stereoscopic playback systems.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

In some embodiments each of the steps of the described method is performed by a processor or under the control of a processor. Various features address technical problems of how to encode and/or communicate video of a communications network such as the Internet. Various features also address how to use the limited space of a frame to communicate an image of a portion of an environment along with other content such as a logo, text, or a texture that was not in the environment but maybe combined during rendering with an image of an environment.

Numerous additional variations on the methods and apparatus of the various embodiments described above will be apparent to those skilled in the art in view of the above description. Such variations are to be considered within the scope.

What is claimed:

1. A playback method implemented by a content playback device, the method comprising:

receiving, at the content playback device, content including a first frame, said first frame including a first image captured by a first camera and first additional image content from an additional content source, said first additional image content occupying a portion of said first frame which is smaller than the first image and providing pixel values to replace pixel values of said first image during playback or be blended with pixel values of said first image during playback;
receiving, at the content playback device, a first mesh model of a first portion of an environment to which said first image is to be applied as a texture; and
generating, at the content playback device, a first output image to be displayed, said step of generating a first output image to be displayed including performing a rendering operation to generate said first output image, said rendering operation including generating said first output image using said first image as a first texture, said first additional image content as a second texture and said first mesh model as a model of an environment to which at least one of said first and second textures is applied, said generating a first output image including:
i) combining one pixel value of the first image included in the first frame with one pixel value of the first additional image content to generate one pixel value of said first output image or ii) replacing said one pixel value of the first image included in the first frame with said one pixel value of the first additional image content to generate said one pixel value of said first output image.

2. The playback method of claim 1,
wherein said first image is an image captured by said first camera with a fisheye lens, said first image occupying a non-rectangular portion of the first frame; and
wherein said first additional image content is positioned in an edge corner of said first frame which is outside the portion of the first frame occupied by said first image captured by the first camera.

3. The playback method of claim 2, wherein generating a first output image to be displayed includes:
combining, by performing a blending operation, pixel values from said first image and pixel values from said first additional image content to generate pixel values of a portion of the generated output image.

4. The playback method of claim 3,
wherein said blending operation is an alpha blending operation, the method further comprising:
recovering an alpha value mask from said received content to be used in combining pixel values included in said first additional image content and said first image content, said alpha value mask including alpha values communicated: i) as pixel values in said first frame or ii) in additional image information communicated with said first frame.

5. The playback method of claim 4, wherein said received content is encoded content, the method further comprising:
decoding said received content.

6. A playback method, the method comprising:
receiving content including a first frame, said first frame including a first image captured by a first camera and first additional image content from an additional content source, said first additional image content occupying a portion of said first frame which is smaller than the first image, said first image being an image captured by said first camera with a fisheye lens, said first image occupying a non-rectangular portion of the first frame, said first additional image content is positioned in an edge corner of said first frame which is outside the portion of the first frame occupied by said first image captured by the first camera;
receiving a first mesh model of a first portion of an environment to which said first image is to be applied as a texture;
recovering an alpha value mask from said received content to be used in combining pixel values included in said first additional image content and said first image content, said alpha value mask including alpha values communicated as pixel values in said first frame, said recovering the alpha value mask including recovering pixel values from a portion of said first frame used to communicate the alpha value mask; and
generating a first output image to be displayed, said step of generating a first output image to be displayed including performing a rendering operation to generate said first output image, said rendering operation including generating said first output image using said first image as a first texture, said first additional image content as a second texture and said first mesh model as a model of an environment to which at least one of said first and second textures is applied, generating the first output image to be displayed including combining pixel values from said first image and pixel values from said first additional image content to generate pixel values of a portion of the generated output image.

7. The playback method of claim 4, further comprising:
using the recovered alpha values during said combining step, wherein using the recovered alpha values includes multiplying a first individual pixel value in said first additional image content with a corresponding first additional image content alpha value obtained from said alpha value mask to generate a modified additional image pixel value.

8. The playback method of claim 7, wherein using the recovered values during the combining step further includes:
multiplying a first individual pixel value of the first image which is to be combined with said first individual image content with a corresponding first image content alpha value obtained from said alpha value mask to generate a modified first image pixel value; and
summing the modified additional image pixel value and modified first image pixel value to generate a pixel value of the first output image.

9. The playback method of claim 7, wherein said first additional image content alpha value and said first image content alpha value are communicated in said first frame as different pixel values.

10. The playback method of claim 9,
wherein said alpha value mask corresponds to a second additional image portion of the first frame which is equal to or smaller than a first additional image portion of the first frame used to communicate said first additional image content; and
wherein first additional image content alpha values are communicated in said first frame as pixel values of a first type and said first image content alpha values are communicated as pixel values of a second type, at least one of said first and second types of pixel values being first color pixel values, with the other one of said first and second types of pixel values being pixel values of a second color or luminance pixel values, said second color being different from said first color.

11. The playback method of claim 7, wherein said alpha value mask includes alpha values which produce a greater level of transparency of said additional image content near outer edges of said first additional image content than at the center of said first additional image content in the generated image.

12. The playback method of claim 11, further comprising:
receiving first texture mapping information indicating how to apply said first image content to the first mesh model as the first texture; and
receiving second texture mapping information indicating how to apply said first additional image content to a second mesh model as the second texture or how to apply said first additional image content to the first mesh model as the second texture.

13. The playback method of claim 12, further comprising:
receiving location information indicating where said second mesh model is positioned in an environment which is modeled by said first mesh model; and
determining which portions of said first image content and said first additional image content are to be combined based on the received location information.

14. A content playback device, the content playback device comprising:
memory;
a processor configured to:
control the content playback device to receive content including a first frame, said first frame including a first image captured by a first camera and first additional image content from an additional content source, said first additional image content occupying a portion of said first frame which is smaller than the first image and providing pixel values to replace pixel values of said first image during playback or be blended with pixel values of said first image during playback;
control the content playback device to receive a first mesh model of a first portion of an environment to which said first image is to be applied as a texture; and
generate, at the content playback device, a first output image to be displayed, said step of generating a first output image to be displayed including performing a rendering operation to generate said first output image, said rendering operation including generating said first output image using said first image as a first texture, said first additional image content as a second texture and said first mesh model as a model of an environment to which at least one of said first and second textures is applied, said generating a first output image including: i) combining one pixel value of the first image included in the first frame with one pixel value of the first additional image content to generate one pixel value of said first output image or ii) replacing said one pixel value of the first image included in the first frame with said one pixel value of the first additional image content to generate said one pixel value of said first output image; and
a display configured to display the first output image.

15. The content playback apparatus of claim 14, wherein said first additional image content is included in a first additional image portion of said first frame.

16. The content playback device of claim 14, wherein said first image is an image captured by said first camera with a fisheye lens, said first image occupying a non-rectangular portion of the first frame; and wherein said first additional image content is positioned in an edge corner of said first frame which is outside the portion of the first frame occupied by said first image captured by the first camera.

17. The content playback device of claim 16, wherein the processor is further configured, as part of generating a first output image to be displayed, to: combine pixel values from said first image and pixel values from said first additional image content to generate pixel values of a portion of the generated output image.

18. The content playback device of claim 14, wherein said display is a stereoscopic display configured to display left eye images on a first side of said display and right eye images on a second side of the display.

19. The content playback device of claim 18, where wherein said display is a head mounted display.

20. A non-transitory computer readable medium comprising computer executable instructions which when executed by a processor of a content playback device control the content playback device to:
receive, at the content playback device, content including a first frame, said first frame including a first image captured by a first camera and first additional image content from an additional content source, said first additional image content occupying a portion of said first frame which is smaller than the first image and providing pixel values to replace pixel values of said first image during playback or be blended with pixel values of said first image during playback;
receive, at the content playback device, a first mesh model of a first portion of an environment to which said first image is to be applied as a texture; and
generate, at the content playback device, a first output image to be displayed, said step of generating a first output image to be displayed including performing a rendering operation to generate said first output image, said rendering operation including generating said first output image using said first image as a first texture, said first additional image content as a second texture and said first mesh model as a model of an environment to which at least one of said first and second textures is applied, said generating a first output image including: i) combining one pixel value of the first image included in the first frame with one pixel value of the first additional image content to generate one pixel value of said first output image or ii) replacing said one pixel value of the first image included in the first frame with said one pixel value of the first additional image content to generate said one pixel value of said first output image.

* * * * *